US009276892B2

(12) United States Patent
Bohm et al.

(10) Patent No.: US 9,276,892 B2
(45) Date of Patent: Mar. 1, 2016

(54) SOCIAL DIALOGUE LISTENING, ANALYTICS, AND ENGAGEMENT SYSTEM AND METHOD

(71) Applicants: Malcolm Bohm, La Jolla, CA (US); Cary Jardin, Poway, CA (US)

(72) Inventors: Malcolm Bohm, La Jolla, CA (US); Cary Jardin, Poway, CA (US)

(73) Assignee: LIQUID GIRDS, San Diego, CA (US)

( * ) Notice: Subject to any disclaimer, the term of this patent is extended or adjusted under 35 U.S.C. 154(b) by 0 days.

(21) Appl. No.: 13/689,725

(22) Filed: Nov. 29, 2012

(65) Prior Publication Data

US 2013/0138749 A1   May 30, 2013

Related U.S. Application Data

(60) Provisional application No. 61/564,860, filed on Nov. 29, 2011.

(30) Foreign Application Priority Data

Nov. 29, 2011   (KR) .......................... 10-2011-0125918
Nov. 29, 2011   (KR) .......................... 10-2011-0125919

(51) Int. Cl.
*G06F 7/02*        (2006.01)
*G06F 17/30*       (2006.01)
*H04L 12/58*       (2006.01)

(52) U.S. Cl.
CPC .......... *H04L 51/32* (2013.01); *G06F 17/30259* (2013.01); *G06F 17/30289* (2013.01); *G06F 17/30861* (2013.01); *G06F 17/30864* (2013.01)

(58) Field of Classification Search
CPC ................... G06F 17/30861; G06F 17/30873; G06F 17/30864; G06F 17/30259; G06F 17/30289
See application file for complete search history.

(56) References Cited

U.S. PATENT DOCUMENTS

| 7,925,743 | B2* | 4/2011 | Neely et al. .................... 709/224 |
| 8,554,756 | B2* | 10/2013 | Gemmell et al. ............. 707/706 |
| 2007/0073775 | A1* | 3/2007 | Walker et al. .............. 707/104.1 |
| 2008/0228746 | A1* | 9/2008 | Markus et al. ..................... 707/5 |
| 2008/0294607 | A1* | 11/2008 | Partovi .................. G06Q 30/00 |
| 2011/0145348 | A1* | 6/2011 | Benyamin et al. ............ 709/206 |
| 2011/0196855 | A1* | 8/2011 | Wable et al. .................. 707/711 |
| 2011/0231416 | A1* | 9/2011 | Goodchild Drake ............... G06F 17/30864 707/754 |
| 2012/0005224 | A1* | 1/2012 | Ahrens .................. G06Q 10/10 707/769 |
| 2012/0047219 | A1* | 2/2012 | Feng et al. .................... 709/207 |
| 2013/0103667 | A1* | 4/2013 | Minh ............................ 707/709 |
| 2013/0103686 | A1* | 4/2013 | Sisneros ...................... 707/736 |
| 2013/0124499 | A1* | 5/2013 | Liau ............................. 707/709 |
| 2013/0159254 | A1* | 6/2013 | Chen et al. .................... 707/639 |

FOREIGN PATENT DOCUMENTS

| JP | 2009205517 A | 9/2009 |
| KR | 10-2007-0109329 A | 11/2007 |
| KR | 10-1004352 A | 12/2010 |
| KR | 1020110085829 A | 7/2011 |
| KR | 1020100133084 A | 12/2011 |

* cited by examiner

*Primary Examiner* — Bruce Moser
(74) *Attorney, Agent, or Firm* — Merle W. Richman, Esq.

(57) ABSTRACT

Embodiments of social media listening, analytics, and engagement systems and method are described herein where a system user may listen to and analyze social media content based on one or more key terms. The system may expand the key terms and listen to additional social media content based on the expanded terms. The system may also enable a user to engage social media participants related to the social media content via multiple campaigns. Other embodiments may be described and claimed.

20 Claims, 53 Drawing Sheets

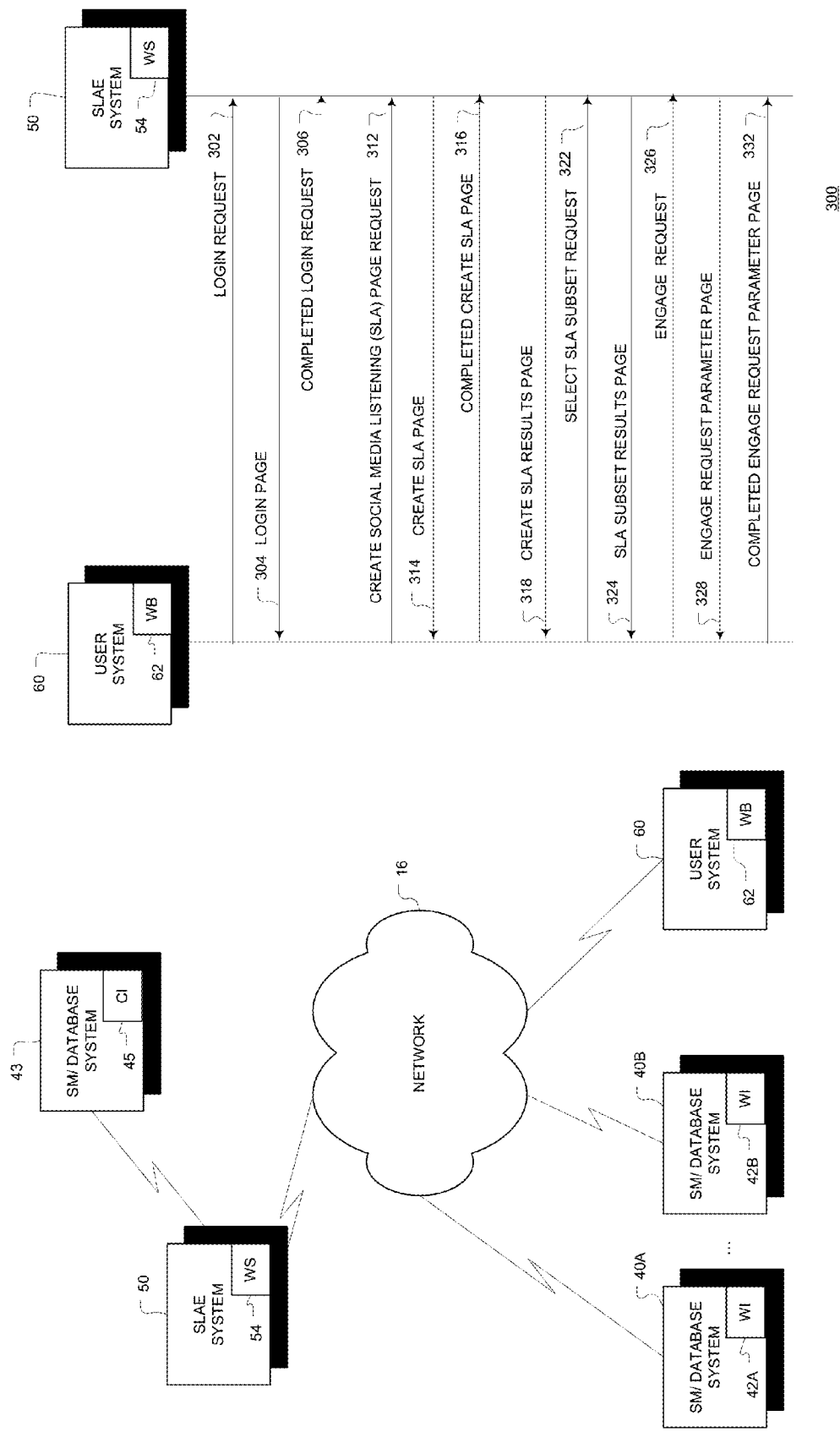

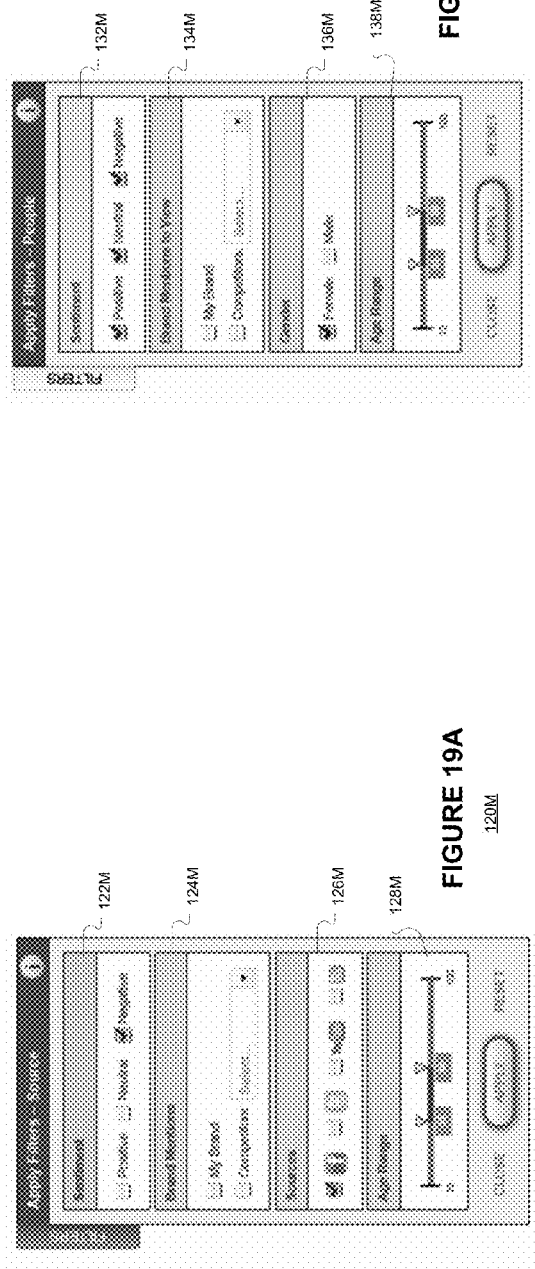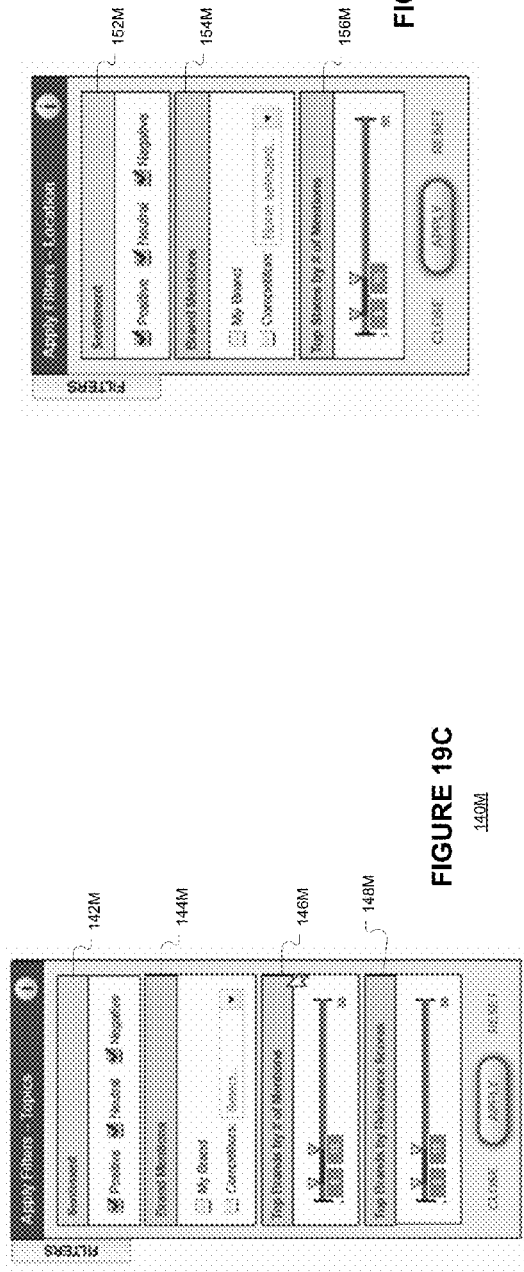

SOCIAL DIALOGUE LISTENING, ANALYTICS, AND ENGAGEMENT SYSTEM AND METHOD

CROSS REFERENCE TO RELATED APPLICATIONS

The present application is related to and claims priority to U.S. Provisional Application No. 61/564,860, entitled "SOCIAL DIALOGUE LISTENING, ANALYTICS, AND ENGAGEMENT SYSTEM AND METHOD", filed Nov. 29, 2011, Korean Application Number 10-2011-0125918, entitled "SOCIAL DIALOGUE LISTENING, ANALYTICS, AND ENGAGEMENT SYSTEM AND METHOD", filed Nov. 29, 2011, and Korean Application Number 10-2011-0125919, entitled "SOCIAL DIALOGUE LISTENING, ANALYTICS, AND ENGAGEMENT SYSTEM AND METHOD", filed Nov. 29, 2011, each of which is incorporated by reference.

TECHNICAL FIELD

Various embodiments described herein relate generally to social media including linked and unlinked messages, online forums, and blogs monitoring systems including apparatus, systems, and methods used in online or electronic dialogue or social media monitoring and engagement systems.

BACKGROUND INFORMATION

A social dialogue listening, analytics and engagement system may capture and analyze communications including all types of media such video, picture, and text between social media participants or posters of content and dialogue in general. A social dialogue listening, analytics and engagement system application user may provide one or more keywords to direct the listening and capture of social media including linked and unlinked messaging, online forums, and blogs content. It may be desirable to expand the social dialogue data capture and enable engagement of one or more participants of a social media, including linked or unlinked messages, online forums, and blogs.

BRIEF DESCRIPTION OF THE DRAWINGS

FIG. 1A is a block diagram of a social media including linked and unlinked messages, online forums, and blogs listening, analytics and engagement (SLAE) architecture according to various embodiments.

FIG. 2 is a diagram of communications between an SLA application user system and a SLAE system according to various embodiments.

FIG. 19A illustrates a source filter tab GUI display for selecting source related filter options according to various embodiments.

FIG. 19B illustrates a people filter tab GUI display for selecting people related filter options according to various embodiments.

FIG. 19C illustrates a topic filter tab GUI display for selecting topic related filter options according to various embodiments.

FIG. 19D illustrates a location filter tab GUI display for selecting location related filter options according to various embodiments.

FIG. 35A illustrates a SLA subset main micro-site campaign display according to various embodiments.

FIG. 35F illustrates a SLA subset general micro-site campaign display for creating a micro-site engagement campaign story according to various embodiments.

FIG. 35K illustrates a SLA subset general micro-site campaign display for moderating posts and managing associated user accounts on a micro-site engagement campaign according to various embodiments.

FIG. 35L illustrates a SLA subset general micro-site campaign display for editing, adding, and tracking resources on a micro-site engagement campaign according to various embodiments.

DETAILED DESCRIPTION

Figure 1B:
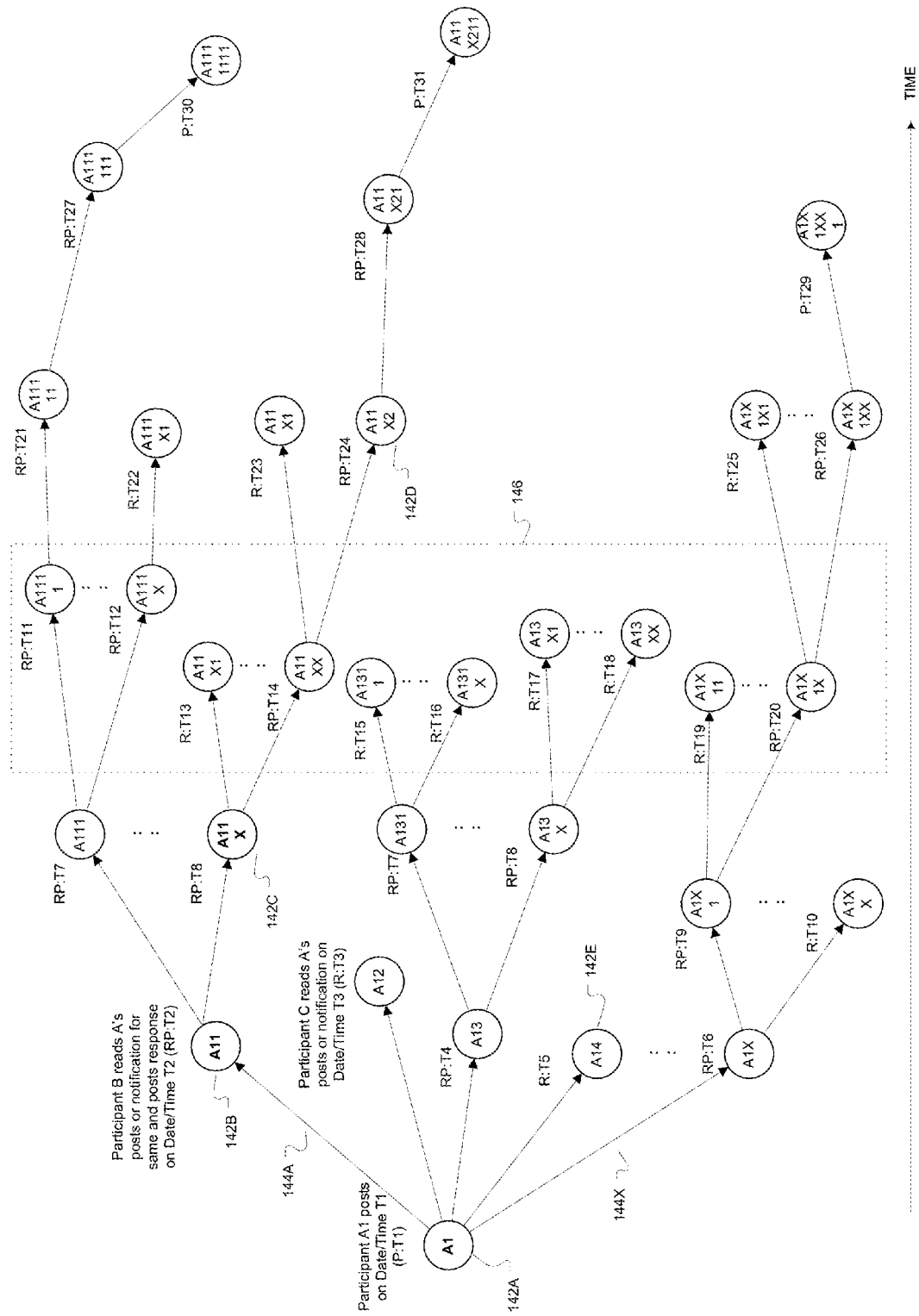
FIG. 1B is a block diagram of a social media communication dynamics according to various embodiments.

FIG. 1A is a block diagram of online social media including linked and unlinked messaging, online forums, and blogs content listening, analytics and engagement (SLAE) architecture 10 comprising an application user system 60, a SLAE system 50, and online social dialogue or linked and unlinked messaging, online forums, and blogs content provider or enabler (SMP) or database systems 40A, 40B according to various embodiments. An application user system 60 may communicate with the SLAE system 50 via a network 16 where the network may be a local wired or wireless network or a network of networks such as the Internet. The SLAE system 50 may communicate with a SMP system 40A, 40B via a network 16 or directly. In an embodiment a SMP system 40A, 40B may be part of the SLAE system 50, such a micro-site campaign as discussed with reference to FIG. 35.

In an embodiment a SMP system 40A, 40B may be any system that includes information or content for one or more social media providers including linked and unlinked messaging, online forums, and blogs content provider such as Facebook®, Twitter®, Google+®, where the blog information may be provided by RDF Site Summary or Really Simple Syndication (RSS) feeds. In an embodiment linked messages may also include E-mail messages where an application user may employ the SLAE system locally to analyze their E-mail activity. In another embodiment an E-mail enabler such as Google®, Yahoo®, Hotmail®, and others may provide select E-mail communications for analysis by the SLAE system 50. In an embodiment a SMP may provide data source adapter modules (70 in FIG. 4) to enable a SLAE 50 to retrieve/capture communications, messages, threads, and participant information including geographical and demographical participant information. The SMP systems 40A, 40B may provide the data on an anonymous basis, assign avatars for participant, or provide the participant SM avatar along with noted information. A SLAE 50 system may mask the actual SM avatar to protect SM participant's privacy.

Figure 6:
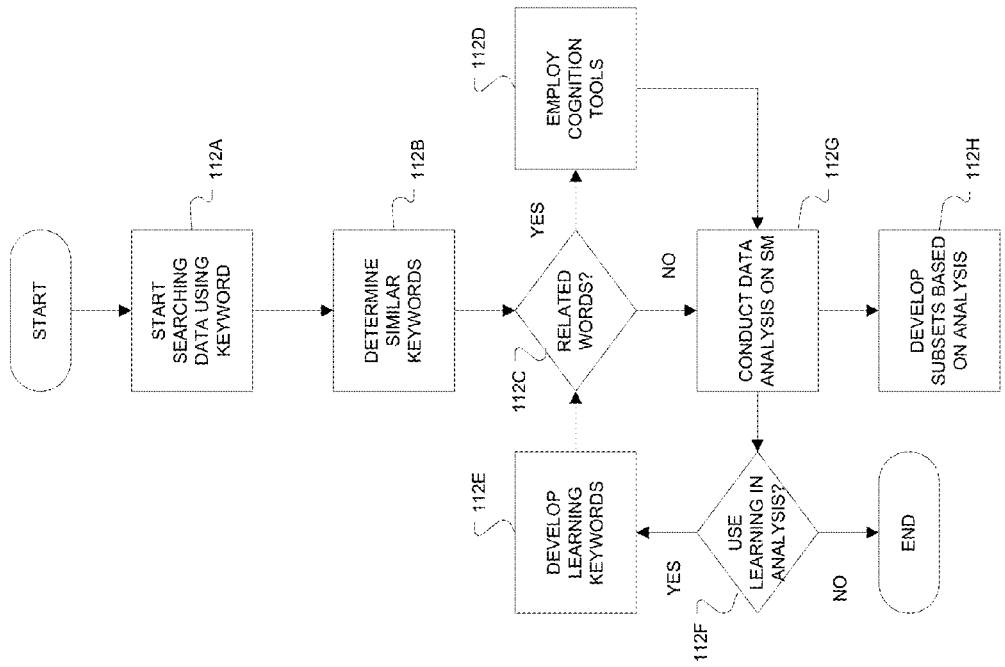
FIGS. 5-6 are flow diagrams illustrating several methods according to various embodiments.

A SLAE system 50 may continuously scrape SMP systems 40A, 40B to locate SM including linked and unlinked messaging, online forums, and blogs content that meet one or more criteria or factors as delineated by an application user system 60 or formulated by the SLAE system 50 as shown in FIG. 6. A SLAE 50 may store located or scraped SM data from SMP systems 40A, 40B to provide past demographical, biographical, and geographical information for the selected or formulated criteria and SM participants and to aid in the analysis of SM data and related participants.

In an embodiment a SLAE 50 may use an application programming interface (API) or adapter (70) to request data from or communicate data with a SMP system 40A, 40B. A SMP system 40A, 40B may employ a search protocol based on a SLAE 50 request and provide SM data in a predetermined format or an un-determined format. A SMP system 40A, 40B may also provide a raw data stream to the SLAE system 50 that the SLAE system 50 may parse based on various application user's criteria and SLAE system 50 formulated criteria. A SLAE 50 may employ semantic language and heuristics searches and natural language processing to develop queries for the SMP systems 40A, 40B and to analyze data provided by SMP systems 40A, 40B as described below with reference to FIG. 6. An application user via a system 60 may provide one or more terms where a SLAE 50 may to expand the user supplied criteria.

In an embodiment the SLAE system 50 may include a web-server 54 where the web-server 54 may be configured to communicate messages, graphical user interfaces, and other content with a user system 60. The web-server 54 may also be configured to communicate messages and content with a SMP system 40A, 40B. In an embodiment, a user system 60 may host a web browser application 42 such as Internet Explorer, Safari, Netscape, Chrome, Firefox, or Opera 34 that may be configured to communicate messages and content with the SLAE system 50. In an embodiment a SMP system 40A, 40B and application user system 60 may be any computer device capable of hosting an interface that can communicate with the SLAE system 50 including a web browser application 42 including a personal computer, personal data assistant, or web enabled cellular phone or web enabled tablet computer.

In an embodiment the SLAE system may employ a Ruby on Rails architecture to provide web pages or wire frames to an application user system 60. The SLAE system may also employ Software as a Service (SaaS) to provide data and executable instructions to application user system 60 and the SLAE system 50 webpages may be built using on a Rudy on Rails framework or other web frameworks. In an embodiment an application user system 60 may host an application operating natively where the application communicates data with the SLAE system 50 (such as application downloaded from an application provider or provided by the SLAE system 50). An application user system 60 may use various operating systems including Microsoft operating systems (Windows), Linux, Mac OS X, Android, WEB OS, and others to run a SLAE interface program or web browser. In an embodiment a SLAE system 50 or a SMP system 40A, 40B may provide an interface application to run natively on an application user system 60.

FIG. 1B is a block diagram of a social media including linked and unlinked messaging, online forums, and blogs content communication dynamics 140 according to various embodiments. In FIG. 1B communication dynamics between various SM participants is presented graphically with nodes 142A-E. A participant A1 at a time and date T1 may generate social media content via a SMP including posting picture, video, text, via a SMP. One or more SMP participants that may or may not be using the same SMP that A1 employed to post may receive a notification or observe the post (participants A11 to A1X where the nomenclature A11 to A1X is a SMP participant that has seen the A1 participant post).

It is noted that X could be thousands as a function of A1 participant and the SMP, e.g., a political leader posting their intention to switch political parties. The participants A11 to A1X may note the A1 post at various times/dates T2-T6. Some participants A11, A13, A1X may comment, forward, or otherwise propagate the initial A1 post, denoted as read/post at time Tx (RP:Tx), other participants may not propagate or respond in any manner to the A1 post (at least not electronically), denoted as R:Tx (A12, A14 in FIG. 1B). As shown in FIG. 1B the effect of the initial post by participant A1 may reach a massive group of SMP participants (become viral) and in some cases fail to propagate after a certain time and date P:T31. The SLAE system 50 may analyze the growth of dialogue between SMP participants related to certain SM sets and subsets. The SLAE system 50 may attempt to predict when a peek response may occur (such as 146 in FIG. 1B) and note that some participants are more active or influential (A1 142A, A11 142B, A11X 142C) while other SMP participants follow (A14 142E, A11X2 142D).

FIG. 2 is a diagram of communications 300 between a SLAE system 50 and an application user system 60 according to various embodiments. In an embodiment the SLAE system 50 may provide information about social media (SM) content or linked message located, communicated, or scraped from SMP systems 40A, 40B or an internal SLAE database 74 (such as from a SLAE system 50 hosted micro-site (FIG. 35)). The SLAE system 50 may also provide geographical and biographical information about SM content generators, authors, or participants that are linked to SM content identified by the SLAE system 50. A user via an application user system 60 may provide content timing requirements or windows including times, dates, biographical, demographical, and geographical criteria or requirements. An application user via an application user system 60 may provide user specific parameters as queried by the SLAE system 50 to limit SM content presentations. Based on the user specific requirements and expansion of same by the SLAE 50 (FIG. 6), a SLAE 50 may search or scrape data in or request data from a SMP system 40A, 40B to SM content meeting the application user's times, dates, biographical, and geographical criteria or requirements.

The SLAE system 50 may enable an application user to view the retrieved content using graphical and chart based formats along with statistical information related to the content and the effective content providers (SM authors or participants). The SLAE system 50 may enable an application user via a system 60 to engage one or participants of a SMP via one or more media or communications inserted in the respective SMP including across multiple SMP platforms (one to many—one application user to many SMP participants across many SMP platforms). A SLAE system 50 may also engage one or participants of a SMP by becoming an effective SMP. In an embodiment a SLAE system 50 may host a micro-site and invite participants located via SMP content searches meeting various user criteria. An application user may moderate and accelerate participant activity via one or more reward programs including coupons or rewards for various goods and services including goods and services provided by the application user.

Figure 40:
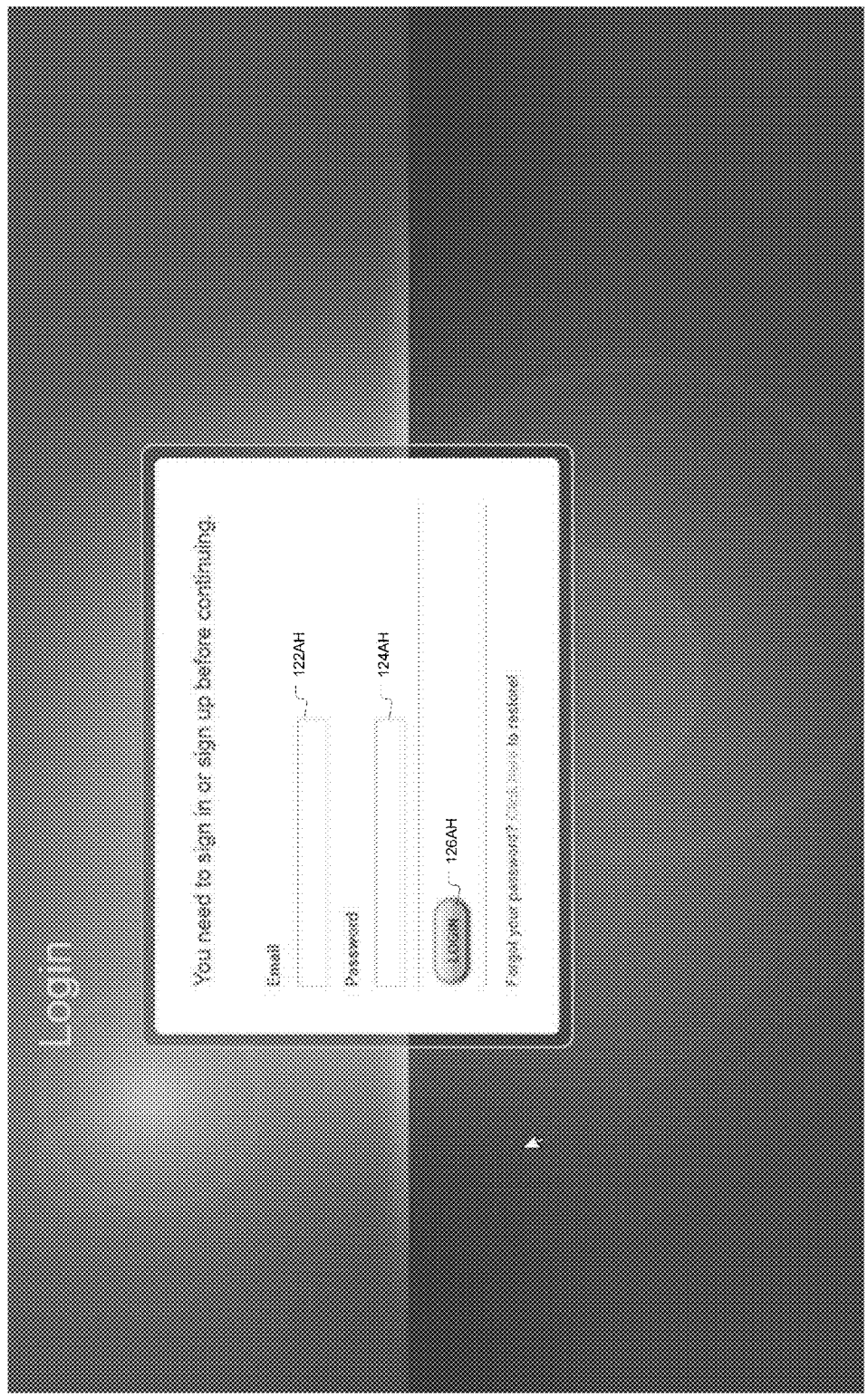
FIG. 40 illustrates a login display to enable application users to access the SLAE system according to various embodiments.

In an embodiment an application user via a user system 60 interface or web browser 62 may generate or populate a login request 302 that is processed by the SLAE system 50 such as invoking an application that links with the SLAE 50 and requesting a login web page via a web browser. A SLAE system 50 may receive a login request or application start and generate a login page 304 (FIG. 40 120AH). An application user via an application user system 60 may complete the login page 304 (FIG. 40, Email 122AH, Password 124AH, login button 126AH) and forward a completed login request 306. In an embodiment an application user of the SLAE system 50 may be required to login to provide security between the application users and the SLAE system 50. In an embodiment an application user via an application user system 60 may be automatically login based on their system 60 and data stored in an application system 60 (application data, web browser cookies, and other stored data).

Figure 14:
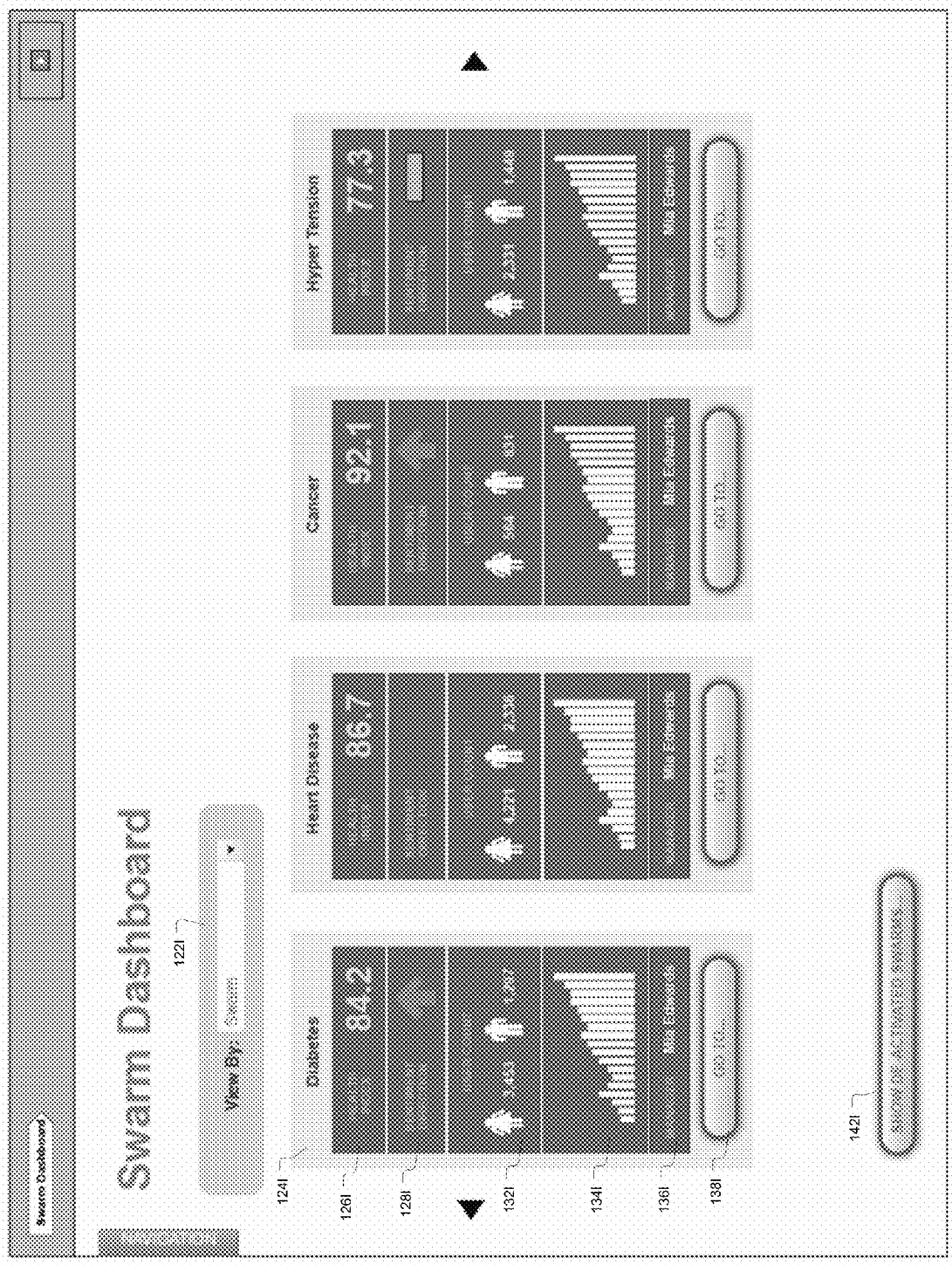
FIG. 14 illustrates a SLA sets dashboard GUI display for viewing SLA sets status and navigating to a SLA set according to various embodiments.

In an embodiment the SLAE system 50 may provide a social media listening and analysis (SLA) sets/subsets dashboard graphical user interface (GUI) display for viewing SLA sets/subsets status and navigating to a SLA set/subsets via an application user system 60 (120I, FIG. 14). An application user may request to create a SLA set (group of data from a SMP based on user provided and system 50 expanded criteria) page. In an embodiment a user via system 60 may select the navigation tab (124L in FIG. 17), and select "create new swarm" from the navigation tab menu (124L in FIG. 18A) to generate a create SLA page or display request 312. In an embodiment, the SLAE system 50 may automatically provide or create a new SLA set display or page (120A in FIG. 7) when a user via an application user system 60 logs into the SLAE system 50 and the user currently has no active SLA sets.

In response to the selection or request 312, a SLAE system 50 may provide an initial create new SLA set page or display (120A, FIG. 7) 314. A user via an application user system 60 may enter SLA set creation criteria via one or more displays (120A, 120B, 120C, 120D, 120E, 120F in FIGS. 7 to 12) 316. The SLAE system 50 may provide a SLA set completion or results page or display 318 (120F, FIG. 13). In an embodiment the SLAE system 50 display or page 318 (120F, FIG. 13) may enable a user via an application user system 60 to view results by selecting "Swarm" or SLA Set dashboard (122G in FIG. 13) where a SLA Set or Swarm dashboard 120I is shown in FIG. 14. The dashboard 120I shows one or more SLA sets or Swarms that the SLAE system 50 is watching or "listening to" based on selected or expanded user criteria provided during a SLA set or Swarm creation (FIGS. 7 to 12).

As noted a SLAE system 50 may expand a SLA set creation request to create subsets or themes. A user via an application system 60 may request a display listing any SLA subsets created by the SLAE system 50. In an embodiment a user may select a SLA subset request 322 by selecting a SLAE set 138I in FIG. 14 of a Swarm Dashboard 120I in FIG. 14. The SLAE system 50 may generate a SLA subsets or themes dashboard GUI display for viewing SLA subsets of a SLA set (SLA Subset results page 324) shown as such in FIG. 16, 120K. An application user may want to engage one or more participants of SLA set or SLA subset. A user via an application user system 60 may request engagement (326) for a SLA set or SLA subset by selecting engage on various displays of the SLAE system 50 including 120L of FIG. 17, 120O of FIG. 21, 120P of FIG. 22, 120Q of FIG. 23, 120R of FIG. 24, 120S of FIG. 25, 120T of FIG. 26, 120U of FIG. 27, 120V of FIG. 28, 120W of FIG. 29, 120X of FIG. 30, 120Y of FIG. 31, 120Z of FIGS. 32, and 120AA of FIG. 33, in an embodiment.

Figure 31:
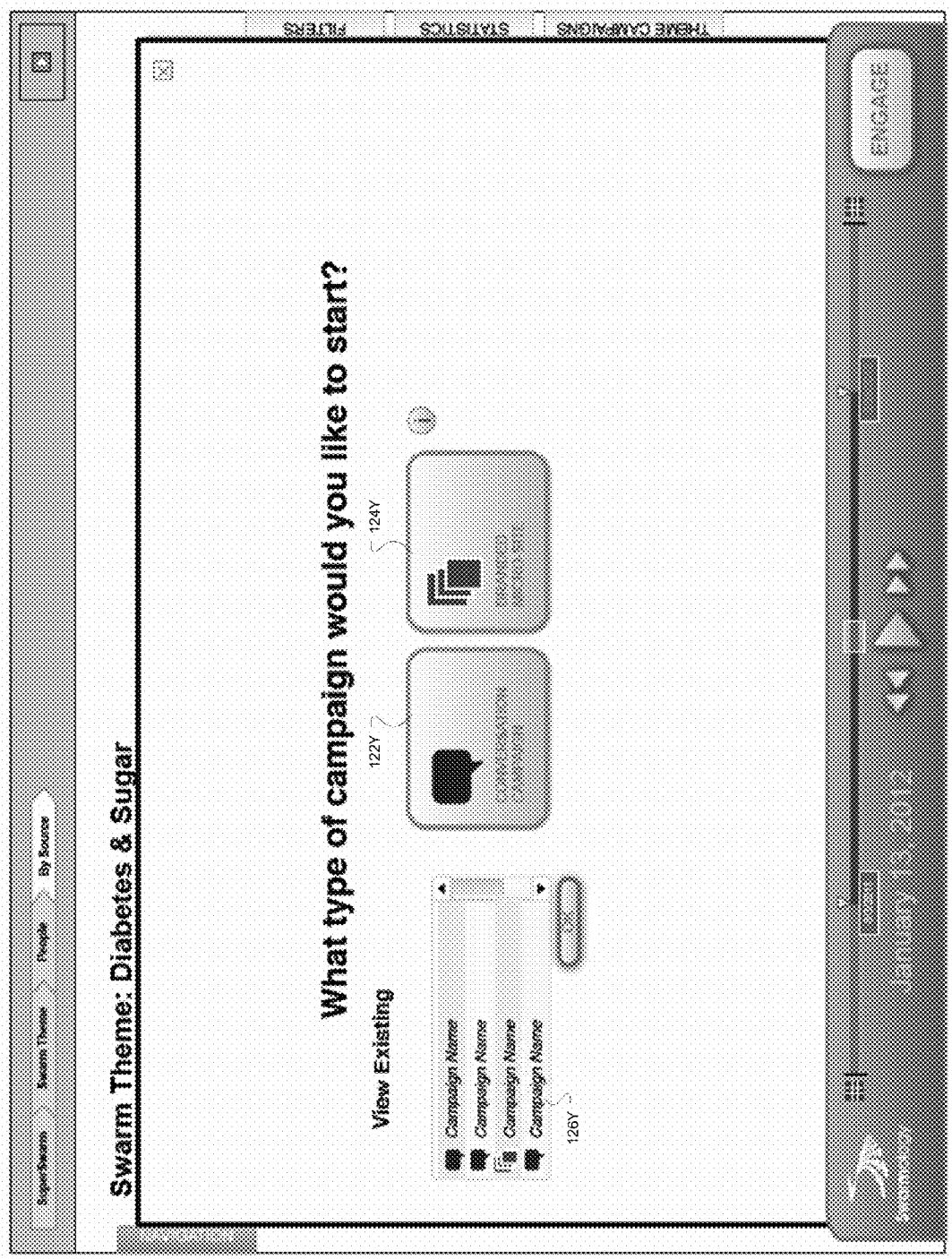
FIG. 31 illustrates a SLA subset engage display for selecting an existing campaign or creating a new campaign based on engagement or campaign type according to various embodiments.
Figure 36:
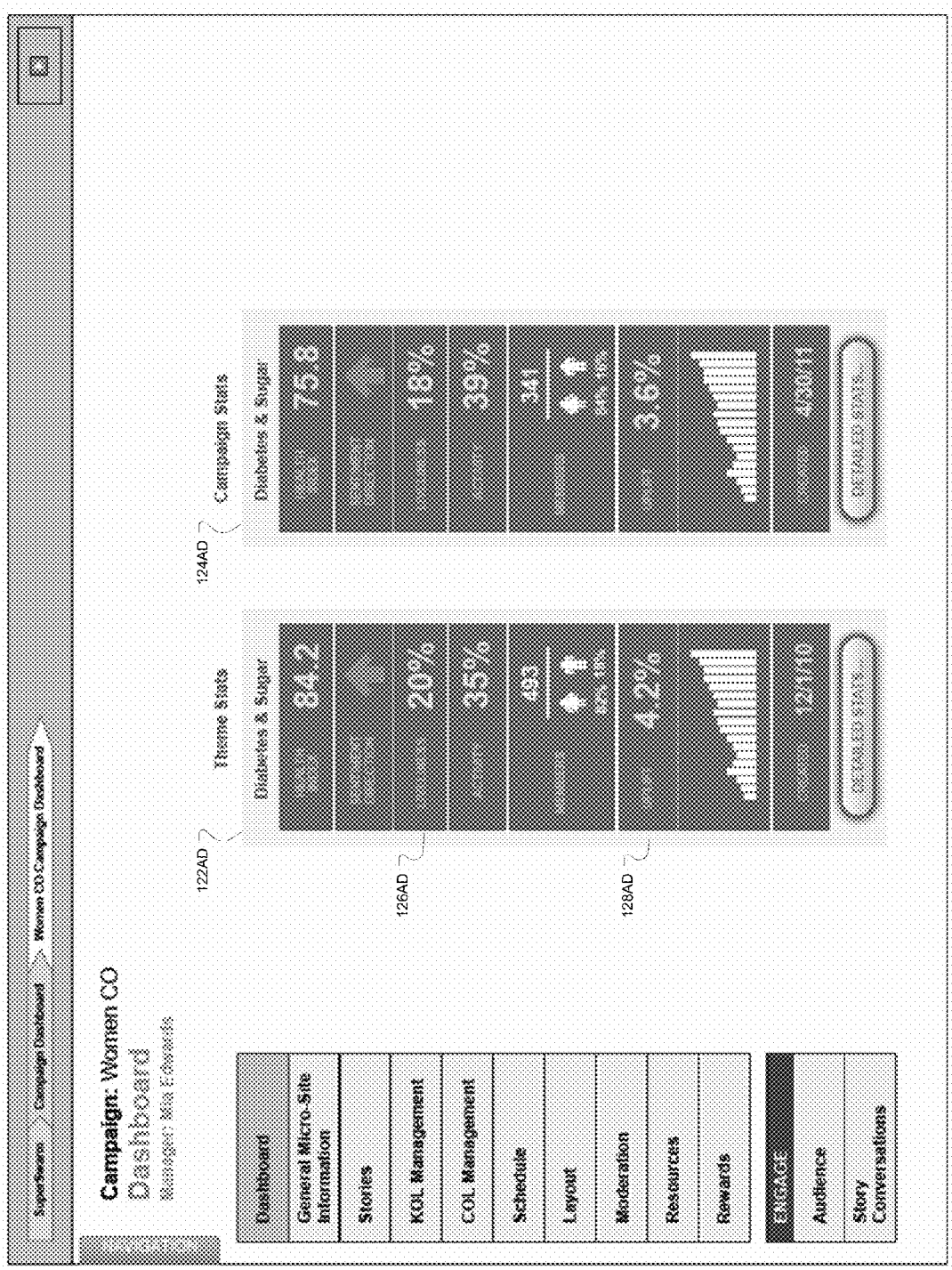
FIG. 36 illustrates a SLA micro-site campaign dashboard display for viewing SLA subset micro-site campaign statistics according to various embodiments.
Figure 37:
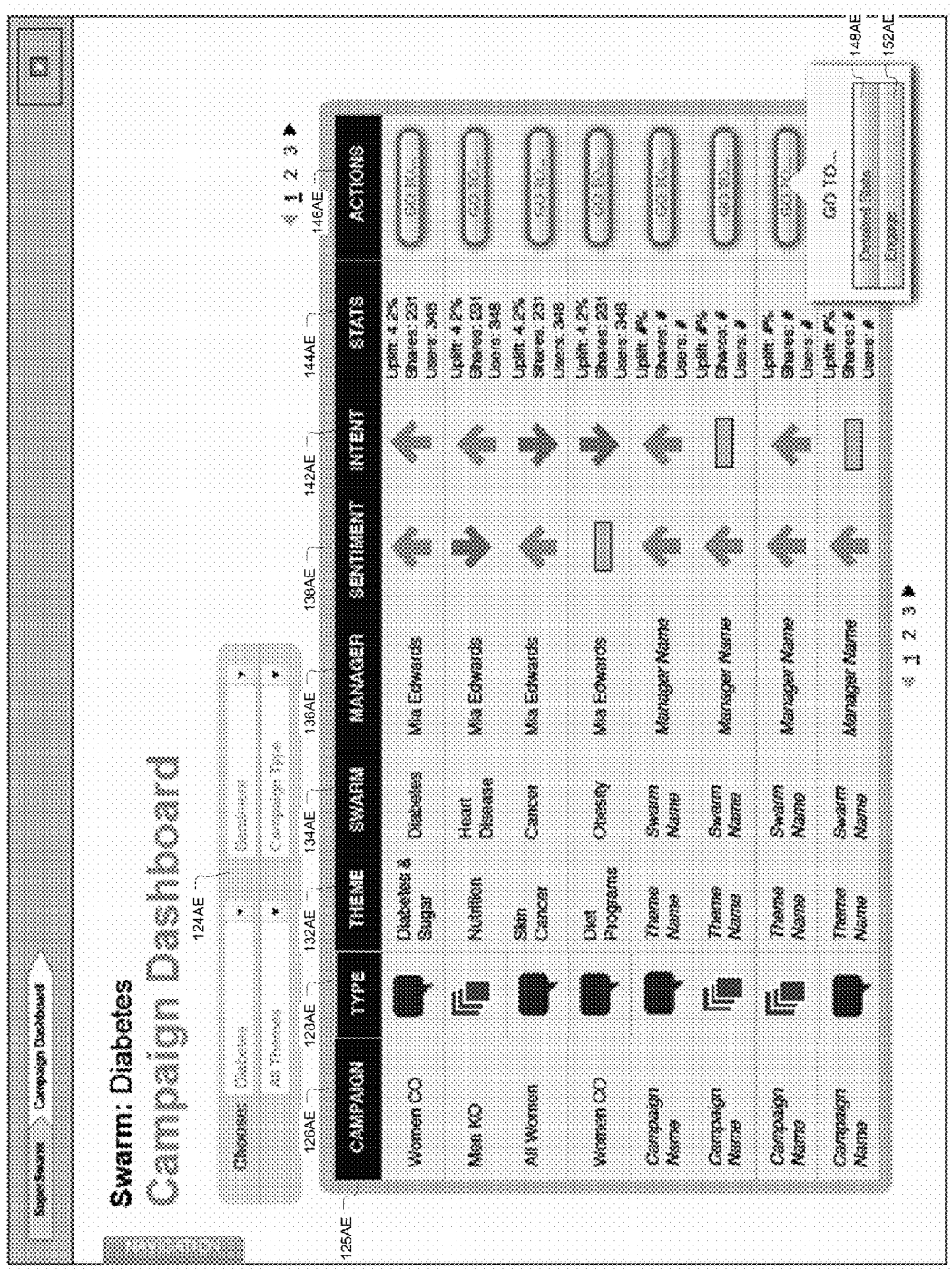
FIG. 37 illustrates a SLA set and subset campaign dashboard display for viewing existing campaigns for SLA sets and subsets and sentiment and intent status according to various embodiments.

In response to the engage request 326, a SLAE system 50 via an application user system 60 may display an engage request parameter page 328 such as display 120Y of FIG. 31. A user may elect various engagement campaigns in an embodiment including a conversation campaign 122Y and a branded micro-site campaign 124Y, and elect to engage an existing campaign 126Y. A SLAE system 50 may provide a conversation campaign display or page 120Z of FIG. 32 when a new or existing conversation campaign is selected. The SLAE system 50 may provide a micro-site campaign display or page 120AC of FIG. 35B when a new or existing micro-site campaign is selected. A SLAE system 50 may also provide a status or completed engage request page 332 showing the status of the engagement campaign. FIG. 36 depicts an engagement campaign status page or display 120AD for a micro-site campaign for a SLA subset (Swarm theme) 122AD. An example of SLA set campaign dashboard is shown in FIG. 37. FIG. 37 depicts an engagement status page or display 120AE for SLA set (Swarm).

Figure 3:
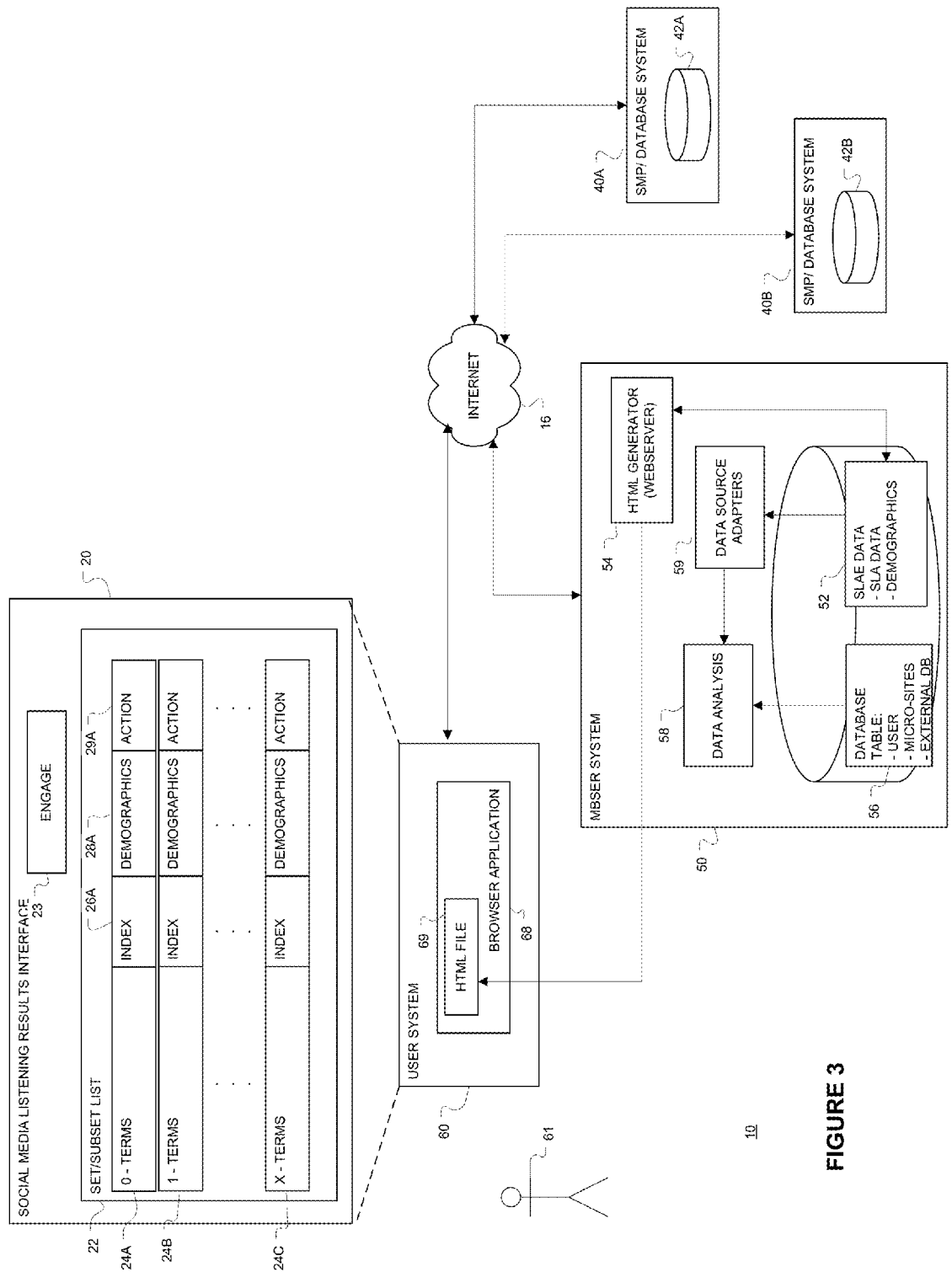
FIG. 3 is a block diagram of SLAE architecture according to various embodiments.

FIG. 3 is a system diagram of an SLAE system architecture 10 including an application user computer system 60, the SLAE system 50, and SMP/database systems 40A, 40B coupled to a network 16 (e.g., the Internet). An application user 61 may use the computer system 60 to monitor and engage one or more SMP via a SLAE system 50. A SMP system 40A, 40B may provide SM content via requests or adapters (70, FIG. 4) to A SLAE system 50. The system 60 may include interfaces to communicate with a server 54 on the SLAE system 50. In an embodiment the interface may include a browser application 68 that resides on the computer system 60 and the server 54 may be a web-server 54 that generates browser displayable content such as hypertext markup language (HTML). In an embodiment the web-server 54 may employ a Ruby on Rails framework to generate browser displayable content. In another embodiment, a SLAE 50 may generate content to be displayed by an application resident on the computer system 60.

A SLAE system 50 may include the web-server module 54, a SMP data source adapters module 59, a SMP data analysis module 58, an applications/micro-site database 56, and a SMP/SLA database 52. The applications/micro-site database 56 may store information about the application users, micro-sites and related campaign data, backup of SMP data or content from external databases. The SLAE database 52 may include located or scraped SMP content and data, analyzed data, and related statistical information. The databases 52, 56 may employ Greenplum (www.greenplum.com), Hadoop (hadoop.apache.org) HTTP Filer Server (HFS), and PostgreSQL (www.postgresql.org) software and hardware to maintain the databases 52, 56. The system 50 may also store data on one or more cloud clusters or distributed systems.

Figure 4:
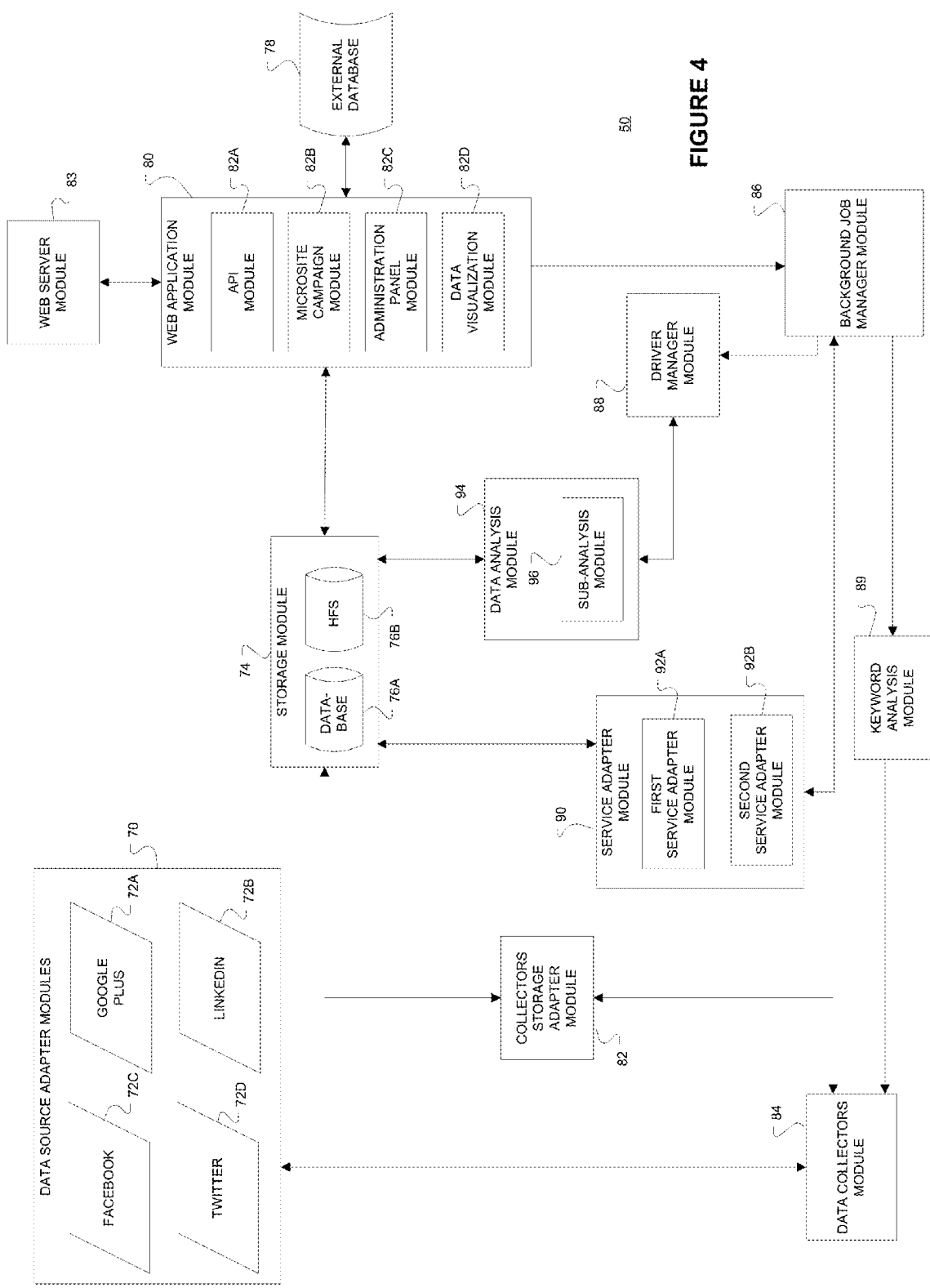
FIG. 4 is a block diagram of SLAE system according to various embodiments.

The data source adapter module 59 may include one or more software adapters specific to one or more SMP including, but not limited to, a Facebook adapter 72C, Google Plus adapter 72A, Twitter adapter 72D, and LinkedIn adapter 72B as shown in FIG. 4. A SMP may provide an adapter 72A to 72D to enable a SLAE 50 to request and receive SMP content. The adapter 72A to 72D may require key-terms or may provide a raw data stream of content or data to be analyzed by a SLAE 50. Other SMP content or data providers may deliver data via other protocols. The data analysis module 58 may analyze data or content provided by a SMP via an adapter or other source. The data analysis module 58 may include $3^{rd}$ party data analytic software or hardware including Cognition, Hadoop Mapireduce, and Klout. The data analysis module 58 may also format the SMP content or data to a format for storage in a SLAE system 50 database 58, 52.

In FIG. 3 an application user 61 via a computer system 60 may submit a search or status request for a SM set or subset via the browser application 68. The SLAE system 50 HTML generator application 54 may retrieve SM set/subset status data from database 52. The web-server 54 may populate an HTML file 69 with SM set/subset status data provided by the database 52. The web-server 54 may forward the HTML file 69 to the application user computer system 60 via the network 16. The browser application 68 may generate the SLA results interface/display 20 (such as 120J in FIG. 15) in a user perceptible format.

The SLA results interface/display 20 may include search query information 23 and a search result section 22. The SLA results interface/display 20 may a list of active social media set and subsets 22. The set/subset list 22 may include item information for 0 to X (24A to 24C) active SM sets/subset including key terms related to the SM set/subset, an index 26A, demographic information 28A, and an action option 29A. The terms 24A for a SM set/subset may include one or more key terms that define the located SM conversations, streams, or data represented by a SM set or SM subset. The index 26A may be a combination of statistics related to social media activity. The index 26A may also include statistics related to a specific category of conversations, streams, or SM data. In an embodiment the index 26A is a number representing the sum of one or more statistics determined for the related SM set or subset, a combined index termed a Health Index in an embodiment.

The demographics 28A may include information related to the authors or participants of SM conversations, streams, or SM data that comprise the SM set or subsets. The demographics may recite the sex and age of various SMP participants. The action function or module 29A may enable an application user to select more details about a specific SM set or subset. The SLA results interface/display 20 engage function or module 23 may invoke an engage campaign function of the SLAE system 50 (including display 120Y in FIG. 31).

In an embodiment the item terms 24A, index 26A, demographics 28A, action 29A, and engage 23 fields may include a hypertext link to the SLAE system 50 web-server 54. Upon selection of one of these fields, the SLAE system 50 may prepare and forward another display 120A (FIG. 7) to 120AH (FIG. 40). As noted selecting the engage field or module 23 may cause the SLAE system 50 to invoke an engage campaign function of the SLAE system 50 (including display 120Y in FIG. 31). Selecting the demographics field or module 28A may cause the SLAE system 50 to generate a more detailed demographic page or display (such as display 120R, FIG. 24) for the related SM set or subset.

FIG. 4 is a block diagram of SLAE system 50 according to various embodiments. As shown in FIG. 4 the system 50 includes a web application module 80, a web server module 83, a background job manager module 86, a driver manager module 88, an external database 78, a keyword analysis module 89, a data collectors module 84, a collections storage adapter module 82, a service adapters module 90, a storage module, and a data analysis module 94. The web application module 80 may be coupled to the web server module 83, an external database 78, the storage module 74, and the background job manager module 86. The web application module 80 may include an application programming interface (API) module 82A, a micro-site campaign module 82B, an administration panel module 82C, and a data visualization module 82D.

The web application module 80 may be implemented via a Ruby on Rails framework and generate and receive various webpages and data from an external system including an application user system 60 and SMP database system 40A, 40B via the web server module 83. The web server module 83 may communicate with webpages and data between the web application module 80 and an external system including from an application user system 60 and SMP database system 40A, 40B. The API module 82A may translate data or content communicated with the web server module 83, storage module 74, and external database 78. The microsite campaign module 82B may generate displays for creating, maintaining, and viewing microsite campaigns including displays 120AC, 120AI, 120AD, 120AF of FIG. 35B, FIG. 35A, FIG. 36, and FIG. 38.

Figure 29:
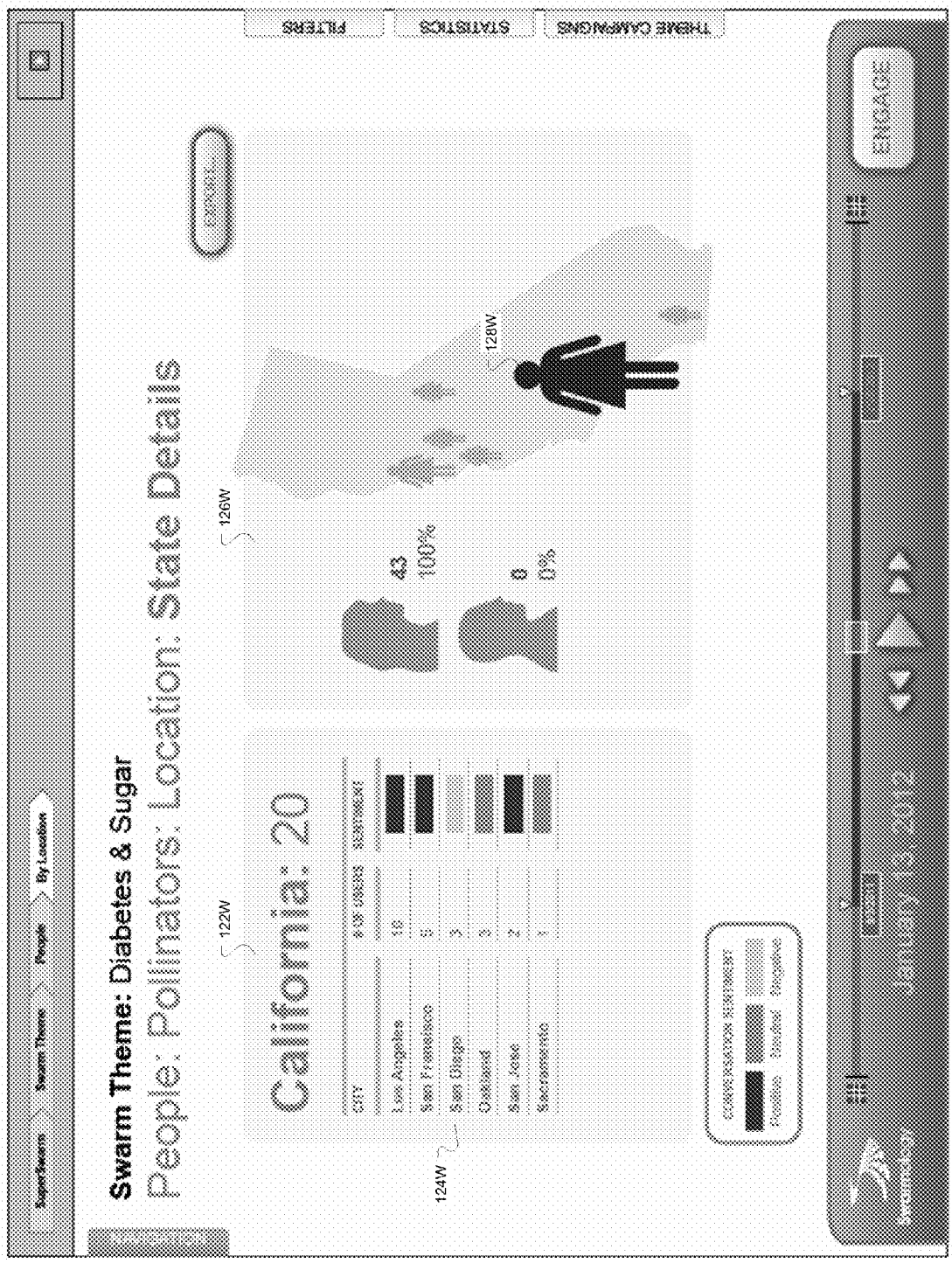
FIG. 29 illustrates a SLA subset of people, location graph based GUI display for viewing SLA subset specific-type participants by state or limited geographical location according to various embodiments.
Figure 30:
FIG. 30 illustrates a SLA subset of people, location, topics graph based display for viewing SLA subset specific-type participants activity by geographical location and conversation topics according to various embodiments.
Figure 39:
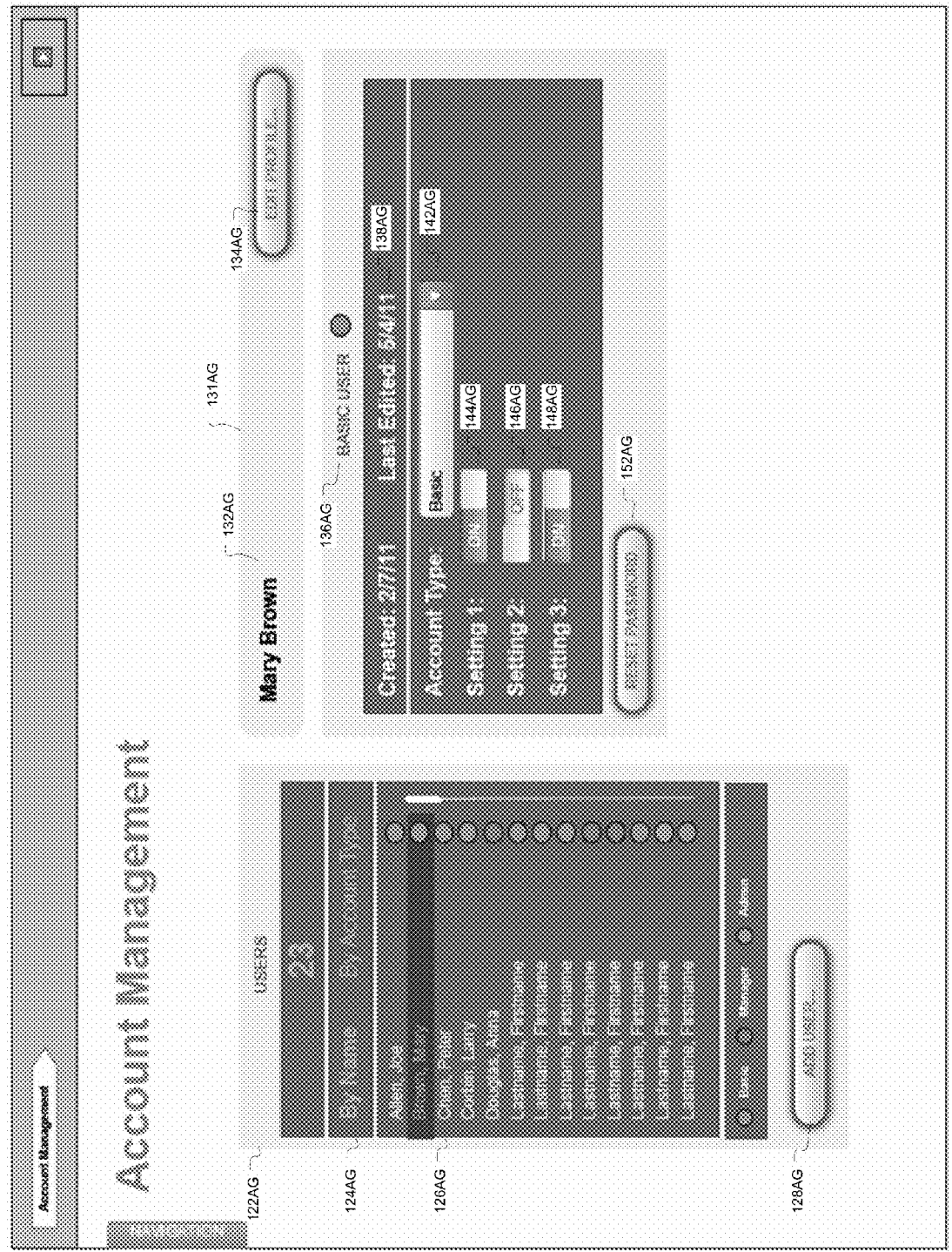
FIG. 39 illustrates a system account management display for managing SLA application users according to various embodiments.

The administration panel module 82C may generate displays for creating, maintaining, and viewing application users of the SLAE system 50 including the display 120AG of FIG. 39. The data visualization module 82C may generate displays including graphs and plots such as the displays 120L (FIG. 17), 120O (FIG. 21), 120P (FIG. 22), 120R (FIG. 24), 120S (FIG. 25), 120T (FIG. 26), 120V (FIG. 28), 120W (FIG. 29), 120X (FIG. 30). In each of the modules 82B to 82D of web application module 80, data included in the webpages generated by the modules 82B to 82D may be provided by a storage module 74 and external database 78 via the API module 82A.

The external database 78 may be one or more databases that may include SMP content or data. The external database 78 may be shared by the SLAE system 50 with other data analytic systems in an embodiment. The external database 78 may also be distributed over many databases including cloud storage provided by a $3^{rd}$ party. In an embodiment the external database 78 or a portion thereof may include a PostgreSQL database, which is an open-source Object-Relational database management system (DBMS) supporting SQL constructs.

The data source adapter modules 70 may couple to a SMP to request and receive SMP data including conversations, streams, or SM data. Various social media providers or enablers (SMP) may provide specific data source adapters such as, but not limited to, Facebook® 72C, Google+® 72A, Twitter® 72D, and LinkedIn® 72B. A SMP via a data source adapter module 70A, 72A-D may provide conversations, streams, or SM data and geographical and demographical information for SM data posters, authors, or participants. The SMP provided data may be limited by one or more key-terms and other criteria (including date range, time range, authors, geographic, and demographic) where the SLAE system 50 provides these limitations to the SMP via a data source adapter module 70A, 72A-D. In another embodiment the SLAE system 50 may provide these limitations to a SMP via another pathway including a HTTP based request. The SMP may provide the data via HTTP.

The storage module 74 may include a database 76A and a HTTP file server (HFS) 76B. The database 76A may store accumulated, received, or scraped SMP data (including conversations, streams, or SM data and geographical and demographical information for SM data posters, authors, or participants). The database 76A may also store administrative information for application users of the SLAE system 50, micro-site data, SM set, and subset data, and other conversation campaign data. The HFS 76B may store web application module data including webpage frames or displays.

The background job manager module 86 is coupled to the keyword analysis module 89, the service adapter module 90, the web application module 80, and the driver manager module 88. The background job manager 86 may receive job requests from the web application module and direct the operation of the driver manager module 88, the keyword analysis module 89, the service adapter module 90, and the data collectors module 84 based on the received job request. The job requests may include create a new SM set with one or more keywords and criteria, engage a SM set or subset with campaign selection and criteria, and generate SM set or subset status and other information and statistics related to the SM set or subset.

The driver manager module 88 may be coupled to the background job manager module 86 and the data analysis module 94. The driver manager module 88 may direct the activities of the data analysis module 94 based on requests from the background job manager module 86. The driver manager module 88 may direct the data analysis module 94 to analyze data stored in the database 76A based on various criteria where the data may be SM content and related information (such as geographical and demographical information). The driver manager module 88 may direct the data analysis module 94 to operate on collected SM set or subset data when data is collected.

The service adapter module 90 may be coupled to the storage module 74 and the background job manager module 86. The service adapter module 90 may include a first and a second service adapter module 92A, 92B. A service adapter module 90, 92A, 92B may conduct specific analysis of SM data and related content (stored in database 76A) based on background job manager module requests 86. In an embodiment the first service adapter module 92A may be a third party module such as a Cognition® (www.cognition.com) module and the second service adapter module 92A may be a third party module such as a Klout® (www.klout.com) module. The service adapter modules 90, 92A, 92B may determine author, poster, or participant effects or influence on a SLA set (conversations, streams, and other SM data). A cognition adapter module 72A may employ English (or other language as function of conversation or stream) natural language processing (NLP), semantic and heuristic analysis to evaluate a SMP conversation or stream.

Based on the analysis the service adapter module 90 may generate additional search terms that are provided to the keyword analysis module 89 via the background job manager module 86. Such additional search terms may cause the data collectors module 84 to capture or request more SM data for analysis where the additional data may be stored in the database 76A and subsequently analyzed by the service adapter module 90. Accordingly this feedback cycle of the service adapter module 90 providing more search terms for additional SM data capture may continue until the service adapter module 90 does not generate any additional search terms. This iteration or feedback process may expand the initial search terms provided by application users to generate a SLA set and produce SLA subsets. In an embodiment the iteration or feedback process may also generate the SLA set or subset topics as described below.

The data analysis module 94 may be coupled to the storage module 74 and the driver manager module 88. The data analysis module may analysis collected SM data and related content stored in the storage module 74 when directed to execute by the driver manager module 88. The data analysis module 94 may use the search terms and related criteria to analyze the collected SM data and related content for a SM set or Swarm. The data analysis module 94 may develop SM subsets or Swarm themes based on the expanded search terms as determined by the keyword analysis module 88 and service adapter module 90 as noted above via the feedback cycle. The data analysis module 94 may further determine subsets or themes as part of its analysis. In an embodiment the data analysis module 94 may include a sub-analysis module 96. The data analysis module 94 or the sub-analysis module 96 may employ a Hadoop MapReduce) (http://hadoop.apache.org/mapreduce) algorithm to conduct a portion of the SM data and related content analysis.

The keyword analysis module 89 may be coupled to the background job manager module 86 and the data collectors module 84. The keyword analysis module 89 may receive one or more key search terms from the background job manager 86 and expand the potential key search terms using dictionaries, semantic and heuristic analysis of the provided search terms. The keyword analysis module 89 may provide the expanded search terms and search criteria to the data collectors module 84. The keyword analysis module 89 operation may be iterative and the search terms may evolve with each iteration of the feedback cycle as described above.

The data collectors module 84 may be coupled to the keyword analysis module 89, the data source adapter modules 70 and the collectors storage adapter module 82. The data collectors module 84 may receive one or more search terms and other search criteria from the keyword analysis module 89. The data collectors module 84 may direct one or more data source adapter modules 70 to provide SM data and related content meeting the search terms and other search criteria provided by the keyword analysis module 89. The data collectors module 84 may also receive unfiltered SM data and related data from one or more SMP via data source adapter modules 70 and filter the received SM data and related data based on the search terms and other search criteria. The data collectors module 84 may forward the searched or filtered SM data and related content to the collectors storage adapter module 82.

The collections storage adapter module 82 may be coupled to the data collectors module 84 and the storage module 74. The collections storage adapter module 82 may receive SM data and related content in various formats as a function of the SMP. The collections storage adapter module 82 may reformat to a standard format for storage in the database 76A. The collections storage adapter module 82 may use translation tables to reformat received SM data and related content as a function of the SMP that provided the SM data and related content.

Figure 5:
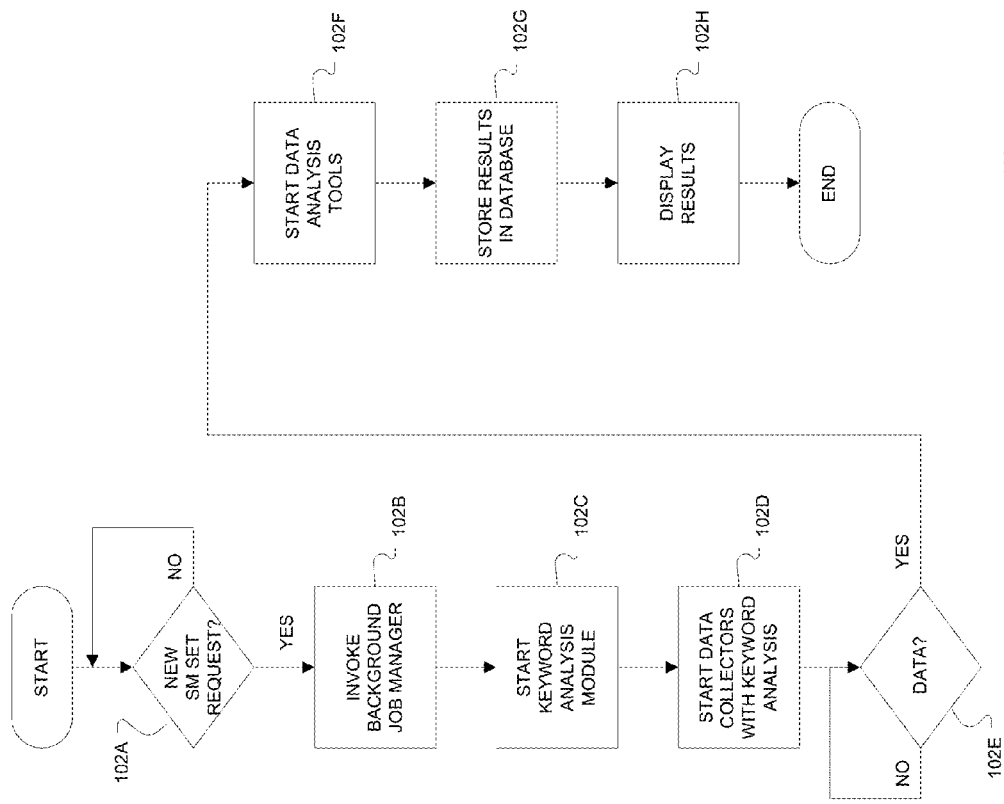

FIG. 5 is a flow diagram of a create new SM set method 100 according to various embodiments. When the SLAE system 50 receives a create new SM set (termed a Swarm or Super Swarm in an embodiment) (activity 102A), the SLAE system 50 via the web application module 80 may invoke the background job manager 102B. In order to complete a create new SM set (Swarm or Super Swarm), the web application module 80 may provide the displays (120A-G of FIGS. 7-13) to an application user. The resultant search terms and related criteria as entered by an application user via the displays (120A-G of FIGS. 7-13) and received by the web application module 80 may be forwarded to the background job manager module 86 (activity 102B).

The background job manager module 86 may forward the search terms and related data to the keyword analysis module 88 to conduct keyword analysis on the provided search terms and related search criteria (activity 102C). The keyword analysis module 88 may expand the original search terms using selected dictionaries, semantic and heuristic analysis. As noted the service adapter module 90 may expand the search terms by using NLP and semantic and heuristic analysis of collected data. The data collectors module 84 may be invoked and supplied with the expanded search terms and criteria generated by the keyword analysis module 88a and service adapter module 90 (activity 102D). As noted the data collectors module 84 may collect SM data and related content from one or more SMP via data source adapter modules 70.

When SM data and related content is collected (via the collectors storage adapter module 82 and the storage module 74 in an embodiment) (activity 102E) or retrieved from historical collections, data analysis of the collected/retrieved SM data and related content for the new SM set or Swarm may be started (activity 102F). The data analysis module 94 and the service adapter module 90 may be employed to conduct data analysis on the collected SM data and related content. The resultant SM sets and subsets and topics (Swarms and themes) and analysis may be stored in the storage module 74 (activity 102G). The newly formed SM sets and subsets may be presented to an application user via a display (activity 102H), such as display 102I of FIG. 14.

FIG. 6 is a flow diagram 110 for creating SM subsets or themes based on one or more keywords provided by an application user to form a SM set or Swarm, SM subset or themes, and topics according to various embodiments. A SLAE system 50 may start searching SM data or related content for conversations or streams based on one or more keywords (activity 112A) that may be provided by an application user 61. A SLAE system 50 via keyword analysis module 88 (in an embodiment) may determine or expand the initial keywords (activity 112B). As noted the key words or terms may be expanded by referencing one or more dictionaries and employing semantic, heuristics, and other analysis tools. When the expanded words or terms are similar (activity 112C), a Cognition algorithm may be employed to expand the keywords or terms (activity 112D) (via a service adapter module 90 in an embodiment) and start the feedback process of activities 112D, 112G, 112F, 112E, and 112C.

Based on the expanded terms additional SM data and related content may be collected and analyzed (activity 112G) (via the data analysis module 94 where the module 94 may employ a Hadoop MapReduce algorithm to analyze the SM data). The analyzed data may form Swarm Themes or SM subsets and topics that may be stored (activity 112H) (in the storage module 74, a Greenplum database in an embodiment). When use learning may be employed (activity 112F), the algorithm 110 may develop learning keywords (activity 112E) and repeat activities 112C, 112D, 112G, 112F, 112H, and 112E until use learning does not yield additional search terms or words to develop additional SM subsets or Swarm themes. As noted the NLP and other analysis of collected SM data may generate new search terms where the new search terms may enable the SLAE system 50 to collect additional SM data and repeat this process until no new search terms are generated from the additional SM data.

Figure 7:
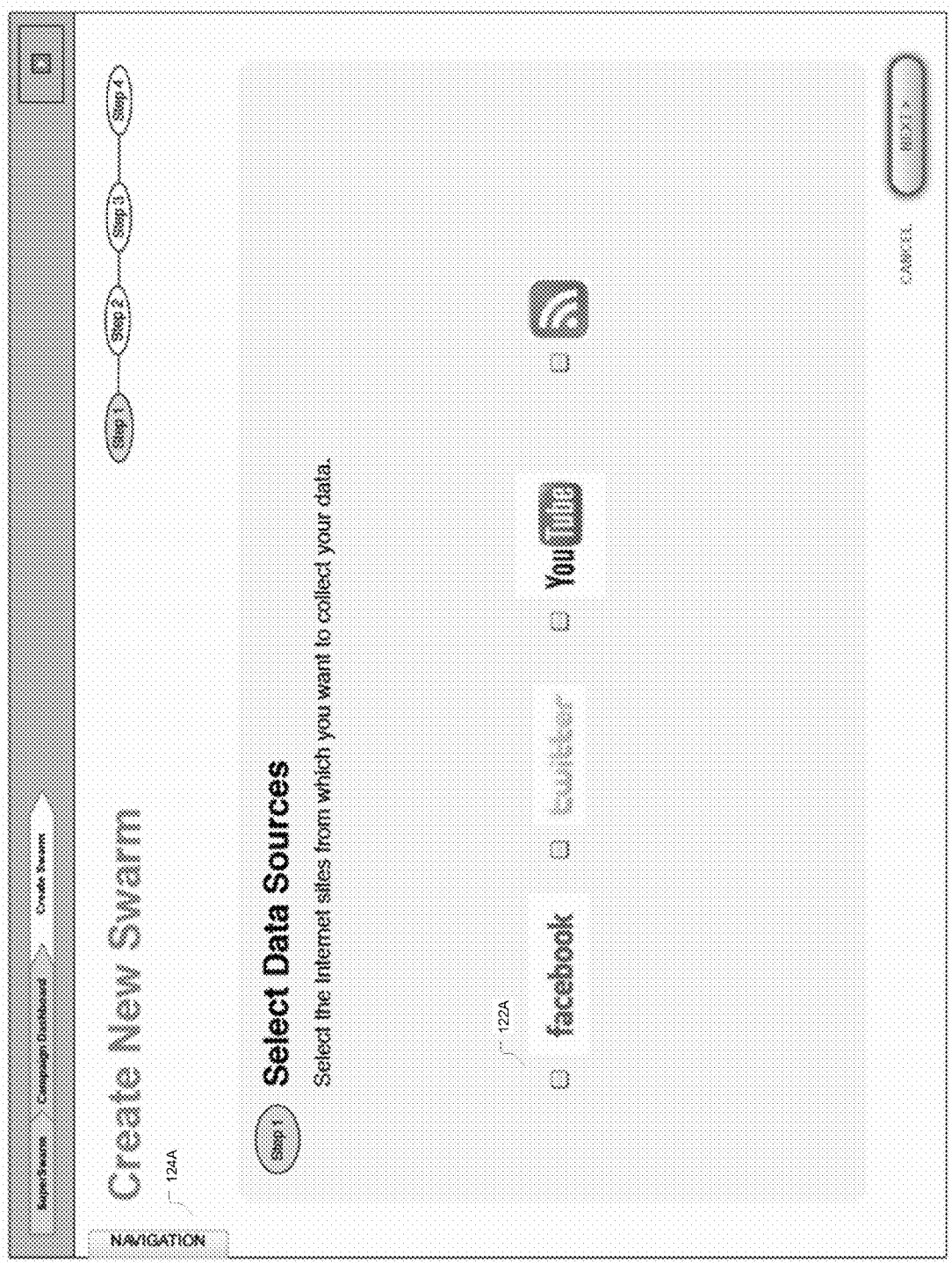
FIG. 7 illustrates a social media monitoring (SMM) set creation graphical user interface (GUI) display for selecting social media sources according to various embodiments.
Figure 11:
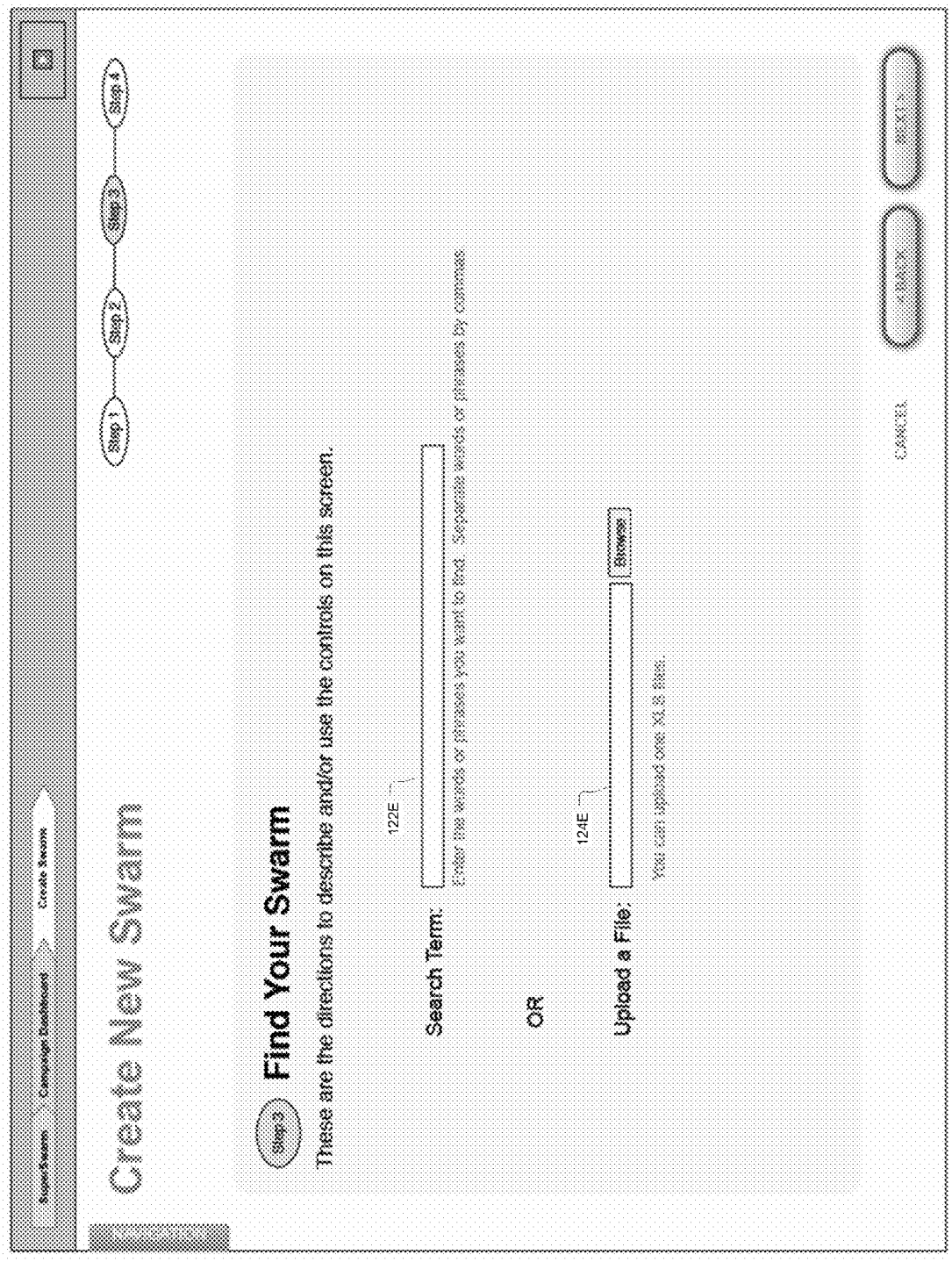
FIG. 11 illustrates a SLA set creation GUI display for entering search terms according to various embodiments.
Figure 12:
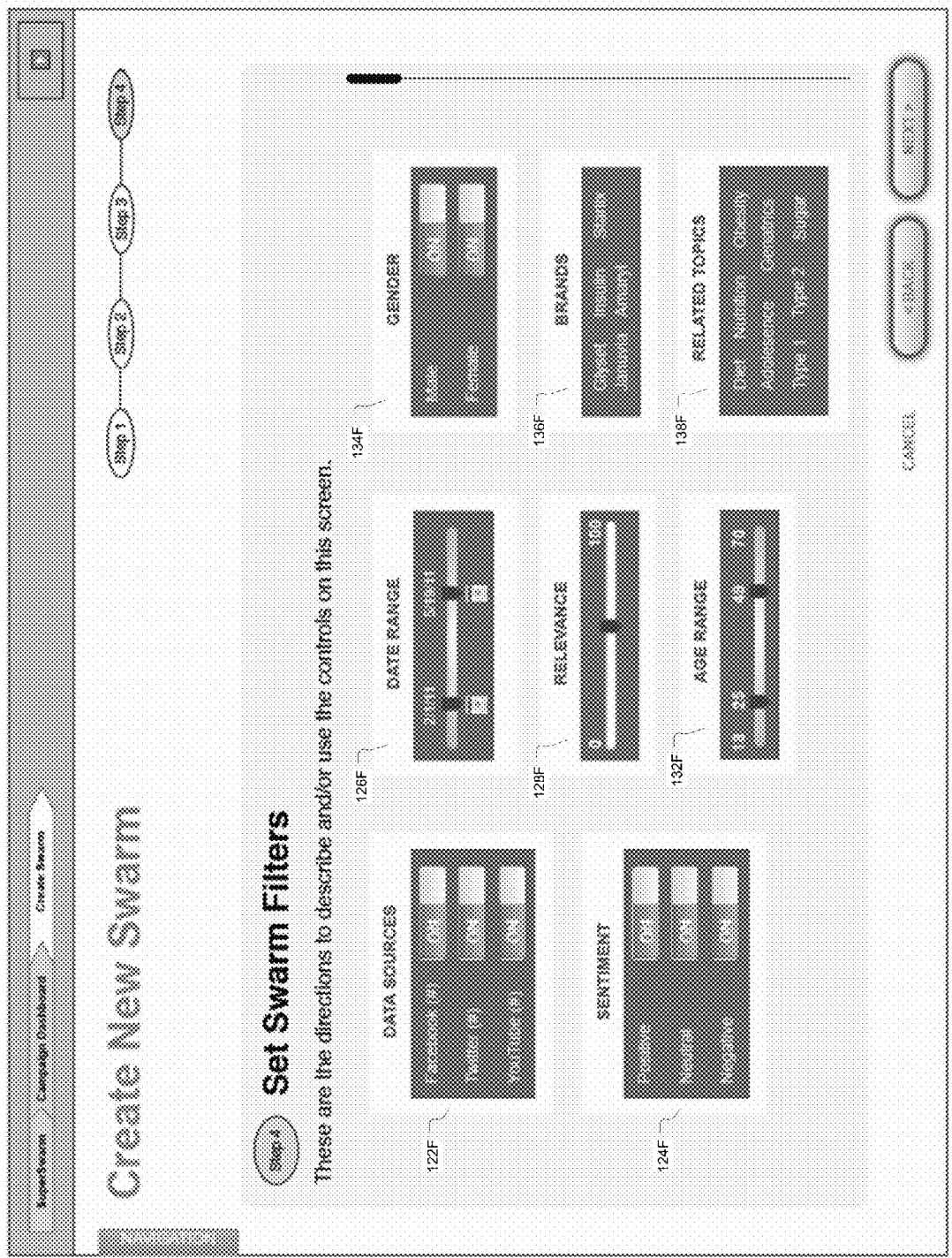
FIG. 12 illustrates a SLA set creation GUI display for entering filters or parameters according to various embodiments.
Figure 13:
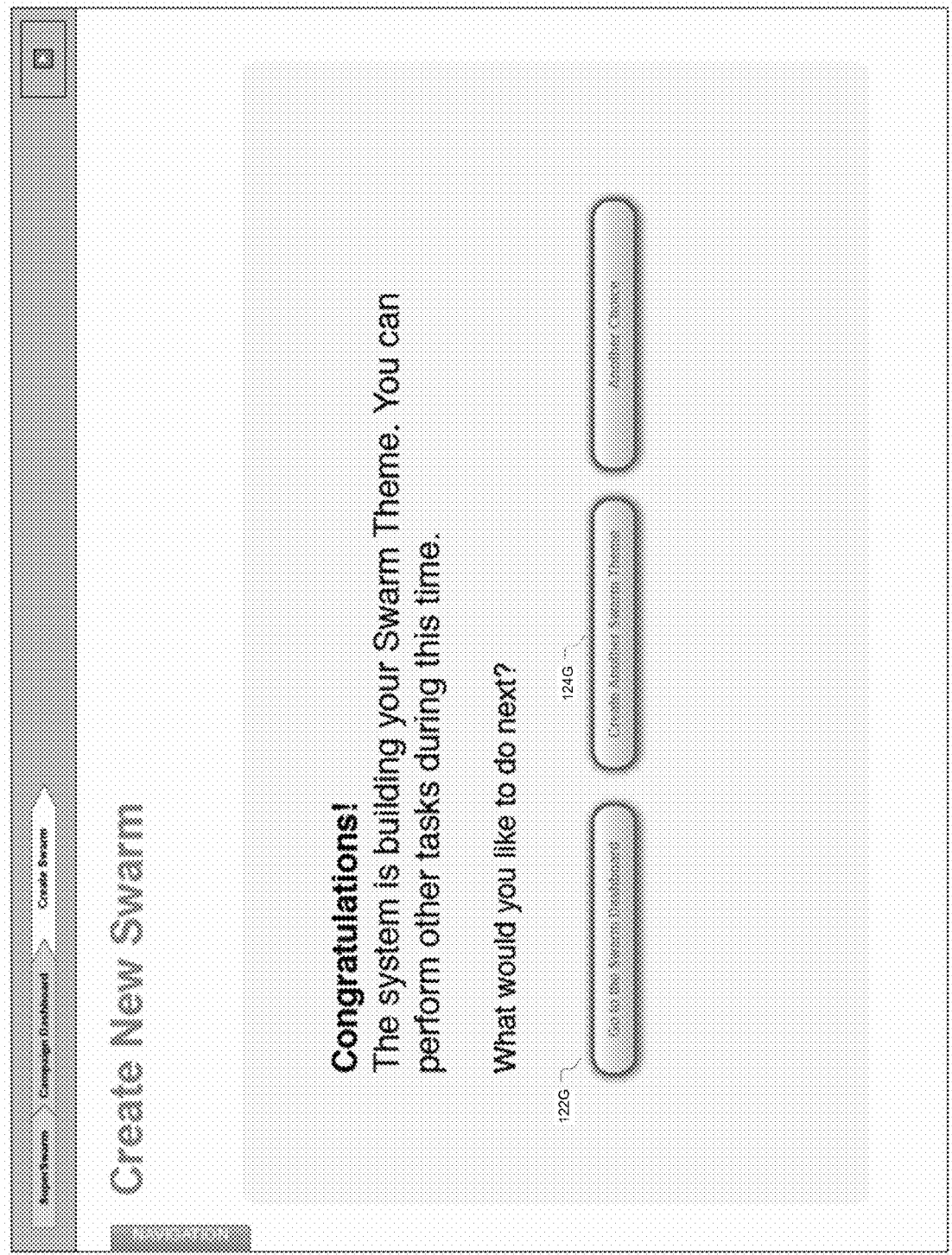
FIG. 13 illustrates a SLA set creation GUI completion display for selecting next actions after a SLA set creation according to various embodiments.

In an embodiment the SLAE system 50 may provide an application user 61a plurality of graphical user interface (GUI) screens or displays including the displays shown in FIG. 7 to 13 as part of a process to create a new SLA set. The SLAE system 50 may employ the web application module 80 and web server module 83 to generate and process SLA set creation displays where the web server module 83 may communicate the pages or displays 120A-120G (shown in FIG. 7 to 13) to the application user 61 via a user system 60. In an embodiment a new SLA set creation process may include enabling an application user 61 to: A. select SMP data sources (FIG. 7, display 120A); B. select dictionaries (FIG. 8, display 120B); select dictionary topics (FIG. 9, display 120C); add dictionaries to be used in a SLA set creation process (FIG. 10, display 120D), enter search terms directly or via a file upload to be used in a SLA set creation process (FIG. 11, display 120E); add one or more filters or parameters to be used in a SLA set creation process (FIG. 12, display 120F); and select the next activity after the SLA set creation process is started (FIG. 13, display 120G).

FIG. 7 illustrates a SLA set creation graphical user interface (GUI) display 120A for selecting social media sources according to various embodiments. As shown in FIG. 7 an application user may select one or more SMP data sources 122A to be searched or reviewed (past posts) during a SLA set creation. It is noted that the selected SMP sources 122A may lead to posts on other SMP sources. It is noted that the GUI display 120A also includes a user selectable navigation tab 124A. When an application user 61 selects the navigation tab 124A a pop out window 124L shown in FIG. 18A may be displayed over the page or display where the tab 124A is selected including display 120A. An application user may select the next tab of display 120A to cause the user application user system 60 to generate a response message, link, or HTML file, or other data file including the user SMP source selections 122A.

Figure 8:
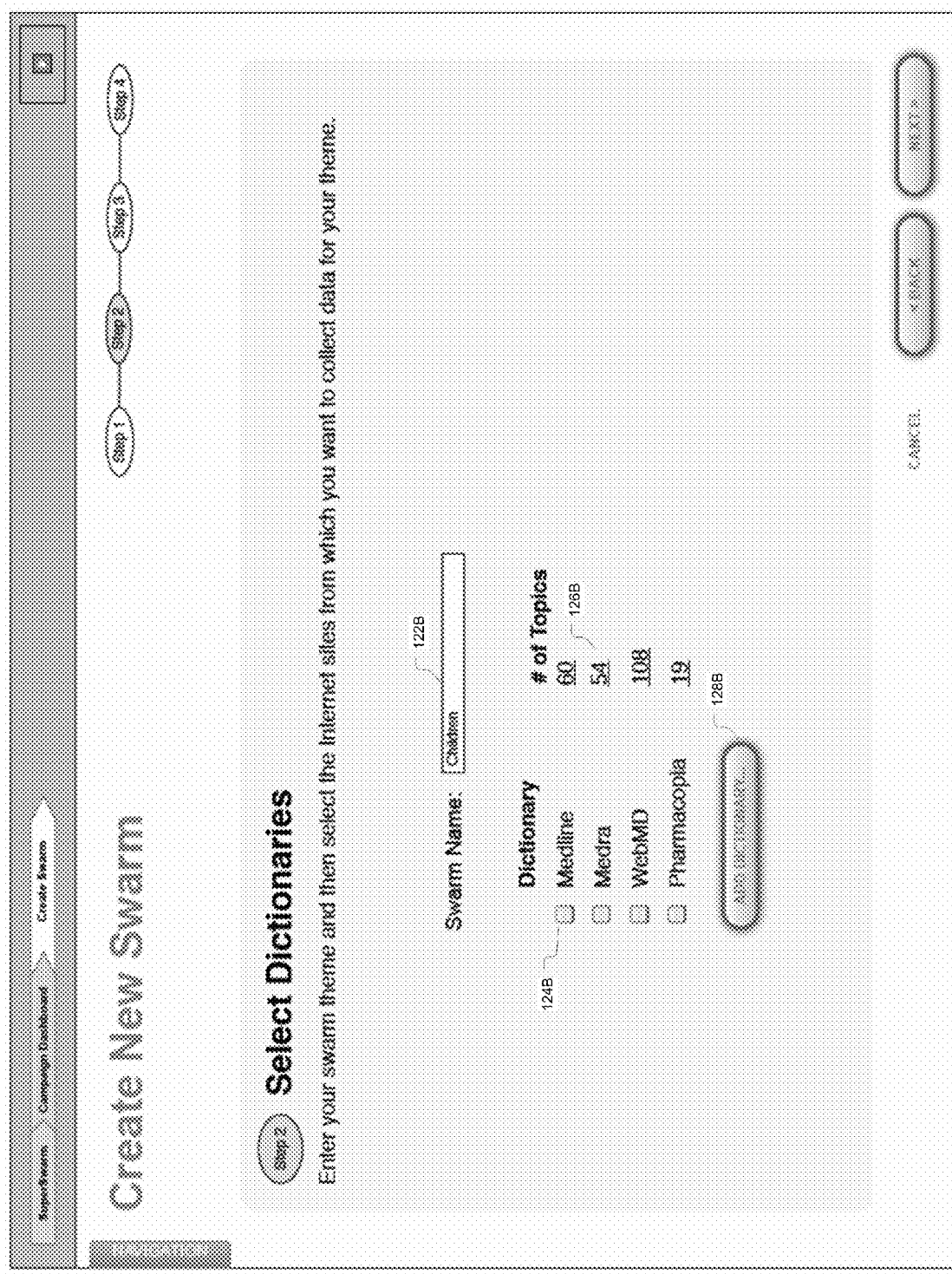
FIG. 8 illustrates a SLA set creation GUI display for selecting dictionaries or resources for keyword expansion according to various embodiments.

FIG. 8 illustrates a SLA set creation GUI display 120B for selecting dictionaries or resources for keyword expansion according to various embodiments. A SLAE system 50 may provide the display 120B to an application user 61 via a user system 60 as part of a SLA set creation request or process. The SLAE system 50 may generate or provide the display 120B after user 61 completion of SMP source query page or display 120A of FIG. 7. As shown in FIG. 8 an application user 61 may provide a name 122B for SLA set to be created or formulated. An application user 61 may also select one or more dictionaries 124B or its related topics 126B (display 120C, FIG. 9 may be invoked when selected) where the selected dictionaries 124B and topics 126B may be searched, incorporated, or analyzed as the part of the SLA set creation request or process. A user 61 may also add dictionaries 128B (display 120D, FIG. 10 may be invoked when selected) to be included or considered in a SLA set creation request or process. In particular the dictionaries 124B and topics 126B may be employed to expand search terms (display 120E, FIG. 11) a user selects or provides as part of the set creation request or process.

Figure 9:
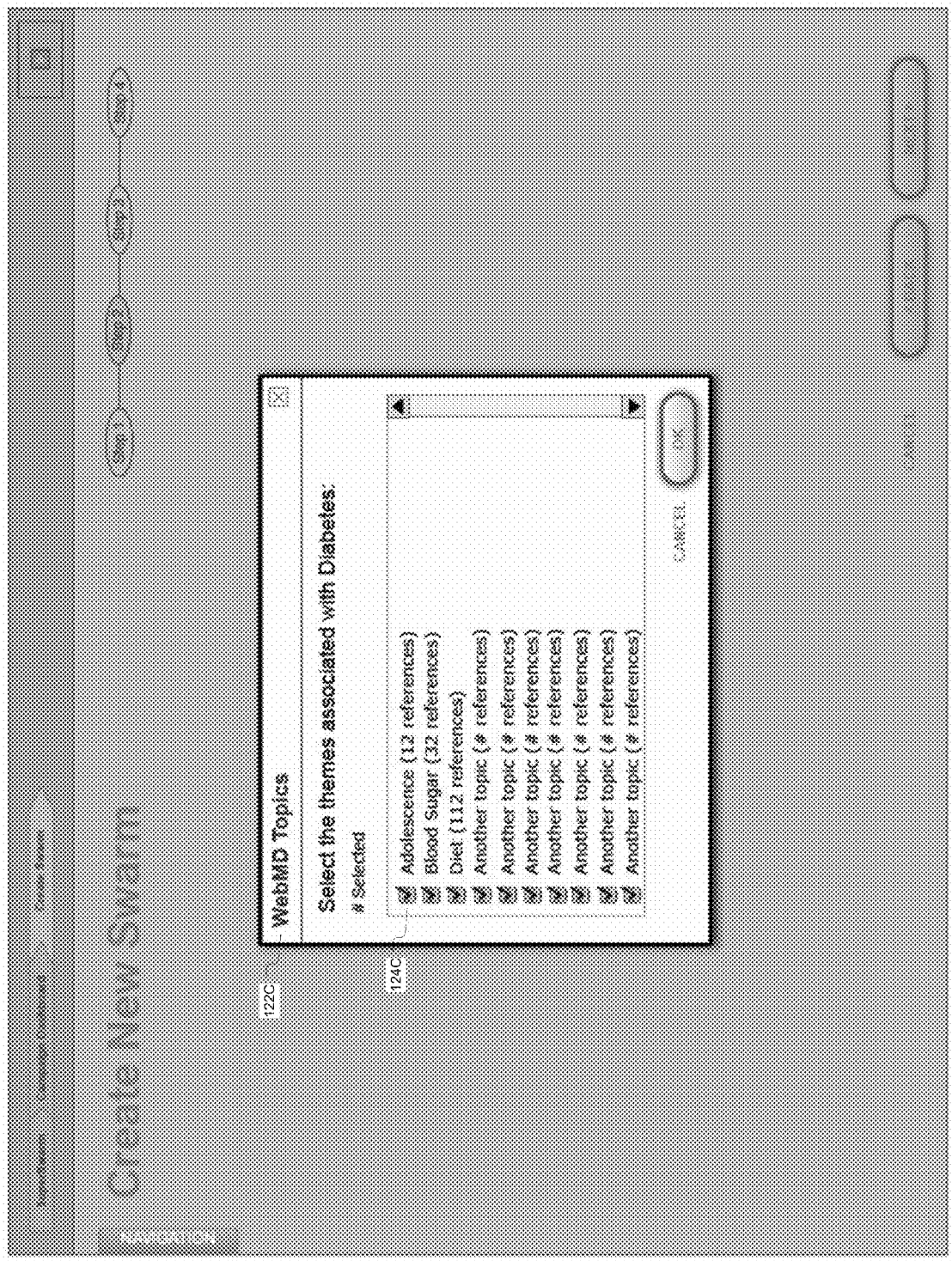
FIG. 9 illustrates a SLA set creation GUI display for selecting dictionaries or resources for specific topics according to various embodiments.

FIG. 9 illustrates a SLA set creation GUI display 120C for selecting dictionaries or resources specific topics according to various embodiments. As shown in FIG. 9, one or more dictionary 122C topics 124C may be selectable by an application user 61. The display 120C may be generated or provided by a SLAE system 50 when a user 61 selects a number of topics 126B in display 120B of FIG. 8. The number of topics may include a hyperlink that forwards the request for topic list to the SLAE 50. FIG. 9 may be displayed when a user 61 selects the WebMD number of topics 126B in an embodiment. After a user 61 selects or deselects a dictionary topic(s) the user selections may be forwarded to the SLAE 50 system via the selection of the OK button or link on display 120C of FIG. 9.

Figure 10:
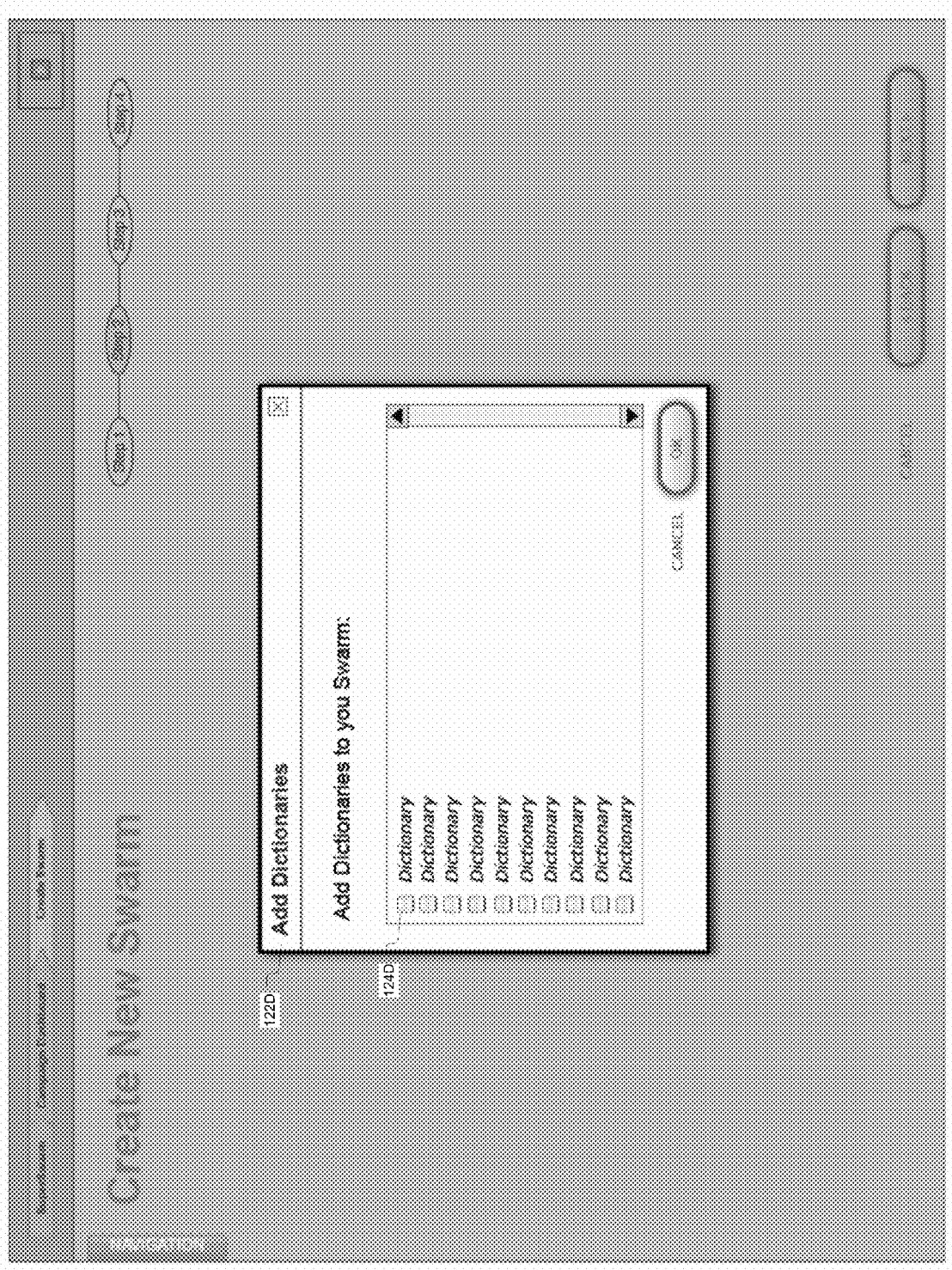
FIG. 10 illustrates a SLA set creation GUI display for selecting additional dictionaries or resources according to various embodiments.

FIG. 10 illustrates a SLA set creation GUI display 120D for selecting additional dictionaries or resources 124D according to various embodiments. A SLAE system 50 may generate the display 120D when an application user 61 selects the add dictionary link or button 128B of FIG. 8. As shown in FIG. 10 an application user 61 may select one or more dictionaries 124D to be reviewed, evaluated, considered, or analyzed during a SLA set creation including the expansion of any search terms provided by a user.

FIG. 11 illustrates a SLA set creation GUI display 120E for entering or loading search terms according to various embodiments. As shown in FIG. 11 the GUI display 120E may enable an application user 61 to enter one or more search terms 122E and upload a file including one or more search terms 124E. The file may have a predetermined format including a MS® Excel® XLS file or a text delimited file. The SLAE 50 may employ the process 100 and 110 shown in FIGS. 5 and 6 to expand the search terms via a feedback loop where additional SMP data is retrieved based on the additional, expanded search terms and the process is repeated until use learning (based on new SMP data) does not yield additional terms. The SLAE system 50 may also consider or apply one or more parameters or filters that an application user 61 may have set or specified via the GUI display 120F shown in FIG. 12 during the employment of the process(es) 100 and 110 in an embodiment.

As shown in FIG. 12 the GUI display 120F may enable an application user 61 to specify or elect SMP data sources 122F, the conversation sentiment 124F, the conversation posting date range 126F, the conversation relevance to the search terms 128F, the acceptable age range of conversation posters or authors 132F, the acceptable gender of conversation posters or authors 134F, one or more consumers brands mentioned in the captured conversation(s) 136F, and the election of one or more topics related to the user provided search terms 138F. In an embodiment the topics may be generated by a natural language process (NLP) analysis and categorization of the SM data that comprises the SLA set or subset.

A SM conversation sentiment positive, neutral, and negative may be determined by natural language processing of captured SMP data and searching for common terms related positive, neutral, and negative sentiment or expression. The sentiment analysis may correlate the sentiment terms and the user provided search terms based on modifiers and word distance between the terms. An application user 61 via display 120F may limit captured conversations to have a particular sentiment 124F based on the sentiment determination. The SLAE system 50 may determine a SM conversation or post's relevance based on natural language processing of the conversation or post in relation to the user provided search terms including the frequency and context of the search terms in the conversation or posts.

A user may provide a list of one or more brands 136F whose mention they may want noted or present in captured SM streams, conversations, or posts. The brand list 136F may be populated by the SLAE 50 based on the user provided search terms. In addition a SLAE 50 may be customized for the application user 61 based on the desired industry or market area the application user 61 wants to engage or analyze. The display 120F and other displays 120A-120AF may be optimized or customized for an application user 61 interested in engaging or analyzing SM data of interest or related SM data. The SLAE system 50 may also populate the selectable related topics 138F based on the user provided terms and the selected dictionaries and a natural language process (NLP) analysis and categorization of the SM data that comprises the SLA set or subset.

Upon entry of the filter terms of display 120F of FIG. 12 (via the next button or link in an embodiment), the SLAE 50 may employ the process 100 and 110 shown in FIGS. 5 and 6 to expand the search terms via a feedback loop where additional SMP data is retrieved based on the additional, expanded search terms and the process is repeated until use learning (based on new SMP data) does not yield additional terms. The SLAE system 50 may also consider or apply one or more parameters or filters that an application user 61 may have set or specified via the GUI display 120F shown in FIG. 12 during the employment of the process(es) 100 and 110 in an embodiment to start generating SLA sets and subsets.

The SLAE system 50 may generate or provide a SLA set creation GUI completion display 120G for selecting next actions to note the SLA set creation process to an application user system 60 has started in an embodiment. As shown in FIG. 13 an application user 61 may elect to visit a main menu or SLA set dashboard 122G (such as display 120I shown in FIG. 14), create another SLA set 124G (return to display 120A shown in FIG. 7), or perform other functions. The SLAE system 50 may provide or generate multiple SLA set dashboards based a user selected view type (122I, FIG. 14) including a dashboard display 120I (FIG. 14) by SLA set and a 120J by SLA subset or theme, where the themes or subsets may be generated by the SLAE system 50 during the main SLA set creation process.

FIG. 14 illustrates a SLA sets dashboard GUI display 120I for viewing SLA sets status and navigating to a SLA set according to various embodiments. As shown in FIG. 14 the SLAE system 50 may show panels 124I for one or more SLA sets created by an application user 61. An application user 61 may also be able review de-activated swarms by selecting the link or button 142I. In an embodiment a user 61 may elect to deactivate a SLA set. The SLAE system 50 may store deactivated SLA sets and subsets and enable a user 61 to re-activate such sets or subsets.

Figure 16:
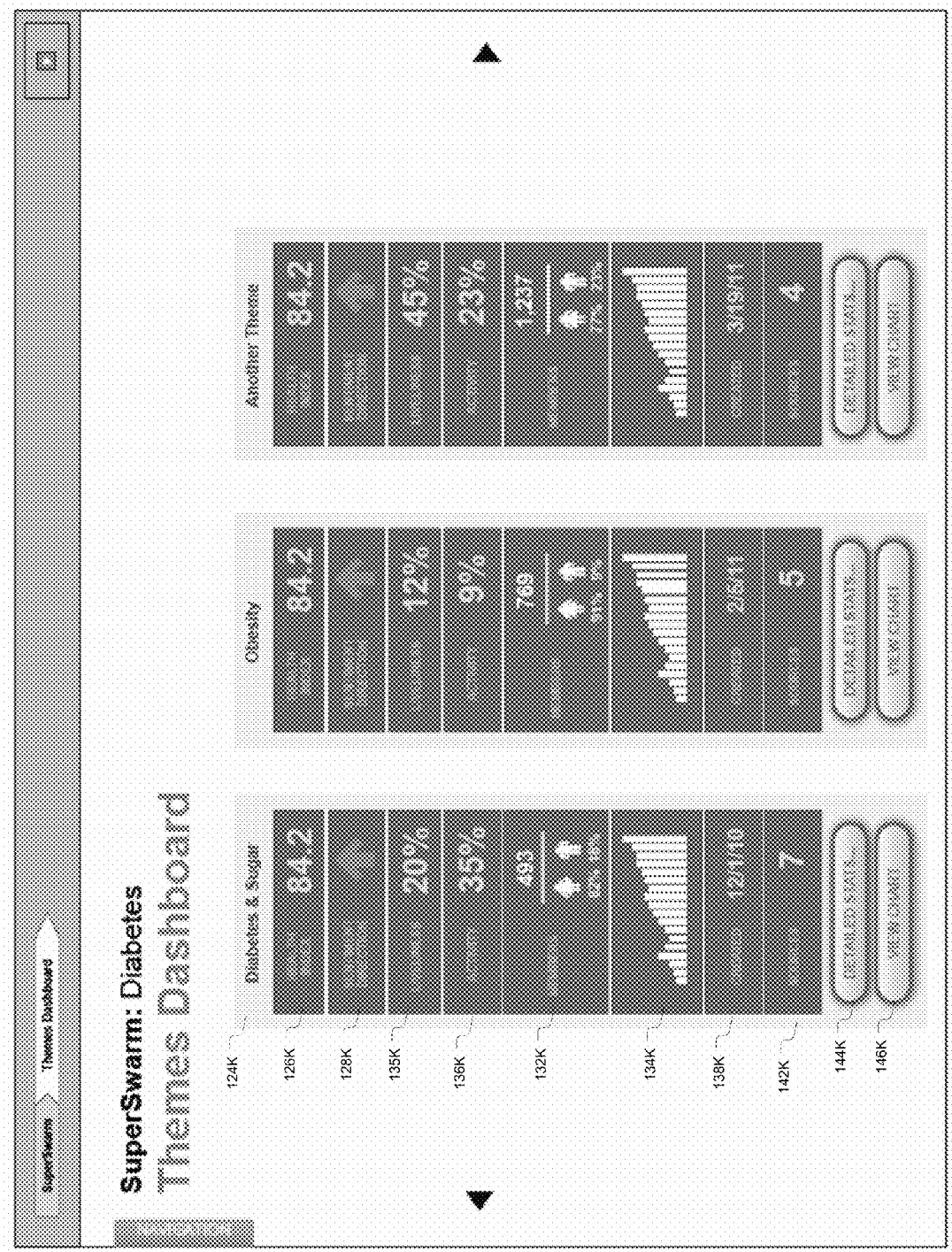
FIG. 16 illustrates a SLA subsets or themes dashboard GUI display for viewing SLA subsets of a set status and navigating to a SLA subset according to various embodiments.

As shown in FIG. 14 a SLA set panel 124I may include an index 126I, a sentiment direction indication or arrow 128I, a user (or poster) count by gender 132I, a conversation volume tend graph 134I, a SLA set manager listing 136I, and a go to SLA set details button or link 138I where the SLAE system 50 may generate or provide the display 120K in FIG. 16 when selected in an embodiment. In an embodiment the index 126I may be the sum of combination of activity indicators. The sentiment direction 128I may indicate that bias of the captured posts that comprise the SLA set, i.e., when positive (up arrow), majority within a tolerance or percentage of captured posts or conversations are positive, negative (down arrow), majority negative with the tolerance, and neutral (dash) where the captured posts or conversations are approximately neutral (between positive and negative in the tolerance range).

A SLA set panel 124I may further include a user or poster count by gender for the captured conversations, posts, or blogs that comprise the SLA set. The panel 124I may also include a time based graph showing the number of posts in a time window where each bar may represent the conversation capture amount for a particular time interval, e.g., by day in an embodiment. The panel 124I may also indicate the manager 136I of the SLA set when assigned or selected by an application user 61.

Figure 15:
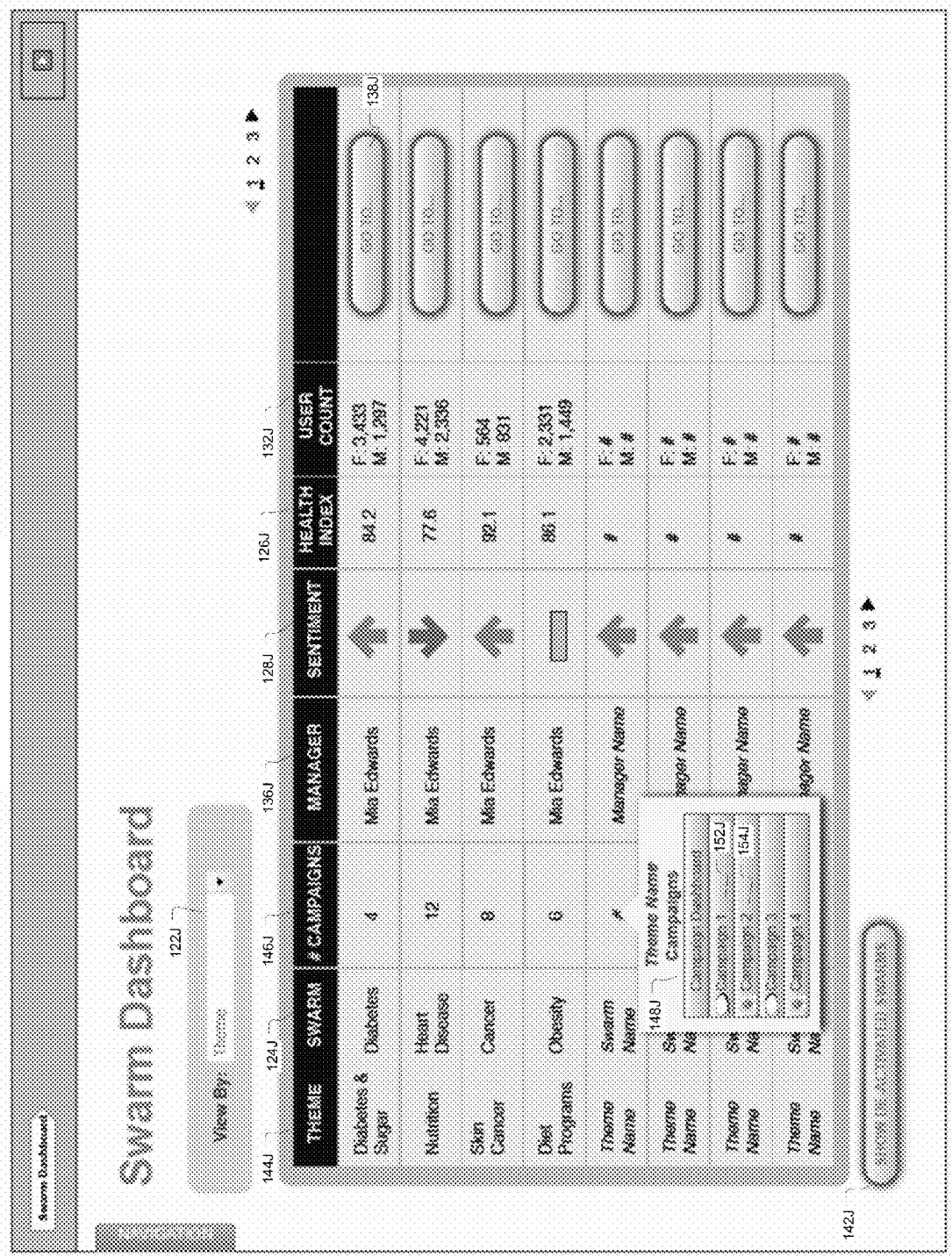
FIG. 15 illustrates a SLA sets/subsets dashboard chart GUI display for viewing SLA sets/subsets status and navigating to a SLA set/subset according to various embodiments.

FIG. 15 illustrates a SLA sets/subsets dashboard chart GUI display 120J for viewing SLA sets/subsets status and information and for navigating to a SLA set/subset according to various embodiments. As shown in FIG. 15 the SLA set/subset display 120J may include SLA subsets in row format. Each display 120J row may include the SLA subset or theme 144J, the SLA set 124J, an active campaign number 146J, manager name 136J, sentiment graphical indication 128J, combined index 126J, user count by gender 132J, and SLA subset drill down or go to button or link 138J.

A SLA subset name 144J may include the search terms that created the SM data capture or set. An application user 61 may engage a group of poster, authors (or users) of captured conversations by starting an engagement campaign including a conversation campaign and a micro-site campaign. The field or column "number of campaigns" 146J may indicate the number of active engagement campaigns for the SLA subset 144J. In an embodiment when an application user 61 via a user system 60 points to a SLA subset campaign number a pop-up window 148J may be generated. The campaign pop-up window 148J may list the active campaigns 152J, 154J and include a hyper-text link to a campaign display (such as display 120AA of FIG. 33). The campaign pop-up dashboard 148J may also include a graphical indication of the campaign type: a text bubble for a conversation campaign and stacked pages for a micro-site campaign in an embodiment.

FIG. 16 illustrates a SLA subsets or themes dashboard GUI display 120K for viewing SLA subsets status and information, and for navigating to a SLA subset details according to various embodiments. As shown in FIG. 16 the display 120K may include a panel 124K for each SLA subset or theme. Each SLA subset panel 124K may include the SLA subset name or theme 124K, combined index 126K, graphical sentiment indicator 128K, liveliness index 135K, activity index 136K, member information with gender percentages 132K, posting activity graph by time 134K, SLA subset formation or creation date 138K, number of SMP sources that comprise the captured SM data 142K, a link to detail statistics for SLA subset 144K, and a link 146K to view a graphical chart of the SLA subset 146K.

The liveliness index 135K may reflect the captured data interaction between posters with and without sentiment considerations in an embodiment. The activity index 136K may indicate the percentage activity of the SLA subset relative to the sum of all related SLA subset (of the same set) in an embodiment. The members 132K may list the number of unique posters of captured SM data and include a gender breakdown by percentage in an embodiment. The date created 138K may indicate the date the SLA subset was created by the SLAE system 50.

Figure 17:
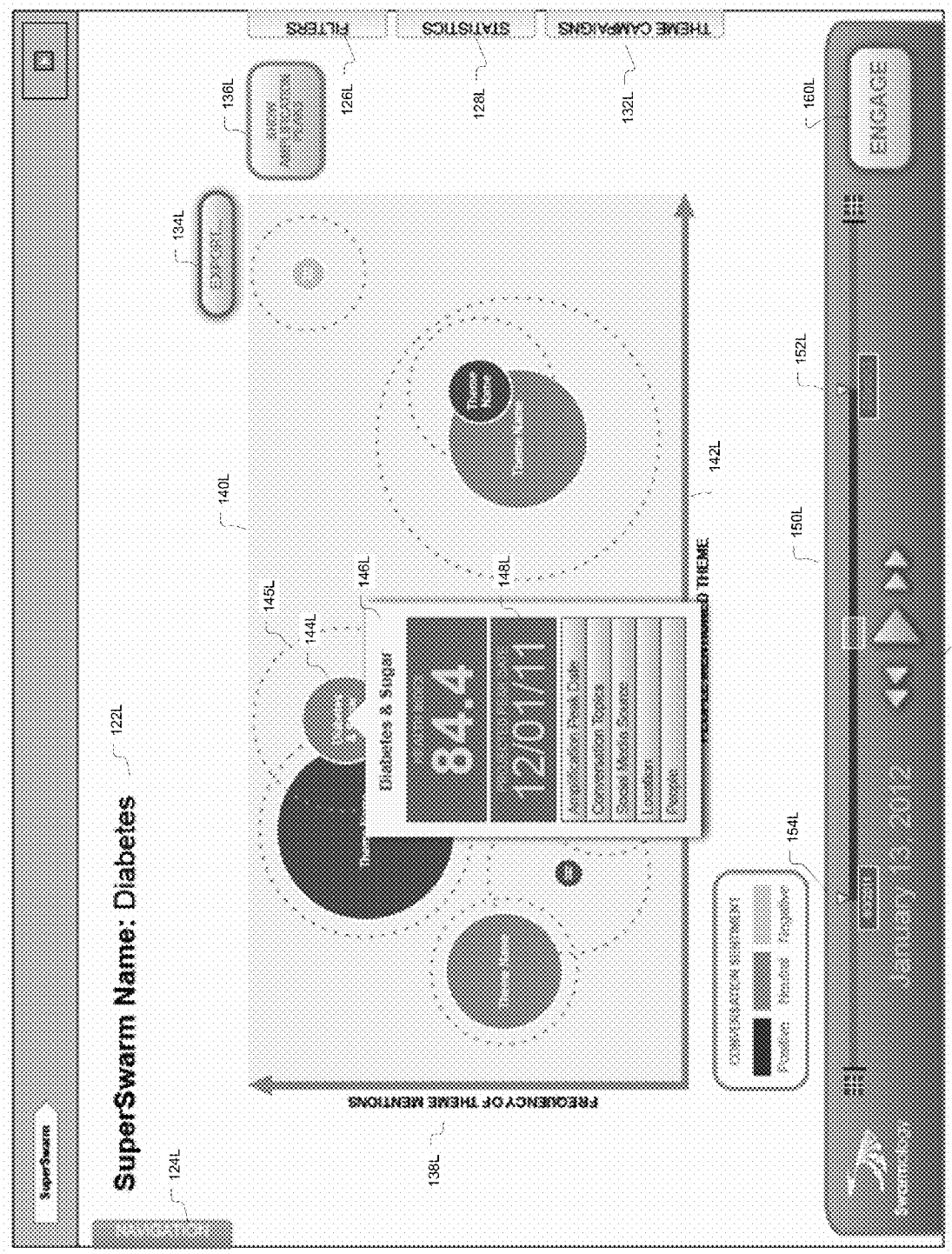
FIG. 17 illustrates a SLA subsets or themes node based GUI display for viewing SLA subset status graphically according to various embodiments.
Figure 18A:
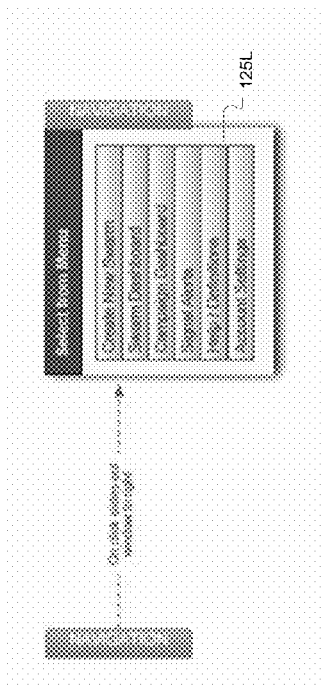
FIG. 18A illustrates a system navigation tab GUI display for selecting main system activities according to various embodiments.

FIG. 17 illustrates a SLA set/subset node based GUI display 158L for viewing SLA sets/subsets graphically according to various embodiments. FIG. 17 includes a node-type graph 140L that depicts SLA subset information via nodes plotted by frequency of subset mentioned (in posts or conversations) 138L (y-axis) versus number of people mentioning the subset 142L (x-axis). The frequency of subsets mentions may indicate the number of times one or more search terms appears in SM captured data representing a SLA subset. The number of people mentioned SLA subset may represent may indicate the unique number of posters or authors associated with the SM captured data that includes the one or more search terms appears where the SM captured data represents the SLA subset. Each node 144L may represent a SLA subset.

The node's radius may be reflective of the number of posts or conversations that comprise the corresponding SLA subset. The dashed other circle 145L about each node 144L may represent the projected maximum number of posts or conversation that comprise the corresponding SLA subset in an embodiment. The node color (dark, medium, light or varying colors) may represent the sentiment of the conversations that comprise the corresponding SLA subset. When an application user 61 via a user system 60 points to a node 144L a pop-up SLA subset control window 146L may appear. The SLA subset control window 146L may list the SLA subset combined index 146L, a projected peak date 148L, and have several more information options including viewing a amplification peak date display (120P, FIG. 22), a conversation topics display, a social media source display (120S, FIG. 25), a location display (120V, FIG. 28), and a people display (120R, FIG. 24) (in an embodiment).

Figure 21:
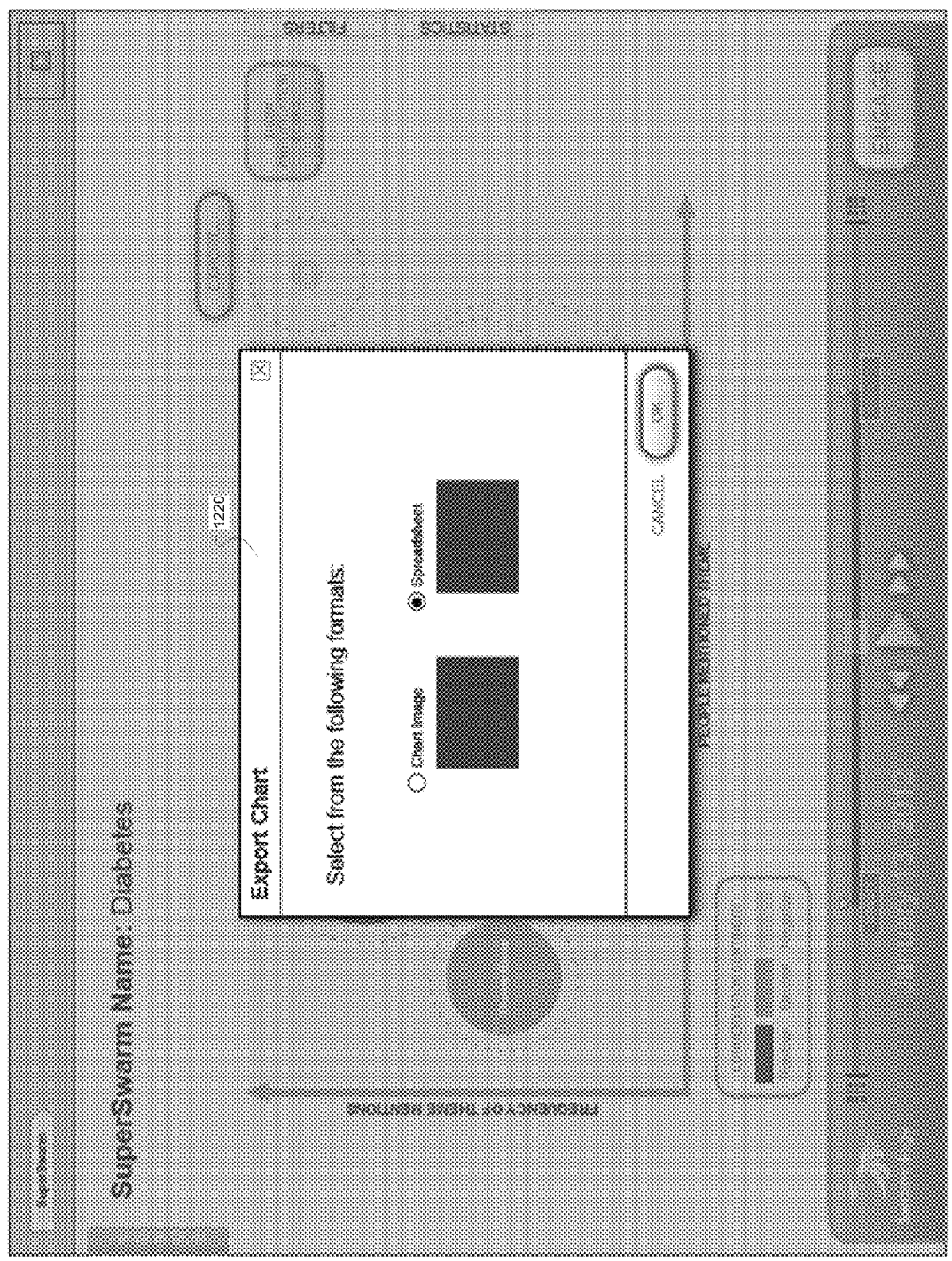
FIG. 21 illustrates SLA subsets or themes circuit node graph export dialog GUI display for selecting a graph export option for according to various embodiments.

A SLAE system 50 may generate the pop-up window 122O show in FIG. 21 when the export button or link 134L is selected by an application user 61. The window 122O of FIG. 21 may enable a user to download the display 120L information in a PDF chart or Excel spreadsheet format. A user may also select the theme or subset campaign button or link 132L of display 120L (FIG. 17). The SLAE system 50 may generate the pop-up window 132L shown in FIG. 18C when the campaign button or link 132L is selected by an application user 61. The campaign window 132L of FIG. 18C may display active campaigns 131L and may enable a user to select an active campaign or note that no campaigns are active 133L.

A user may also select the statistics button or link 128L of display 120L (FIG. 17). The SLAE system 50 may generate the pop-up window 128L shown in FIG. 18D when the statistics button or link 132L (FIG. 17) is selected by an application user 61. The statistics window 132L of FIG. 18D may show various statistics 129L related to the captured SM data comprising the SLA subset including activity, combined index, gender, and liveliness. A user may also select the filters button or link 126L of display 120L (FIG. 17). The SLAE system 50 may generate the pop-up window 126L shown in FIG. 18B when the statistics button or link 126L (FIG. 17) is selected by an application user 61. The filter window 126L of FIG. 18B may enable a user 61 select a source, people, locations, or topics filters to be applied 127L.

Figure 18B:
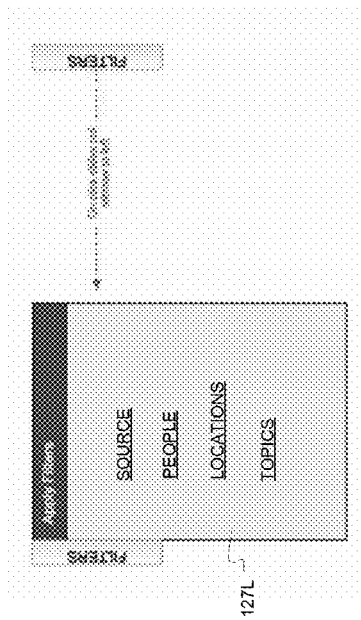
FIG. 18B illustrates a system filter tab GUI display for selecting various filters or parameters for objects on the current display according to various embodiments.
Figure 18C:
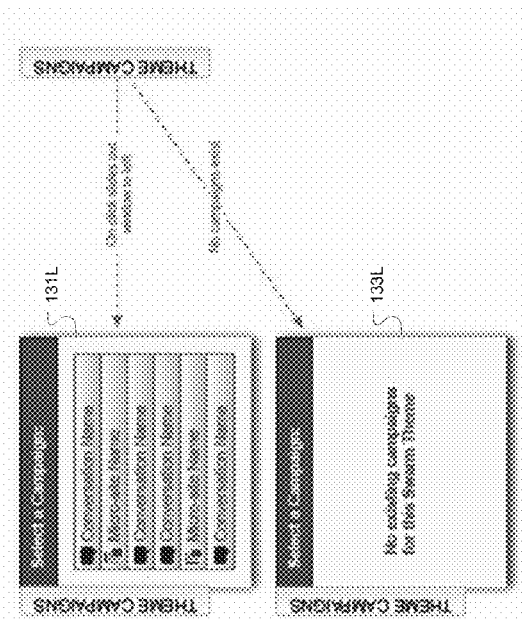
FIG. 18C illustrates a system theme campaigns tab GUI display for selecting an existing conversation or micro-site SLA campaign according to various embodiments.
Figure 18D:
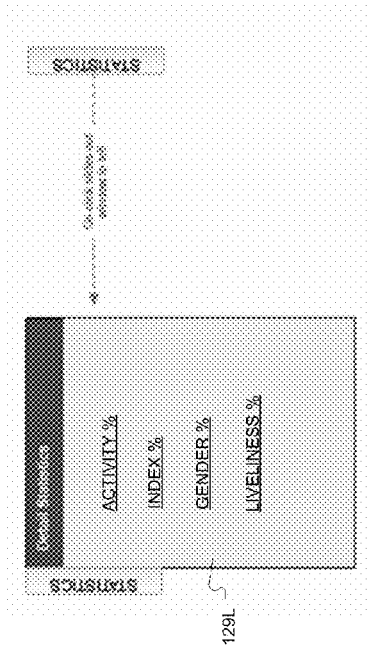
FIG. 18D illustrates a system statistics tab GUI display for viewing statistics for objects on the current display according to various embodiments.

The SLAE system 50 may generate the pop-up window 120M shown in FIG. 19A when Source is selected in window 126L of FIG. 18B. The apply filters by source window 120M of FIG. 19A may enable a user to specify the sentiment 122M, brand mentions 124M, sources 126M, and poster age range 128M. The sentiment filter 122M may default to none. The brand mentions 124M may be customized for the application user 61 of their respective company or customer. The brand mentions may also enable a user 61 to select one or more competitors' brands to be included in the captured data. The sources filter 126M may default to all. The age range filter 128M may also default to all age ranges. Once a user 61 selects the apply button or link, the SLAE system 50 may update the respective SLA set/subsets based on the selected filters. In an embodiment when one or more filters 122M, 124M, 126M, 128M are applied, the filter tab may change to indicate its application (the filter tab may turn red to indicate its application).

Similarly the SLAE system 50 may generate the pop-up window 130M shown in FIG. 19B when People is selected in window 126L of FIG. 18B. The apply filters by people window 130M of FIG. 19B may enable a user to specify the sentiment 132M, brand mentions 134M, sources 126M, poster gender 136M, and the poster age range 128M. The poster gender 136M may default to both genders. Once a user 61 selects the apply button or link of display 130M, the SLAE system 50 may update the respective SLA set/subsets based on the selected filters.

The SLAE system 50 may generate the pop-up window 140M shown in FIG. 19C when Topics is selected in window 126L of FIG. 18B. The apply filters by topics window 140M of FIG. 19C may enable a user to specify the sentiment 142M, brand mentions 144M, top brands by number of mentions range 146M, and top brands by relevance scores range 148M. The top brand by number of mentions filter may enable a user specify the minimum and maximum number of times top brands are mentioned in posts. The top brands by relevance scores range may limit capture to posts having the required relevance for top brands. Once a user 61 selects the apply button or link of display 140M, the SLAE system 50 may update the respective SLA set/subsets based on the selected filters.

The SLAE system 50 may generate the pop-up window 150M shown in FIG. 19D when Locations is selected in window 126L of FIG. 18B. The apply filters by topics window 150M of FIG. 19D may enable a user to specify the sentiment 152M, brand mentions 154M, and top States by number of mentions range 156M. The top States by number of mentions filter may enable a user specify the minimum and maximum number of times top States are mentioned in posts. Once a user 61 selects the apply button or link of display 150M, the SLAE system 50 may update the respective SLA set/subsets based on the selected filters.

Referring to FIG. 17, the display 120L may include a selectable, date range animation bar 150L. An application user 61 may select a start date 154L, an end date 152L and select play. The SLAE system 50 may update the graph 140L incrementally from the start date 154L to the end date 152L. A user may select the increment or decrement buttons on either side of the play button of bar 150L to change the date by a day, week, or month as a function of unit chosen for these functions. An application user 61 may also select the engage button or link 160L in display 120L to request to start a campaign for the SLA subset. When a user 61 selects the engage button or link 160L, the SLAE 50 may generate or provide the display 120Y shown in FIG. 31. A user may also select the show amplifications peaks button or link 136L of display 120L (FIG. 17). The SLAE system 50 may generate the display 120P shown in FIG. 22 when the show amplifications peaks button or link 136L (FIG. 17) is selected by an application user 61.

Figure 20:
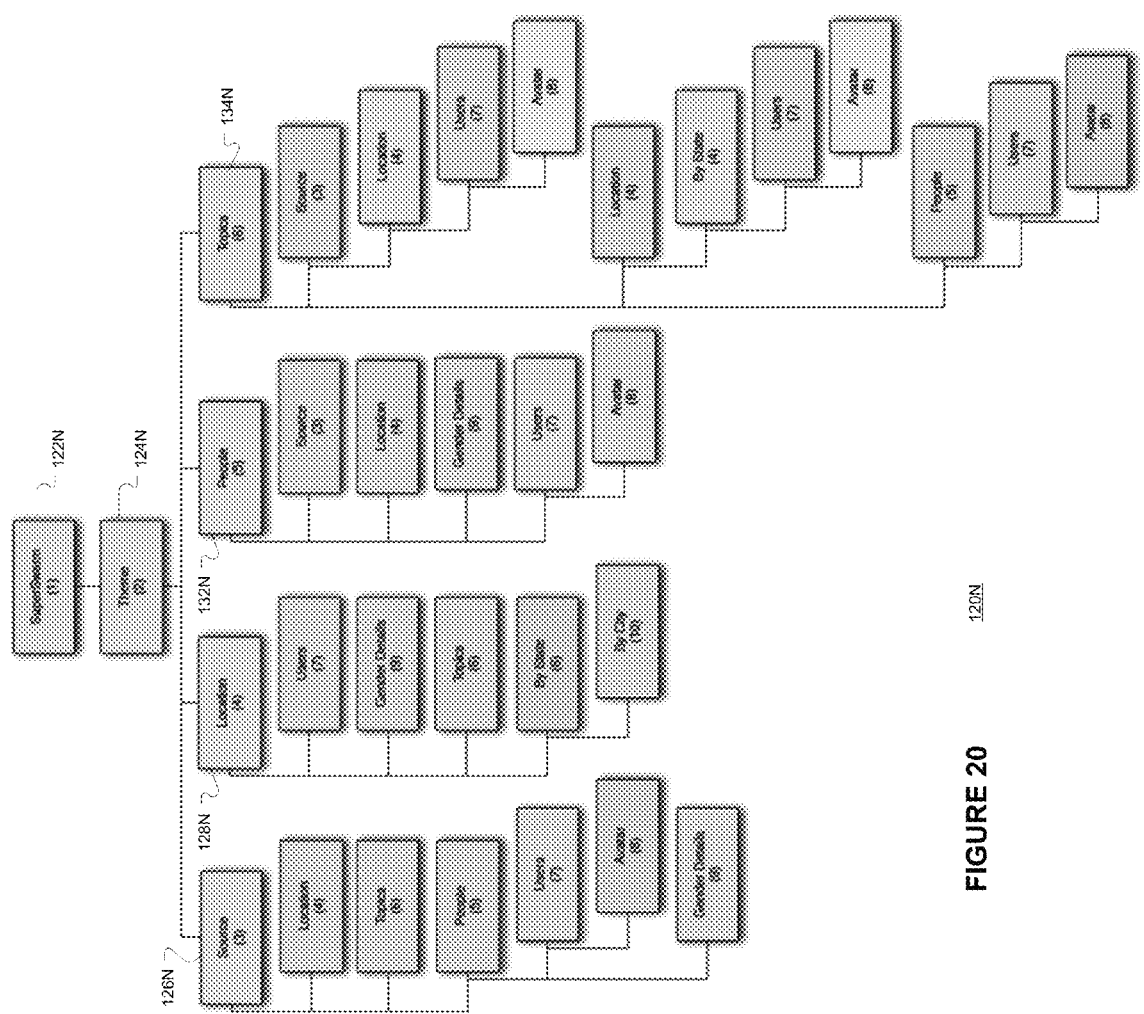
FIG. 20 is a block diagram of a GUI displays that a SLA application user can evoke based on filter and data selections according to various embodiments.

FIG. 20 is a block diagram of GUI displays that a SLA application user can evoke based on filter and data selections according to various embodiments. The available GUI displays 120N may be based on a SLA set 122N, SLA subset 124N, SM data source 126N, SM data poster or author location 128N, the SM data poster or author 132N, and SLA topics 134N where each an application user may be able to drill into further displays as shown in FIG. 20.

Figure 22:
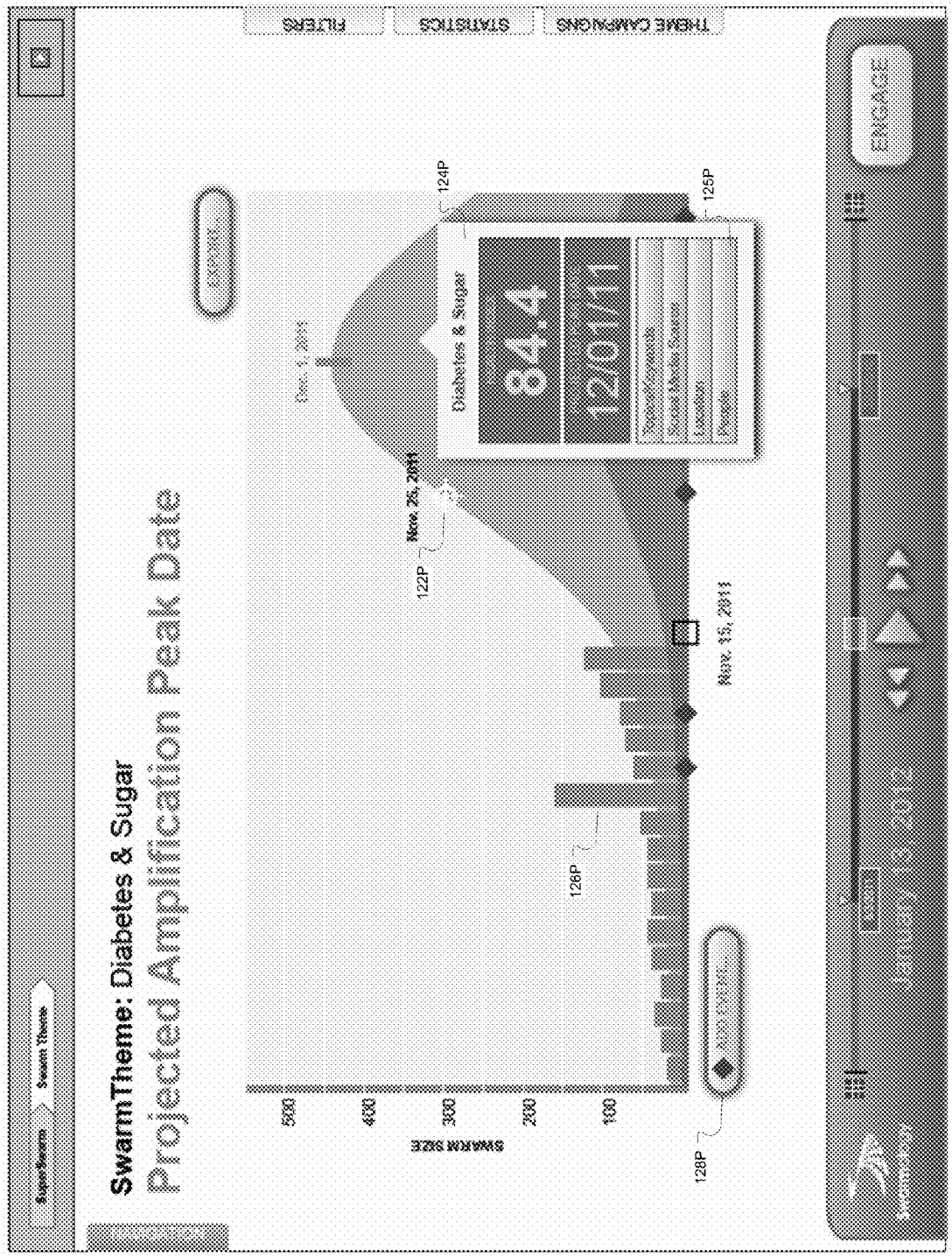
FIG. 22 illustrates a SLA subset projected amplification peak graph GUI display for viewing potential subset activity peaks and selecting dates or events based on the graph according to various embodiments.

FIG. 22 illustrates a SLA subset projected amplification peak graph GUI display 120P for viewing potential subset activity peaks and selecting dates or events based on the graph according to various embodiments. As noted with reference to FIG. 1B, a single SM conversation or stream may expand into thousands of related down-stream conversations 142C, 142E, 142D, and reach a peak or maximum number of related conversations 146 and then dwindle to a minimum or nominal number of conversations. It may be desirable to predict the potential peak date of a conversation set or subset (SLA set or subset)—such as the peak shown in display 120P of FIG. 22. It may be further desirable to predict an the up slope of the curve 122P as an entry point to engage one or more participants of the SLA set or subset via an engagement campaign before the SLA set or SLA subset reaches a peak and starts to subside.

The SLAE 50 system may monitor or analyze a SLA set or subset by time and extrapolate the time/date of the potential up-slope and potential peek. The SLAE 50 system may use multiple SM data characteristics 126P to extrapolate the potential up slope 122P and potential peek. The SLAE system 50 may use historical data from other SLA data subsets and sets to determine patterns and use these patterns to map or model a similar curve for the current SM data comprising the SLA set or subset. As shown in FIG. 22 a SLAE system 50 may generate a pop-up panel 124P for a SLA set or subset. The panel 124P may include a combined index, a project peak date, and several selectable links for topics/keywords, social media source, location, and people. An application user 61 may also select an add event button or link 128P. In response to the selection the SLAE system 50 may generate an Add Event window 122Q shown in FIG. 23, display 120Q.

Figure 23:
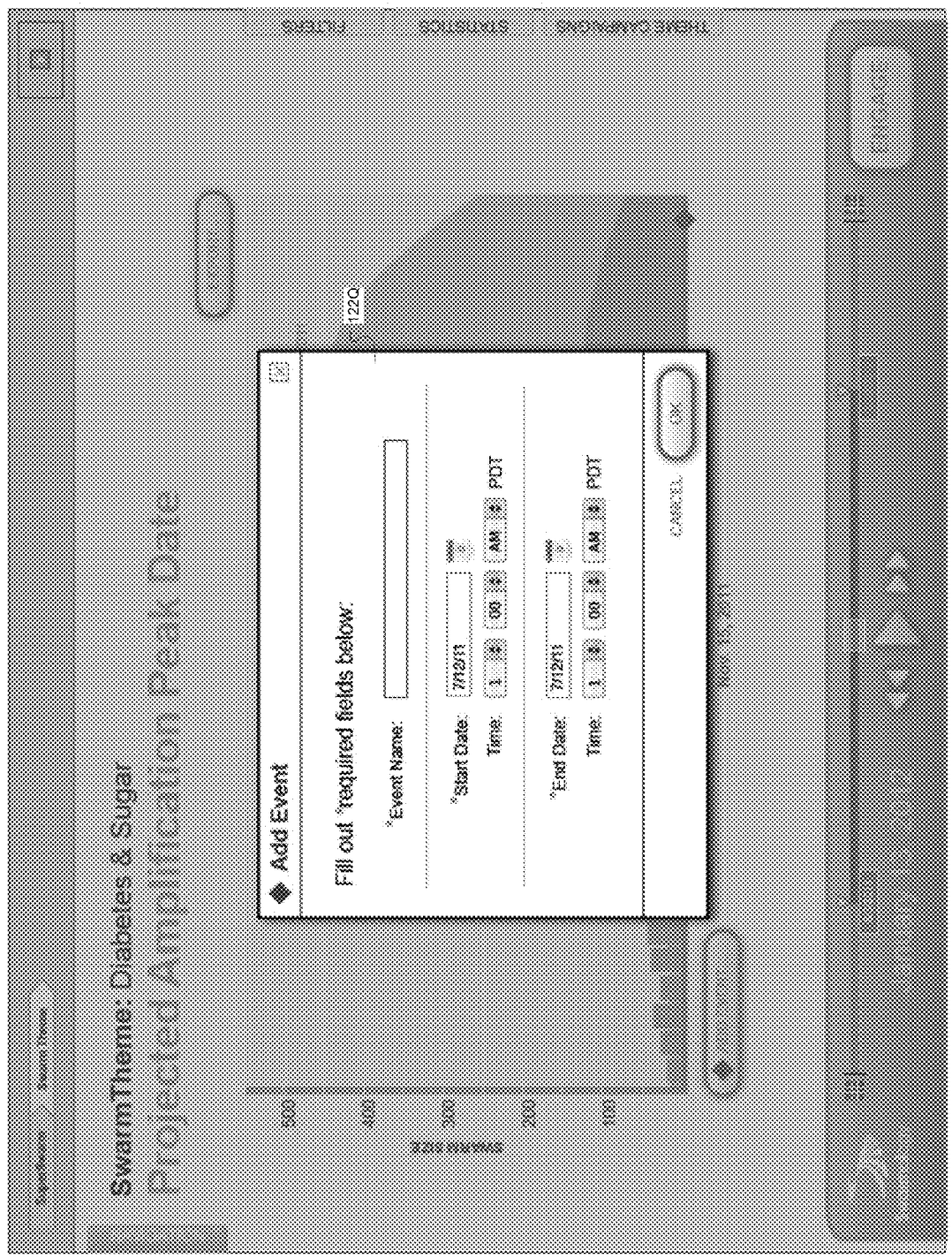
FIG. 23 illustrates a SLA subset projected amplification peak date graph add event dialog GUI display for adding an event based on the projected amplification peak graph according to various embodiments.

As shown in FIG. 23, display 120Q an add event display 122Q may include an event name field, a start date/time and an end date/time. An application user 61 may provide an event name, start time/date and an end time/date. The SLAE system 50 may store the event time/dates and show the events as diamonds on the x-axis as shown in 120P, FIG. 22.

Figure 24:
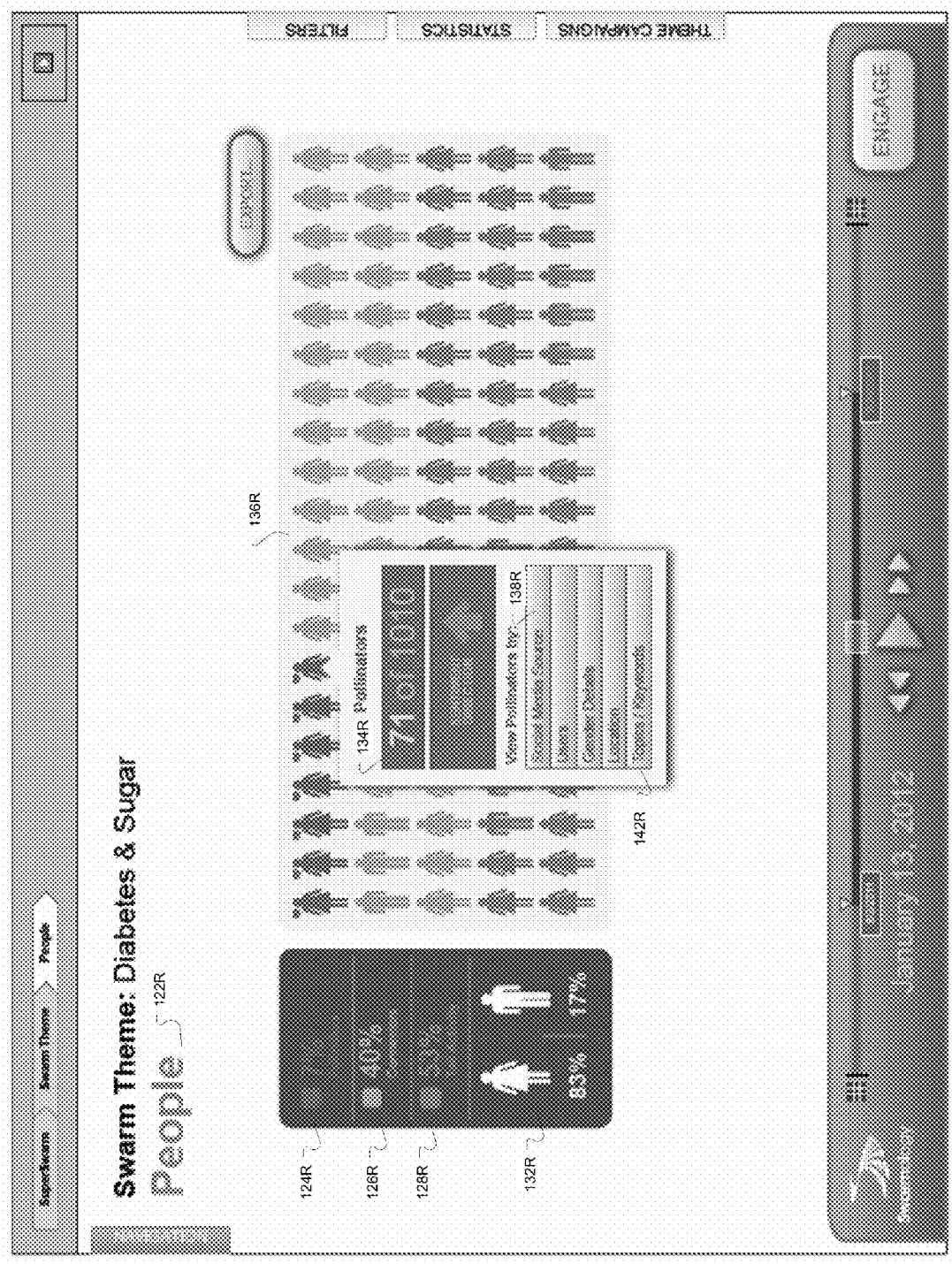
FIG. 24 illustrates a SLA subset of people or participants graph based GUI display for graphical displaying participant information for a SLA subset according to various embodiments.

FIG. 24 illustrates a SLA subset of people or participants graph based GUI display 120R for graphically displaying participant information for a SLA subset according to various embodiments. The SLAE system 50 may generate display 120R of FIG. 24 when an application user 61 selects a people, participant, or user button or link such as button or link 125P of pop-up window 124P of display 120P, FIG. 22. As shown in FIG. 24 the display 120R may provide a graphical representation of the people, participants, or authors associated with captured data comprising the SLA subset. As shown in FIG. 24 the display may separate the people into three categories, pollinators, connectors, and tail activity. In an embodiment, people, participants, or authors may be considered pollinators when they create and or transmit SM data or content of the SLA subset. People, participants, or authors may be considered connectors when they share high volumes of SM data or content of the SLA subset and may be considered long tail members when they share little or merely read SM data or content of a SLA subset.

The SLAE system 50 may analyze the SM data comprising a SLA subset and categories the participants into the three categories. The different participant categories may be represented in the graph of display 120R via different shading or coloring. As shown in FIG. 24, when an application user select an icon representing one of the three categories an information display panel 134R may provide details for the corresponding category including the number of people in the category and the total number of participants in the SLA subset SM data, a sentiment direction indicator for the SLA subset, and links for different information view displays for the respective people category including social media source 138R, Users, Gender details, Location, and Topics/Keywords 142R.

Figure 25:
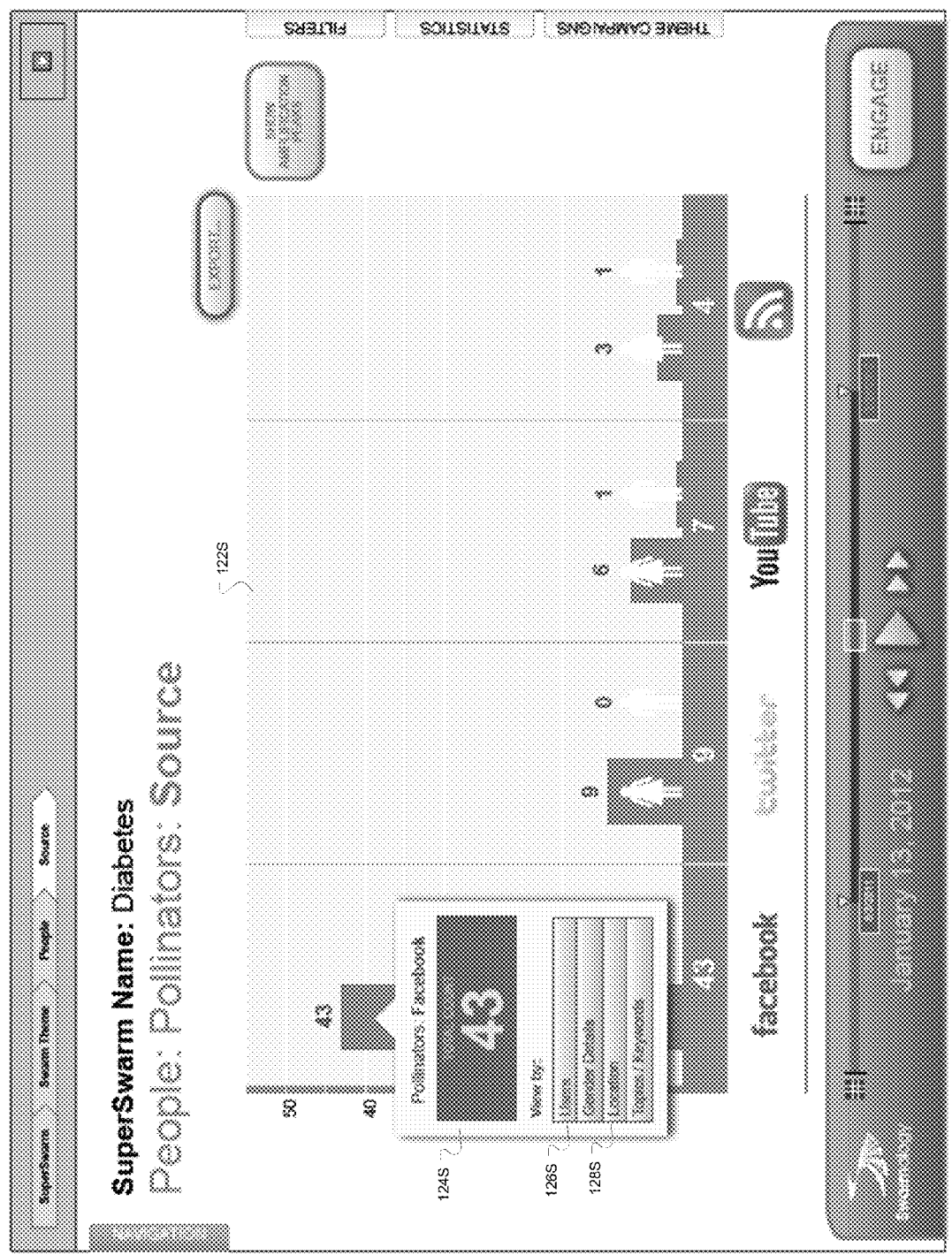
FIG. 25 illustrates a SLA subset of people, source graph based GUI display for viewing various SLA subset participant information based on a data source or provider according to various embodiments.

It is noted that an application user 61 via a user system 60 may also select the engage link via the display 120R (and most displays of the SLAE system 50) of FIG. 24. FIG. 25 illustrates a SLA subset of people, source graph based GUI display 120S for viewing various SLA subset participant information based on a data source or provider according to various embodiments. The SLAE system 50 may generate display 120S of FIG. 25 when an application user 61 selects the social media source button or link 138R of pop-up window 134P of display 120R, FIG. 24. As shown in FIG. 25 the display 120S may include a bar graph 122S representation of the number of people, participants, or authors related to the SLA subset by SMP or source and gender in an embodiment.

The display 120S may also provide a panel 124S for each bar graph when selected by an application user 61 of a user system 60.

Figure 26:
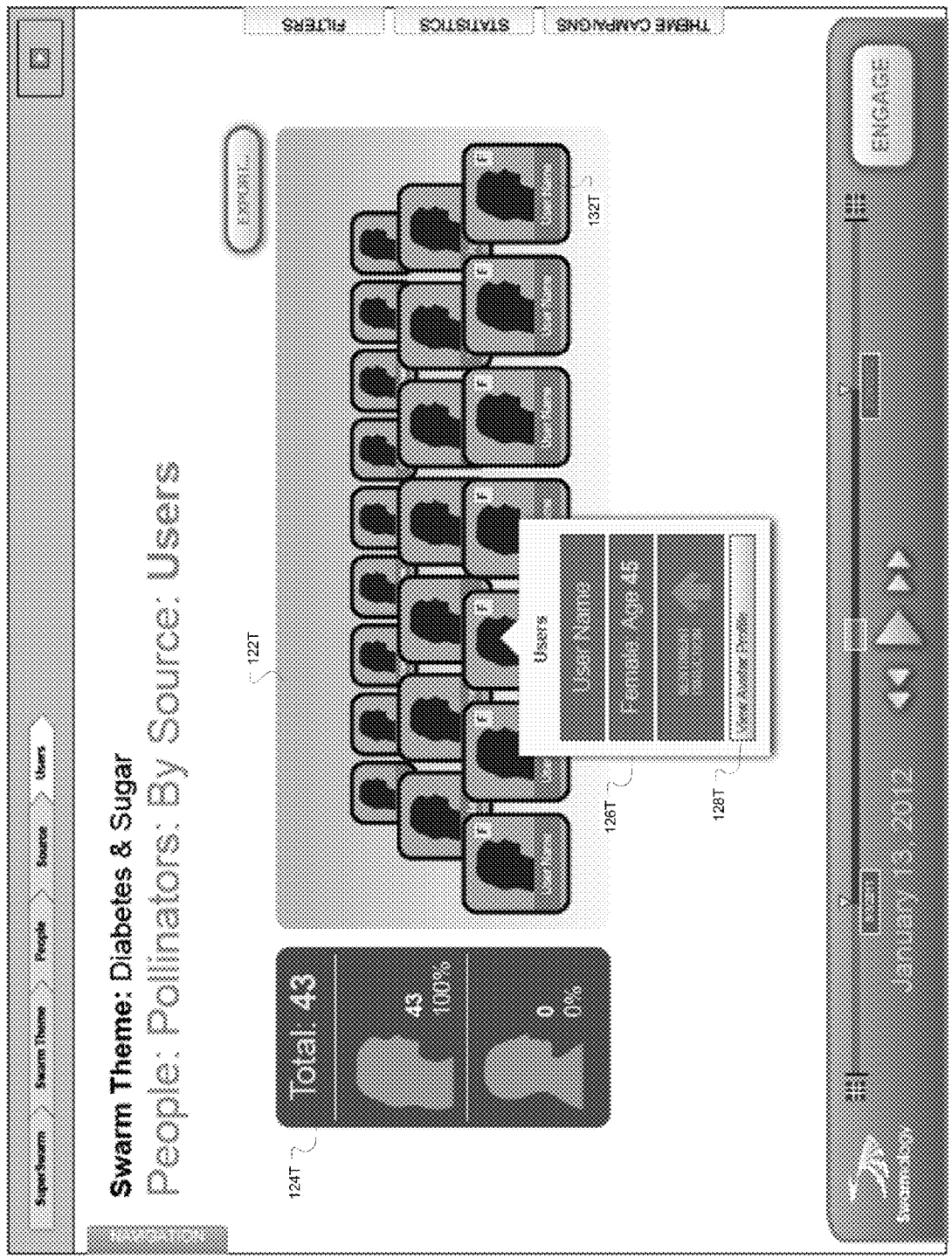
FIG. 26 illustrates a SLA subset of people, source, users graph based GUI display for viewing SLA subset information based on a data source specific-type participants according to various embodiments.

The panel 124S of display 120S, FIG. 25 may include the people count and links for additional data displays based on Users 126S, Gender details, Location 128S, and Topics/Keywords. FIG. 26 illustrates a SLA subset of people, source, users graph based GUI display 120T for viewing SLA subset information based on a data source and specific-type participants according to various embodiments. The SLAE system 50 may generate display 120T of FIG. 26 when an application user 61 selects the Users button or link 126S of pop-up window 124S of display 120S, FIG. 25. As shown in FIG. 26 the display 120T may include an icon 132T representation of the people, participants, or authors related to the SLA subset for the source and category in an embodiment. Each icon 132T may also include a system generated user name associated with the person or author along with gender indication. The display 120T may also provide a panel 126T for each user icon 132T when selected by an application user 61 of a user system 60.

Figure 27:
FIG. 27 illustrates a SLA subset of people, source, users, avatar graph based GUI display for viewing SLA subset information based on data source specific-type users' avatars according to various embodiments.

The panel 126T of display 120T, FIG. 26 may include the system generated user name, gender type, age, sentiment direction, and a link to view the Avatar profile 128T. FIG. 27 illustrates a SLA subset of people, source, users, avatar graph based GUI display 120U for viewing SLA subset information based on a data source specific-type user's avatar according to various embodiments. The SLAE system 50 may generate display 120U of FIG. 27 when an application user 61 selects the View Avatar Profile button or link 128T of pop-up window 126T of display 120T, FIG. 26. As shown in FIG. 27 the display 120U may include profile information 122U about the User or person and conversation threads 124U from SLA subset SM data.

In an embodiment the SLAE system 50 may receive a conversation poster's demographical information along with the conversation post from a SMP. The demographical data may include the posters age or age range, gender, geographical location, employment status, employment type, political or religious affiliation, avatar or posting name. The SLAE system 50 may generate a random avatar to mask the poster's name or online avatar and associate all posts for the poster with the random or assigned avatar.

A user's profile information 122U may include the user's gender, age, SMP or source, Klout® score, number of connections to other people or participants for the SLA subset, Activity percentage, Amplification percentage, Sentiment as relates to the SLA subset, and Key topics 126U associated with the User's post. A user's Klout score may represent the Users (SM participants) effect on SM activity relative to other users. The service provider Klout (www.klout.com) may provide or generate a user's "Klout" score. The SLAE system 50 may request a user's Klout score from the Klout service by providing the user's online or SM user name. As noted the SLAE 50 may replace a SM participant's actual user name with a system generated name to protect the user's identity. The Klout request may be forwarded using a secure server request and the request may be anonymous in an embodiment.

Figure 28:
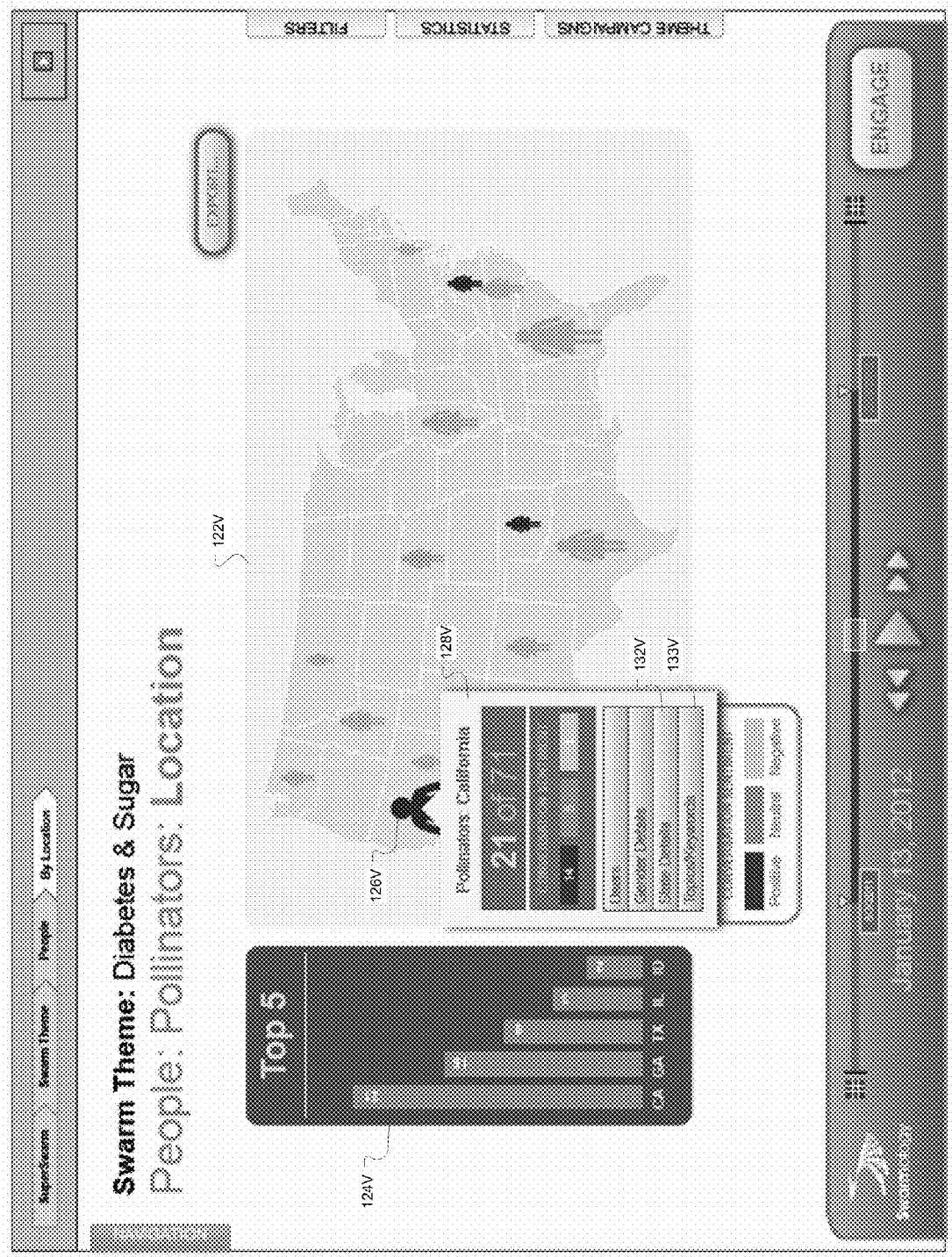
FIG. 28 illustrates a SLA subset of people, location graph based GUI display for viewing SLA subset specific-type participants by geographical location according to various embodiments.

A user's Amplification percentage may represent the user's effect on other conversation growth or amplification based on the user's participation in the captured data representing the SLA subset. The conversation threads 124U may include one or more actual conversations, streams, or posts where the posts are part of the captured data representing the SLA subset. FIG. 28 illustrates a SLA subset of people, location graph based GUI display 120V for viewing SLA subset specific-type participants by geographical location according to various embodiments.

The SLAE system 50 may generate display 120V of FIG. 28 when an application user 61 selects the Location button or link 128S of pop-up window 124S of display 120S, FIG. 25. As shown in FIG. 28 the display 120V may include a geographical display 122V of a region that may include people associated with the SLA subset category. The geographical display 122V may include people icons 126V whose size varies with the number of people or participants of a SLA subset that are located in the region. In an embodiment the people icon 126V color may reflect the average sentiment of the people associated with the region. The display 120V as shown in FIG. 28 may include a top 5 panel 124V that lists the top five regions along with bar graphs representing the number of users and actual user count.

The SLAE 50 may create a pop-up display or window 128V when an application user 61 via a user system 60 selects a people/person icon 126V. The window 128V may indicate the region, number of person/people in selected region and total number of users, conversation sentiment by number of users or persons and links to additional displays for Users, Gender details, State details 132V, and Topics/keywords. FIG. 29 illustrates a SLA subset of people, location graph based GUI display 120W for viewing SLA subset specific-type participants by state or limited geographical location according to various embodiments.

The SLAE system 50 may generate display 120W of FIG. 29 when an application user 61 selects the State Details button or link 132V of pop-up window 128V of display 120V, FIG. 28. As shown in FIG. 29 the display 120W may include a geographical display 126W of a selected region that may include people associated with the SLA subset category for the selected region. The limited region geographical display 126W may include people icons 128W whose size varies with the number of people or participants of a SLA subset that are located in the selected region. The display 120W as shown in FIG. 29 may include a top city panel 122W that lists the top cities 124W in the region along an actual user count for each city and sentiment indicator (by color or shade).

FIG. 30 illustrates a SLA subset of people, location, topics graph based display 120X for viewing SLA subset specific-type participants activity by geographical location and conversation topics according to various embodiments. It is noted that the SLAE system 50 may generate or determine topics during the use learning analysis 112F activity of FIG. 6. The SLAE system 50 may generate display 120X of FIG. 30 when an application user 61 selects the Topics/Keywords button or link 133V of pop-up window 128V of display 120V, FIG. 28. As shown in FIG. 30 the display 120X may include a geographical display 124X showing topics 126X where the topics position on the graph and font size varies with the topic's relevance to the associated SLA subset for the selected people and location in an embodiment. The display 120X as shown in FIG. 30 may also include a top 5 topic mention panel 122X that lists the top 5 topics mentioned in the associated SLA subset for the selected people and location in an embodiment.

FIG. 31 illustrates a SLA subset engage display 120Y for selecting a campaign for engaging one or more participants related to SM data of a SLA subset or set according to various embodiments. The SLAE system 50 may generate display 120Y of FIG. 31 when an application user 61 selects the Engage button or link of various displays including 120S-120X of FIG. 25-30. As shown in FIG. 31 the display 120X may enable an application user 61 to start a conversation campaign, a branded micro-site campaign, or an existing campaign. The display 120Y may include a button or link for starting a conversation campaign 122Y, a button or link for starting a branded micro-site campaign 124Y, and a current campaign panel for viewing and selecting existing campaigns 126Y.

Figure 32:
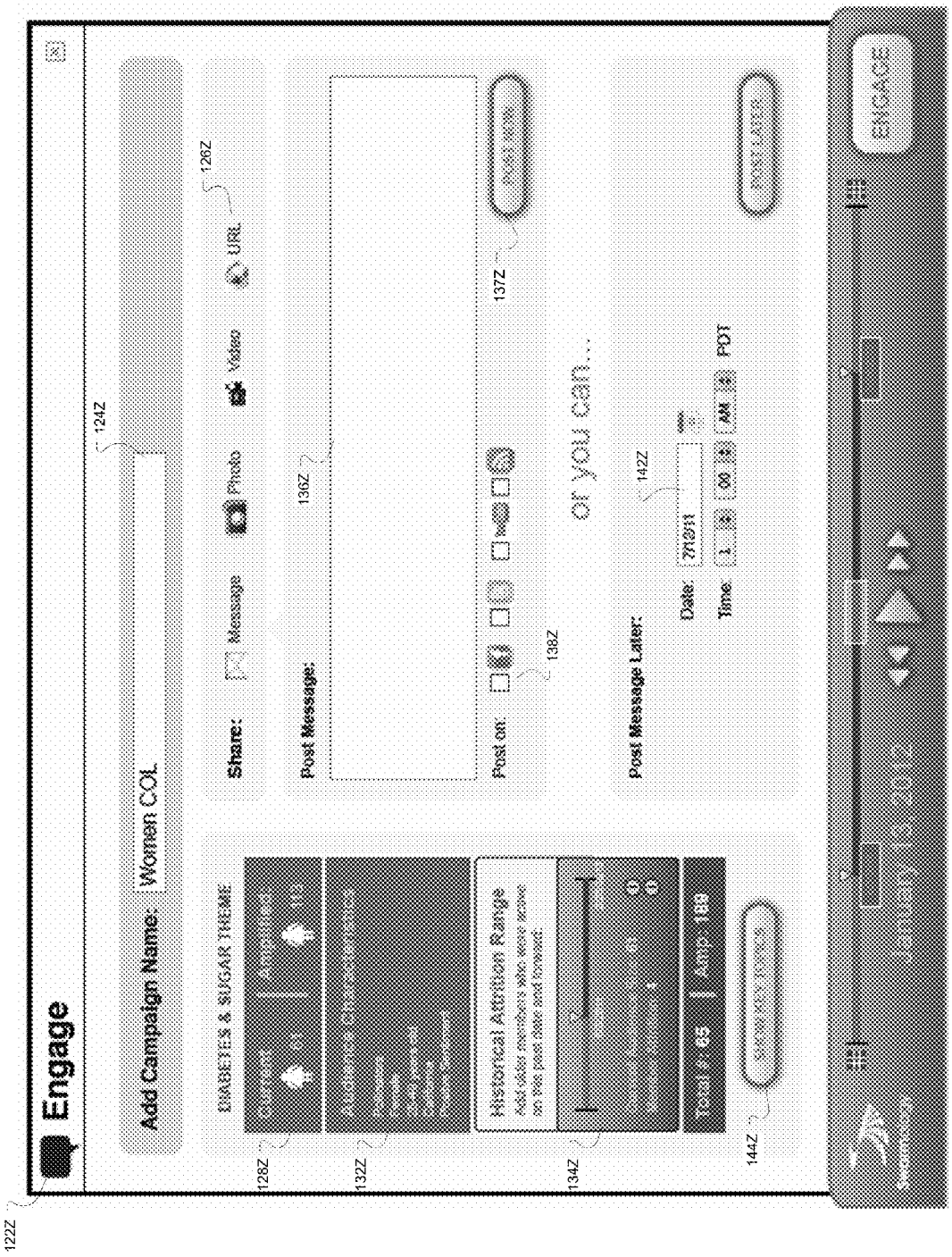
FIG. 32 illustrates a SLA subset conversation engage campaign display for posting media to SM participants via a SM provider and viewing historical attrition range according to various embodiments.

FIG. 32 illustrates a SLA subset conversation engage campaign display 120Z for starting a conversation campaign, posting media to SM participants via SM providers and viewing historical attrition range according to various embodiments. The SLAE system 50 may generate display 120Z of FIG. 32 when an application user 61 selects the conversation campaign button or link 122Y of display 120Y of FIG. 31. As shown in FIG. 32 the display 120Z may enable an application user 61 to select a campaign name 124Z, post any combination of messages, photos, videos, or Uniform Resource Locators (URL) 126Z on one or more SM providers 138Z immediately and simultaneously or at a later time/date 142Z. The display 120Z may also include information about current SM participants, amplified SM participants 128Z, Audience characteristics 132Z based on application user 61 filter selections (FIGS. 18A-D and 19A-D), and SM participant Historical attrition with range selection 134Z.

As shown in FIG. 32 the audience or participants for the SM data (for the specified date range) characteristics may include the main or all participant types such as pollinators, connectors, and long tail members, main gender, age range, main location source (such as State or region), main sentiment where main may be the dominant type of the category or source. In an embodiment an application user 61 may be able to increase the participant list by including posts or conversations from older SM data where the user can use the slider to include older SM data.

As shown in FIG. 32 an application user 61 may be able to enter text, photos, video, and URLs 126Z as part of a post 136Z. The SLAE system 50 may via display 120Z may enable a user to select multiple SMP to post the message 126Z. The SLAE system 50 may direct the post to the various participants based on the SMP the participant employed to post their one or more messages in the captured data set that comprise the SLA set or subset. In an embodiment where a participant has posted on multiple SMP the SLAE system 50 may forward the post message 136Z to the participant on multiple SMP. An application user 61 may delay the message 136Z posting on the various SMP for various participants until a date and time 142Z provided by the application user 61 via the display 120Z. An application user 61 may also select the show key topics button or link 144Z of display 120Z.

In an embodiment the Audience characteristics 132Z may reflect one or more filter selections entered by an application user 61 via filters shown in FIG. 18A to 19D. When an application user selects the post now button or link 137Z of FIG. 32, the SLAE system 50 may post the communication including message 136Z including text, photo, video or URL 126Z to all participants of the related SLA set or subset via their various SMP, a one to many post via multiple social media providers.

Figure 33:
FIG. 33 illustrates a SLA subset conversation engage campaign display for selecting key topics for posting media to SM participants via a SM provider according to various embodiments.

FIG. 33 illustrates a SLA subset conversation engage campaign display 120AA for selecting key topics 134AA for posting media 136AA to SM participants 128AA via a SM provider 138AA according to various embodiments. The SLAE system 50 may generate display 120AA of FIG. 33 when an application user 61 selects the show key topics button or link 144Z of display 120Z of FIG. 32. As shown in FIG. 33 the display 120AA may enable an application user 61 to select key topics 134AA of SM posts where all the participants of the SM posts with the key topics may be sent a post 136AA by an application user 61 simultaneously across various SMP platforms. In an embodiment, the topics 134AA may be generated by a natural language process (NLP) analysis and categorization of the SM data that comprises the SLA set or subset for the conversation campaign 122AA and the use learning analysis activity 112F of process 110 shown in FIG. 6.

Figure 34:
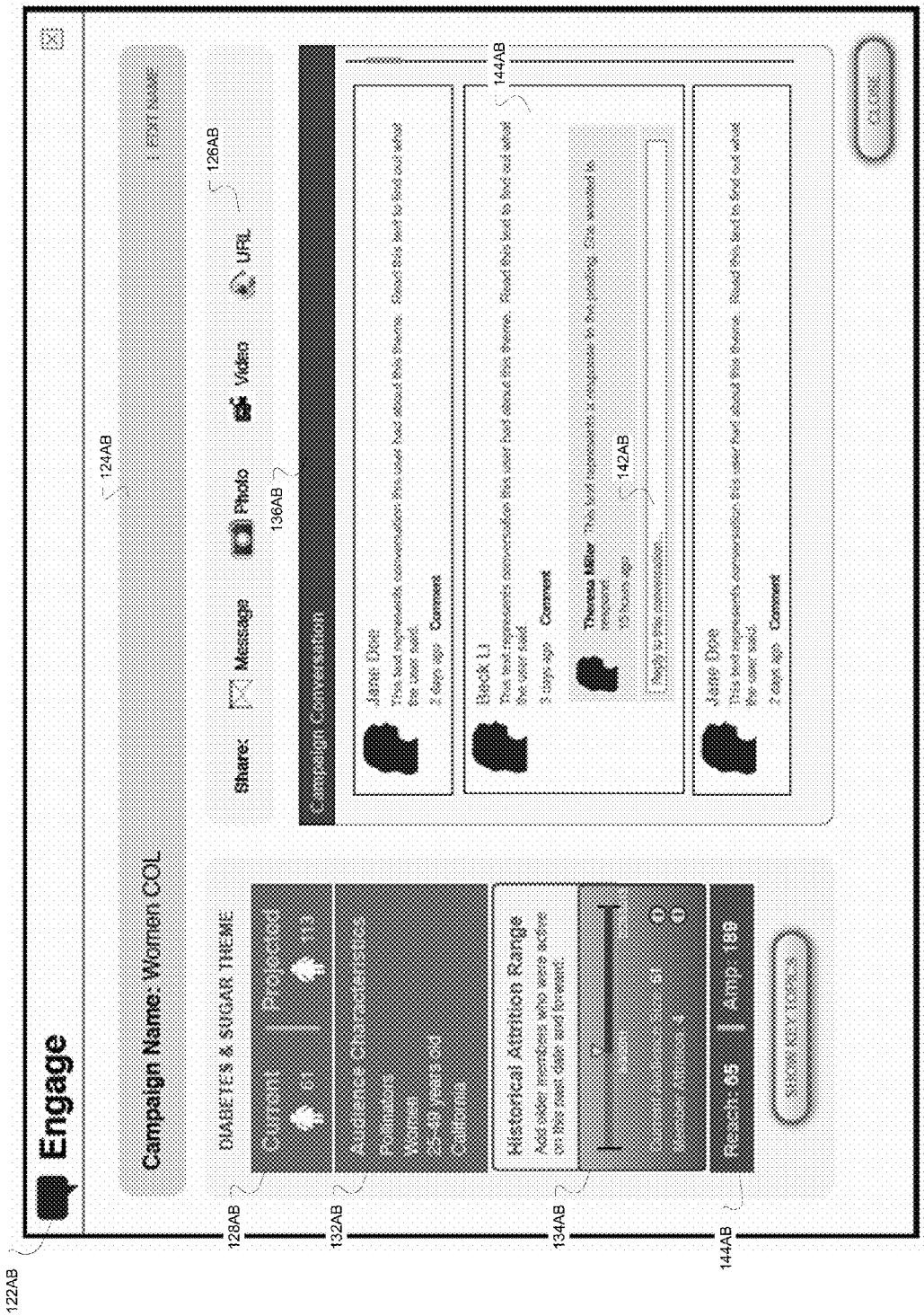
FIG. 34 illustrates a SLA subset conversation engage campaign display for viewing conversations and responding to a specific SM conversation according to various embodiments.

FIG. 34 illustrates a SLA subset conversation engage campaign display 120AB for viewing conversations 136AB and responding 142AB to a specific SM conversation according to various embodiments. The SLAE system 50 may generate display 120Y of FIG. 31 when an application user 61 selects an existing conversation campaign button or link 126Y of display 120Y of FIG. 31. As shown in FIG. 34 the display 120AB may enable an application user 61 to select a conversation 144AB and respond to the conversation 142AB with any combination of messages, photos, videos, or Uniform Resource Locators (URL) 126AB via one or more SM providers. The display 120AB may also include information about current SM participants, amplified SM participants 128AB, Audience characteristics 132AB, SM participant Historical attrition with range selection 134AB, and potential participant reach and amplified participant reach 144AB.

Figure 35A:
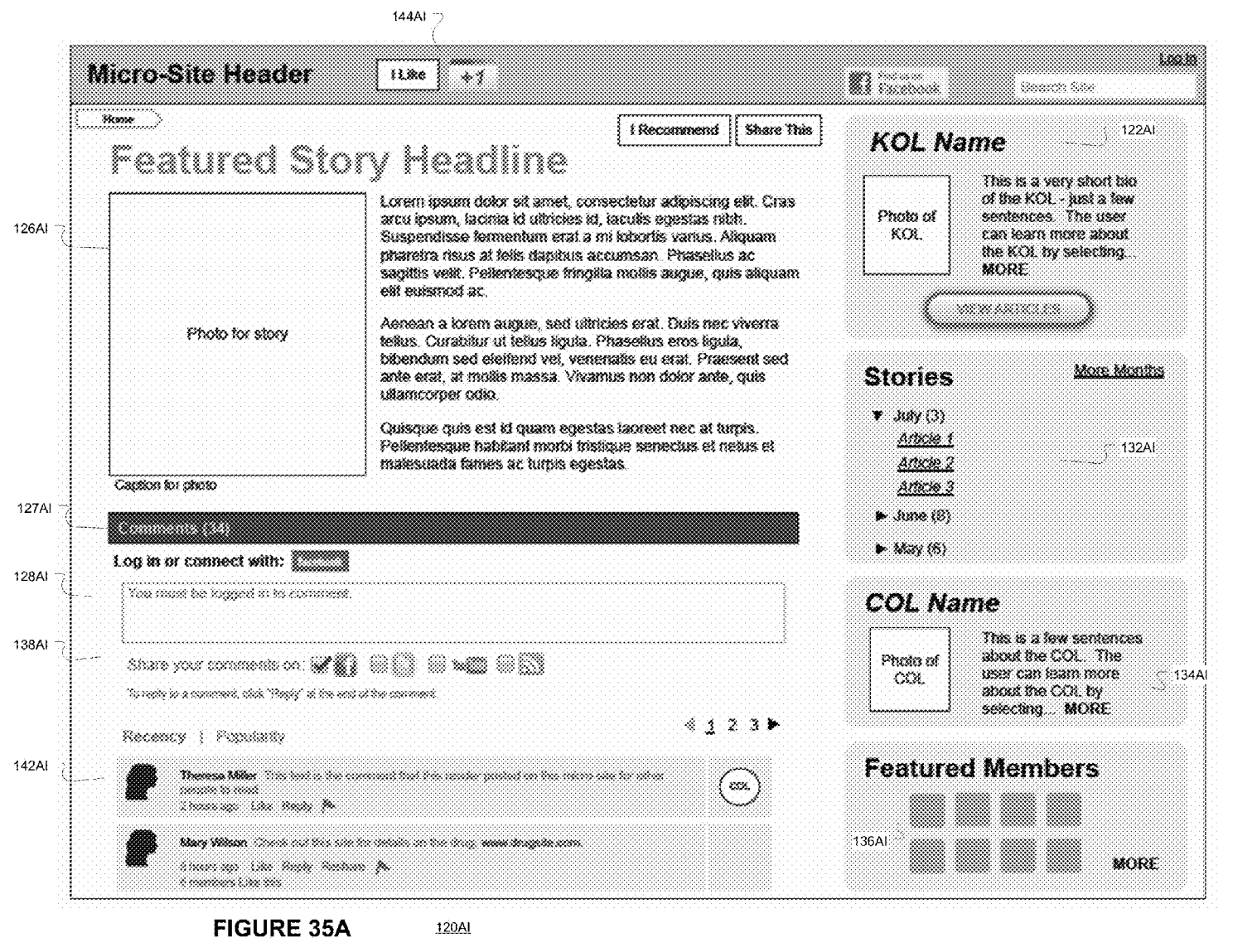

FIG. 35A illustrates a SLA set or subset micro-site campaign display 120AI according to various embodiments. The SLAE system 50 may generate the display 120AI of FIG. 35A when an application user 61 selects create a branded micro-site campaign button or link 124Y of display 120Y of FIG. 31. The SLAE system 50 may enable an application user 61 to create, modify, and maintain a branded website or micro-site 120AI. As shown in FIG. 4, a SLAE system 50 web application module 80 may include a microsite campaign module 82B where the module 82B may create and maintain the branded micro-site 120AI. SLA set and subset SM participants may be invited to view and use the SLAE 50 hosted micro-site 120AI. An application user 61 may moderate and post messages on the micro-site 122AI.

As shown in display 120AI of FIG. 35A a micro-site may include a main story or featured headline 126AI, a comments section 127AI, a key opinion leader (KOL) section 122AI, a story section 132AI, a consumer opinion leader (COL) section or panel 134AI, and a featured members section 136AI. The featured story section 126AI may include one or more featured stories that an application user 61 may provide or select from one or more stories provided by the SLAE system 50. The comments section 127AI may include one or more comments from participants or application users 142AI, a post new message section 128AI, and a SMP selection section 138AI. A micro-site user such as a SLA set or subset participant may post a message on the micro-site or selected SMP 138AI. The posts section 142AI may include recent posts by micro-site users such as a SLA set or subset participants or application users 61.

In an embodiment a KOL may be a primary author(s) of articles on the micro-site. The KOL section 122AI may list one or more KOL by name and include a description of the KOL. The KOL section 122AI may also include a button or link for viewing articles posted by one or more KOL. The story section 132AI may provide links for recent stories by date. In an embodiment a consumer opinion leader (COL) may be a SLA set or subset participant that is a primary SM poster, or have the most micro-site activity. A COL may also be determined by Klout® analysis. The COL section 134AI may include information about the COL including avatar name, photograph, and description of COL. The display 120AI may also include a featured members section 136AI. The featured members section 136AI may list one or more micro-site participants based on their activity levels. A micro-site participant may also indicate site acceptance or like by selecting link or button 144AI. The micro-site may also indicate the number of participants that have indicated their acceptance (or like) the site.

Figure 35B:
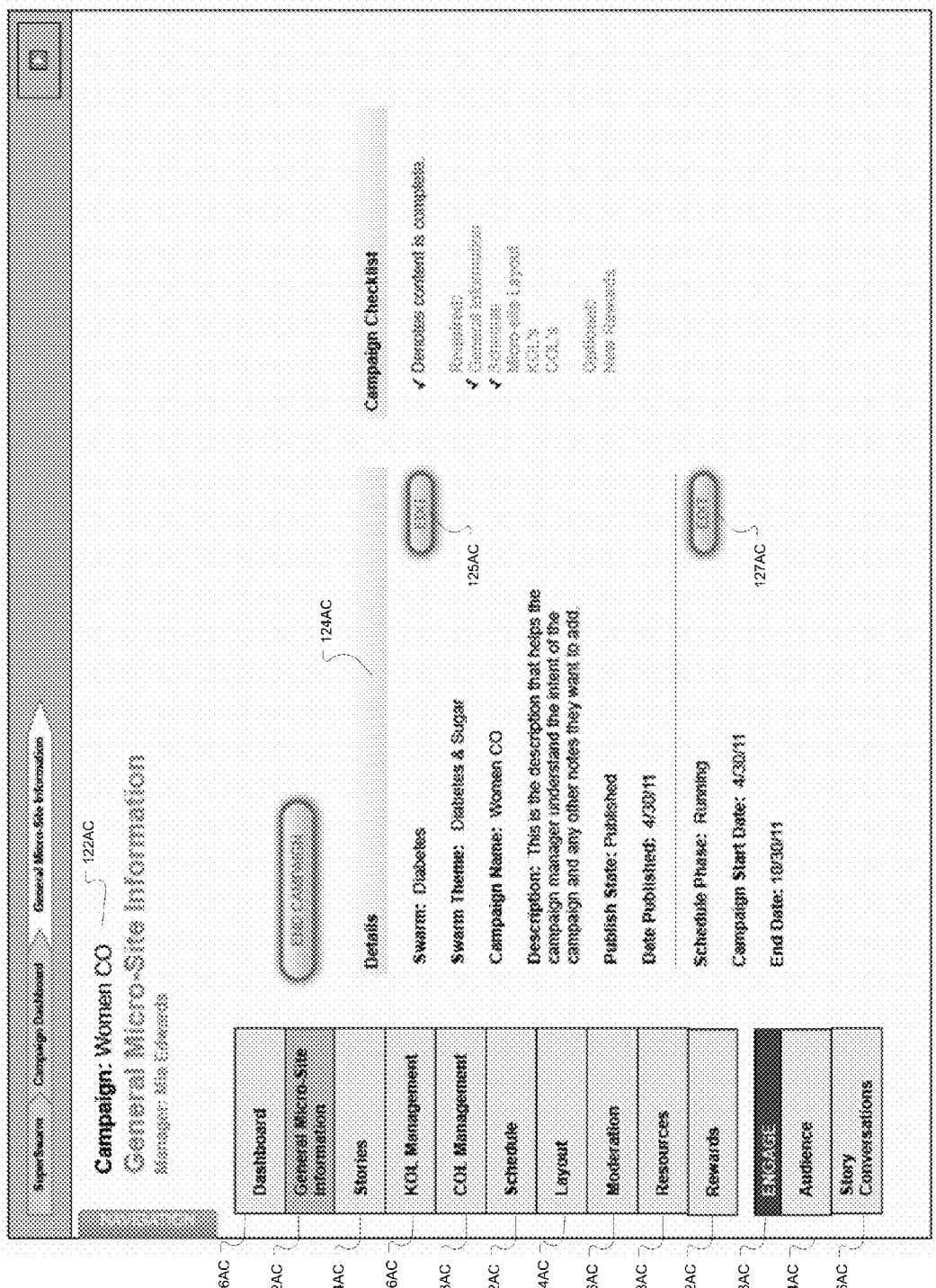
FIG. 35B illustrates a SLA subset general micro-site campaign display for editing a micro-site engagement campaign according to various embodiments.

FIG. 35B illustrates a SLA general micro-site campaign display 120AC for editing a micro-site engagement campaign 122AC according to various embodiments. The SLAE system 50 may generate display 120AC of FIG. 35B when an application user 61 selects an existing branded micro-site campaign button or link 126Y of display 120Y of FIG. 31. The SLAE system 50 may enable an application user 61 to create and maintain a branded website or micro-site 122AC (such as the site shown in display 120AI of FIG. 35A). As shown in FIG. 4, a SLAE system 50 web application module 80 may include a microsite campaign module 82B where the module 82B may enable an application user 61 to create and maintain a branded micro-site such as the site show in display 120AI of FIG. 35A. The display 120AC of FIG. 35B may enable an application user 61 to manage a SLAE system 50 hosted micro-site.

As shown in FIG. 35B the display 120AC may include a campaign name section 122AC, a dashboard section 126AC, an engage section 128AC, and a details section 124AC that may change with the dashboard 126AC selection. The campaign name section 122AC may include the micro-site name as assigned by an application user 61 or SLAE system 50. The campaign name section 122AC may also list the micro-site manager where an application user 61 or SLAE system 50 may assign the manager. As shown in FIG. 35B an application user 61 via the SLAE system 50 display 120AC control functions 126AC may view and edit various micro-site functions including dashboard, general micro-site information, stories, KOL management, COL management, Schedule, Layout, Moderation, Resources, and Rewards.

The schedule details may include options for micro-site generation and lifespan. The layout details may include the micro-site layout and options for modifying same. The moderation details may include controlling the posting options for micro-site participants. The resources details may include memory or disk resources allocated for the micro-site and may limit the number of posts and stories accordingly. The rewards details may include one or more rewards that may be offered to micro-site participants based on activity. The rewards may include coupons or links to coupons for various services and goods of the application user 61 or an application user's client(s). The engage section 128AC may enable an application user to engage a micro-site audience or one or more story conversations of the micro-site.

Figure 35C:
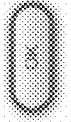
FIG. 35C illustrates a SLA subset general micro-site campaign display for editing a micro-site engagement campaign name and description according to various embodiments.

FIG. 35C illustrates a SLA subset general micro-site campaign display panel 120AI for editing a micro-site engagement campaign name 122AI and description 124AI according to various embodiments. An application user 61 may set or modify a micro-site engagement campaign name 122AI and description 124AI via the panel 120AI. A SLAE system 50 may display the panel 120AI when the button or link 125AC (FIG. 35B) is selected.

Figure 35D:
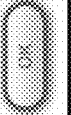
FIG. 35D illustrates a SLA subset general micro-site campaign display for editing a micro-site engagement campaign schedule according to various embodiments.

FIG. 35D illustrates a SLA subset general micro-site campaign display panel 120AJ for editing a micro-site engagement campaign scheduled start date 122AJ and ending date 124AJ according to various embodiments. An application user 61 may set or modify a micro-site engagement campaign scheduled start date 122AJ and ending date 124AJ via the panel 120AI. A SLAE system 50 may display the panel 120AJ when the button or link 127AC (FIG. 35B) is selected.

The scheduled start date 122AJ and ending date 124AJ may determine the time frame or phase in and out of a micro-site engagement campaign.

Figure 35E:
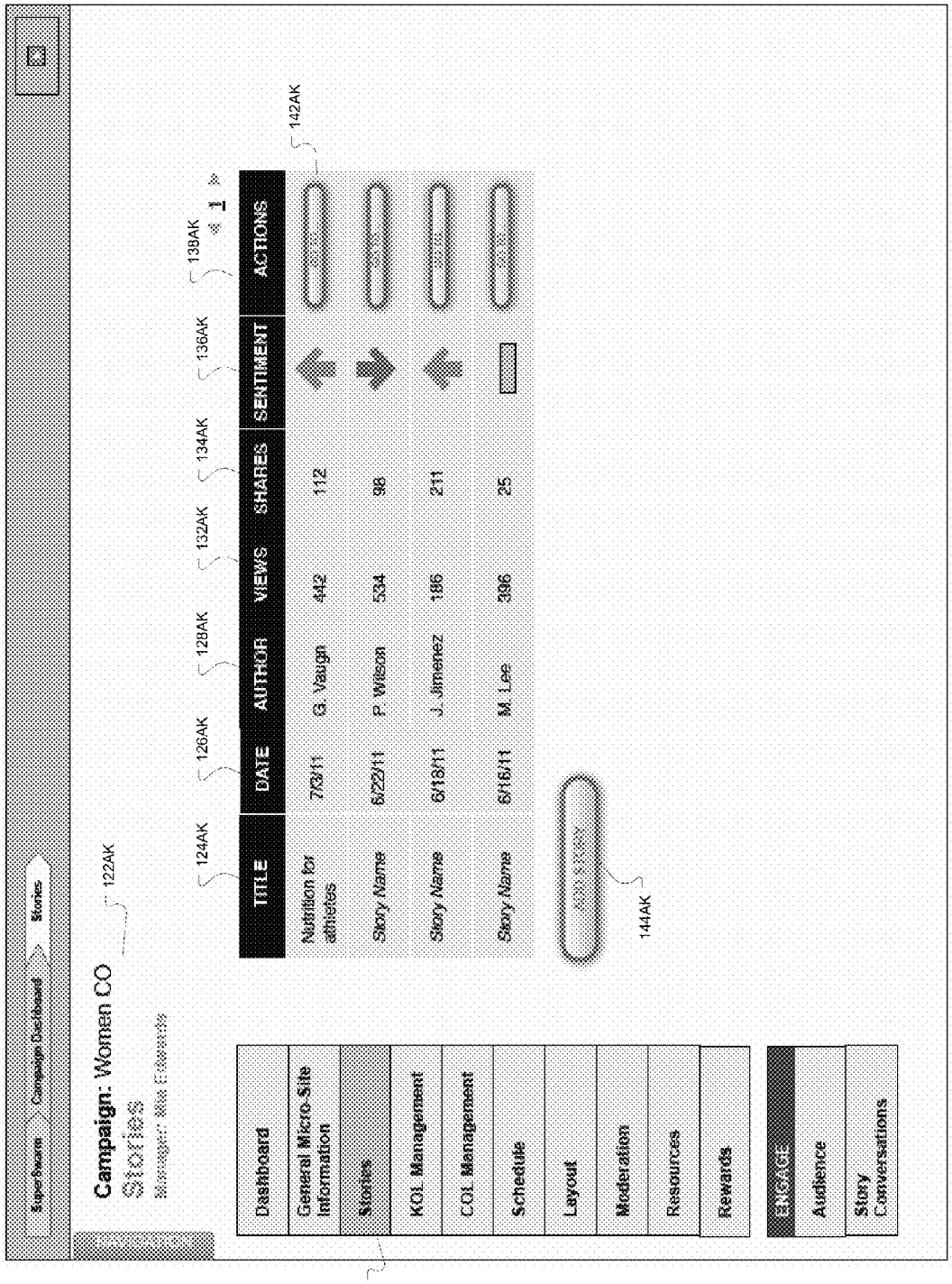
FIG. 35E illustrates a SLA subset general micro-site campaign display for viewing, editing, and adding micro-site engagement campaign stories according to various embodiments.

FIG. 35E illustrates a SLA subset general micro-site campaign display 120AK for viewing, editing, and adding micro-site engagement campaign stories 142AK according to various embodiments. A SLAE system 50 may generate the display 120AK when the button or link 134AC (FIG. 35B) or 126AK is selected. A SLAE system 50 may generate a list 142AK of active stories for a micro-site campaign 122AK. The story list 142AK may include a title 124AK, date story was first posted or created 126AK, one or more authors (or poster) 128AK, number of views 132AK by micro-site 122AK participants, the number of shares 134AK by participants, sentiment 136AK based on comments or posts about the story 142AK and an action button or link 138AK. Each story share 134AK count may indicate a micro-site campaign 122AK participant forwarded the story. An application user 61 may also request an add story display (120AL of FIG. 35F) by selecting the button or link 144AK. A user 61 may also navigate to or request other displays FIG. 35C-35O via the dashboard.

Figure 35F:
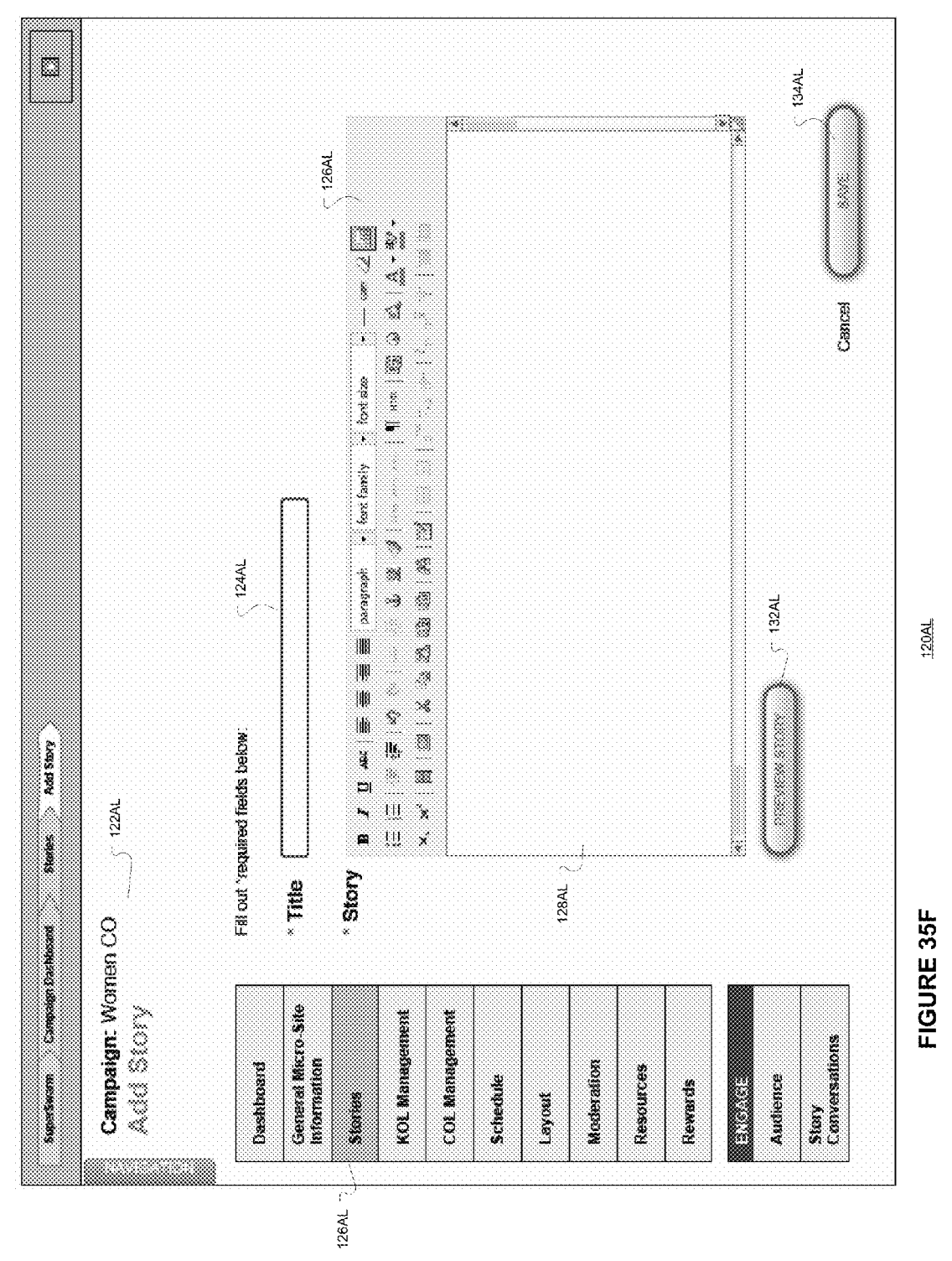

FIG. 35F illustrates a SLA subset general micro-site campaign display 120AL for creating a micro-site engagement campaign story 128AL according to various embodiments. A SLAE system 50 may generate the display 120AK when the add story display button or link 144AK of FIG. 35E is selected. A SLAE system 50 may enable a user 61 to enter a title 124AL and formatted text 128AL via the format menu 126AL. A SLAE system 50 may generate a story preview when a user 61 selects the link or button 132AL. A SLAE system 50 may save a story when a user 61 selects the link or button 134AL.

Figure 35G:
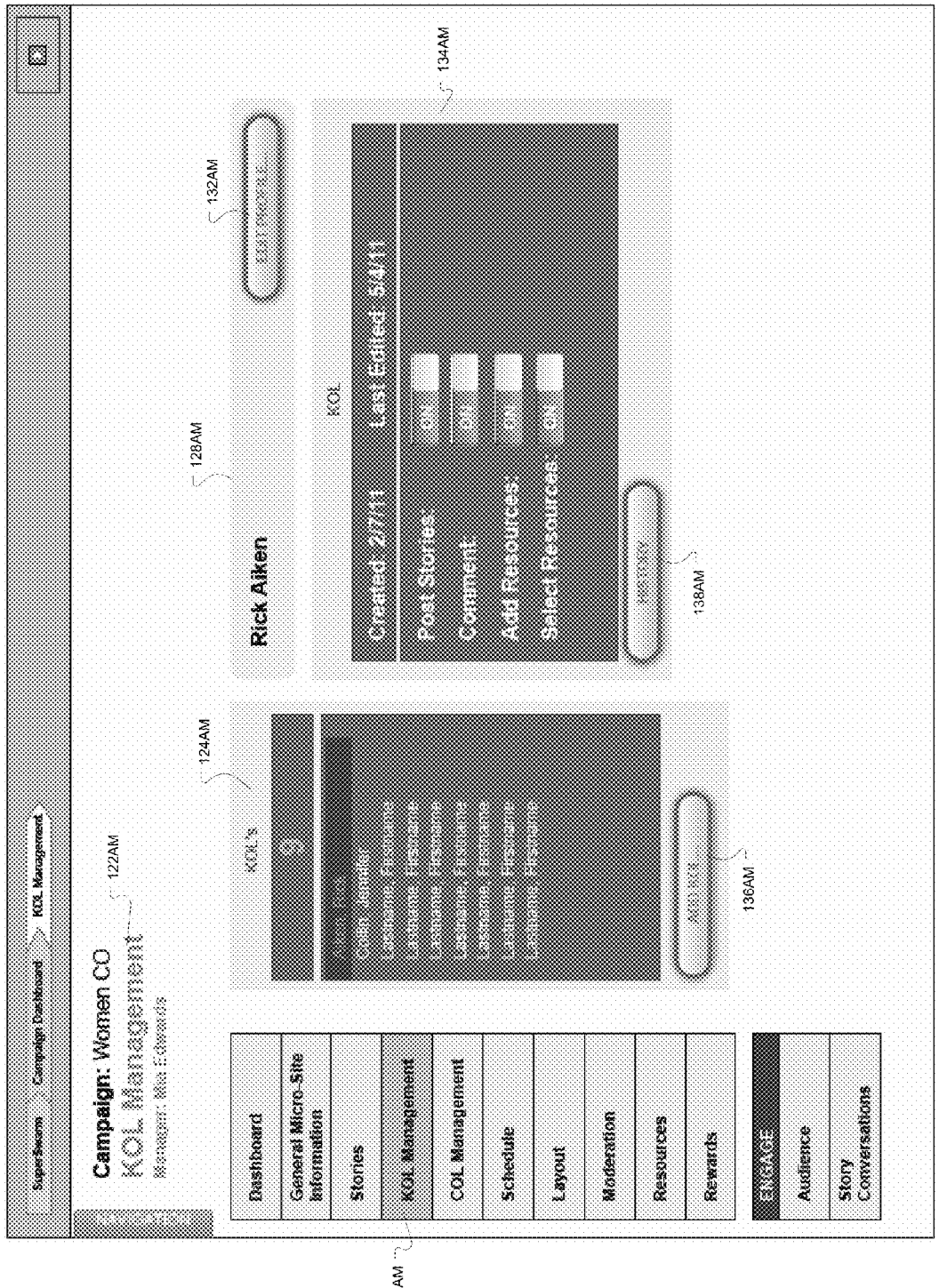
FIG. 35G illustrates a SLA subset general micro-site campaign display for viewing, editing, and adding micro-site engagement campaign Key Opinion Leaders (KOL) according to various embodiments.

FIG. 35G illustrates a SLA subset general micro-site campaign display 120AM for viewing, editing, and adding micro-site engagement campaign Key Opinion Leaders (KOL) 124AM according to various embodiments. A SLAE system 50 may generate the display 120AM when the button or link 136AC (FIG. 35B) or 126AM is selected. A SLAE system 50 may generate a list 124AM of active KOLs. The SLAE system 50 may provide a KOL control or option panel 134AM when a KOL 124AM is selected. The panel 134AM may display the KOL name 128AM and enable a user 61 to edit the KOL profile 132AM. A KOL profile may include media related to the KOL including pictures, video, and text. A user 61 via KOL control panel 134AM may control or limit a KOL activities including the ability to post stories, comment on stories, add resources (external links in an embodiment) and access or select resources via the slidable buttons of control panel 134AM.

Figure 35H:
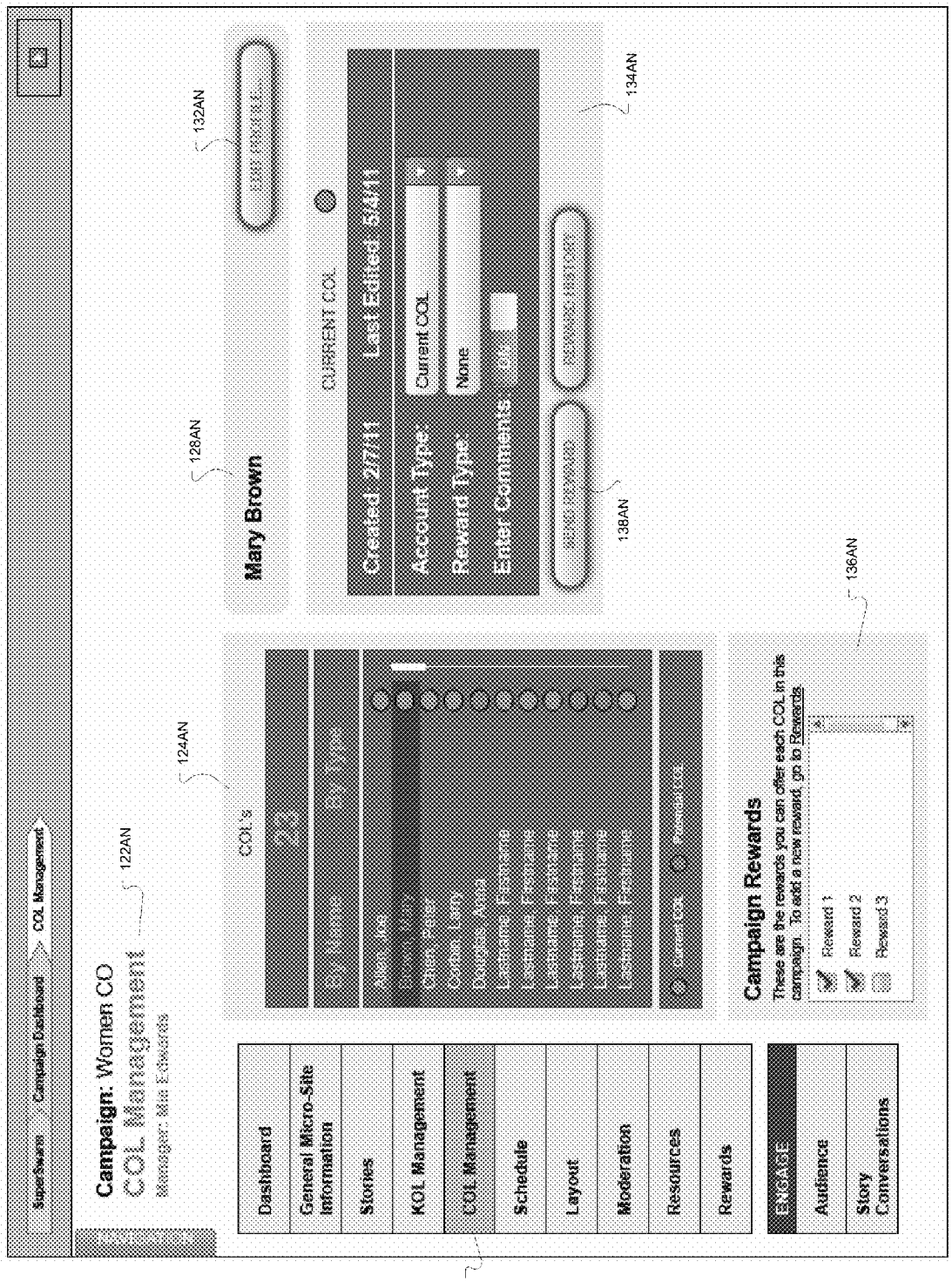
FIG. 35H illustrates a SLA subset general micro-site campaign display for viewing, editing, adding, and managing micro-site engagement campaign Consumer Opinion Leaders (COL) according to various embodiments.

FIG. 35H illustrates a SLA subset general micro-site campaign display 120AM for viewing, editing, and adding micro-site engagement campaign Consumer Opinion Leaders (COL) 124AN according to various embodiments. A SLAE system 50 may generate the display 120AN when the button or link 138AC (FIG. 35B) or 126AN is selected. A SLAE system 50 may generate a list 124AN of active COL including current and potential COL. A COL may be considered a current COL based on a first minimum activity level on the micro-site campaign 122AN. A COL may be considered a potential COL based on a second, lower minimum activity level on the micro-site campaign 122AN.

The SLAE system 50 may provide a COL control panel 134AN when a COL 124M is selected. The control panel 134AN may display the COL name 128AN and enable a user 61 to edit their COL profile 132AN. A COL profile may include media related to the COL including pictures, video, and text. A user 61 via a COL control panel 134AN may designate that a COL is a potential, current COL, or former COL. A user 61 may also indicate the types of rewards the COL is eligible to recess where the reward types may be coupons for various goods and services and money in an embodiment. A user 61 may also send a COL an immediate award via button or link 138AN. A user 61 via panel 136AN may select the rewards that are available for the micro-site campaign 122AN for COL 124AN. A user 61 via the SLAE system 50 display 120AT of FIG. 35M may create, modify, and delete rewards that may be selectable via panel 136AN of FIG. 35H.

Figure 35I:
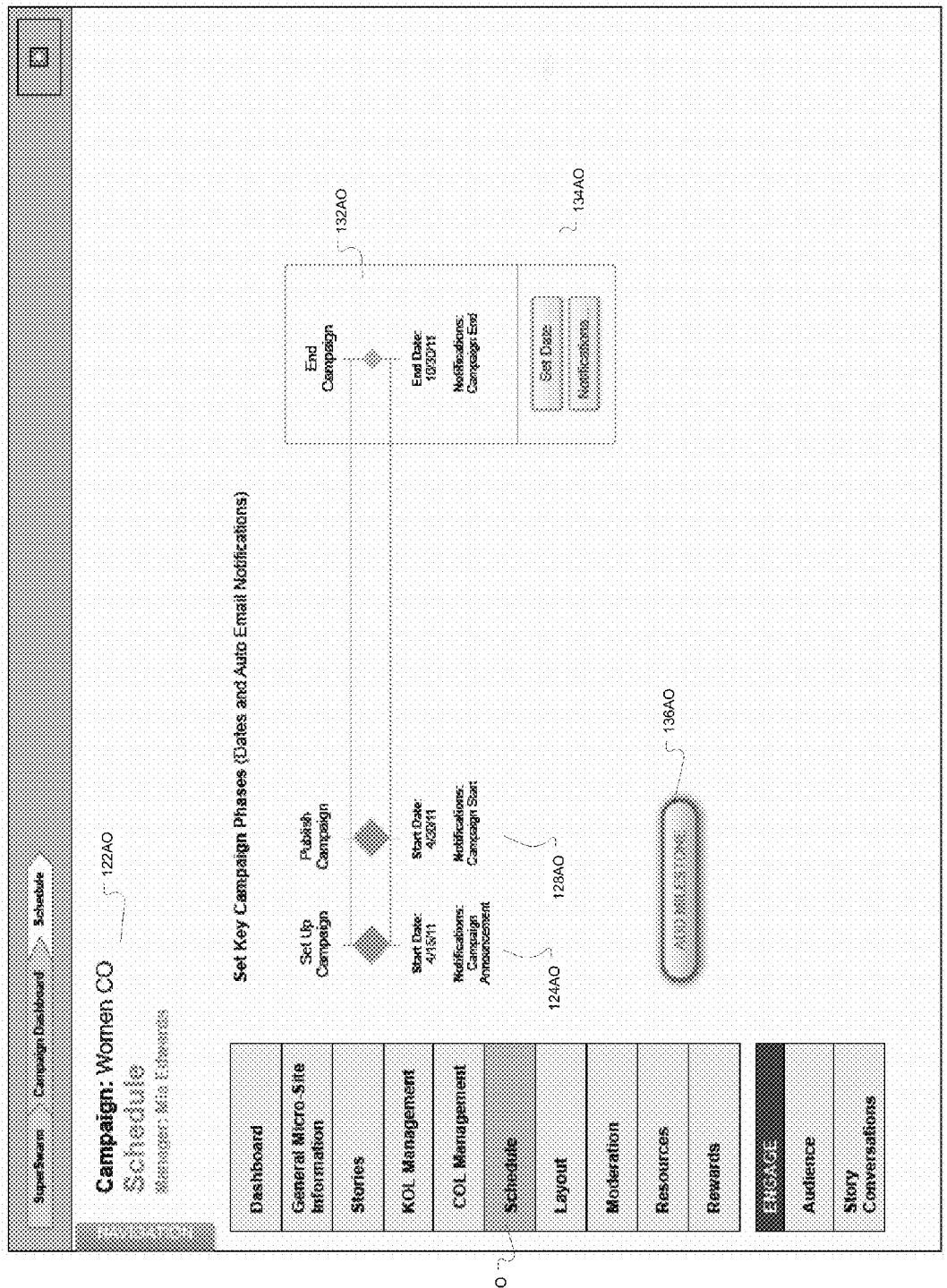
FIG. 35I illustrates a SLA subset general micro-site campaign display for modifying and adding micro-site engagement campaign schedule phases according to various embodiments.

FIG. 35I illustrates a SLA subset general micro-site campaign display 120AO for modifying and adding micro-site engagement campaign schedule phases 124AO, 128AO, 132AO according to various embodiments. A SLAE system 50 may generate the display 120AO when the button or link 142AC (FIG. 35B) or 126AO is selected. A SLAE system 50 may generate a list of active schedule phases or milestones. As shown in FIG. 35I a micro-site campaign 122AO phase or milestone may include a setup campaign phase or milestone 124AO, a publish campaign phase or milestone 128AO, and an end campaign phase or milestone 132AO. A phase or milestone 132AO may include an option section 134AO for setting or modifying the date for the milestone and providing various notifications based on the achievement of the respective milestone. The notifications may include posts to campaign site managers, KOL, COL, and micro-site campaign participants or audience. A user 61 may also add other milestones or phases via the button or link 136AO.

Figure 35J:
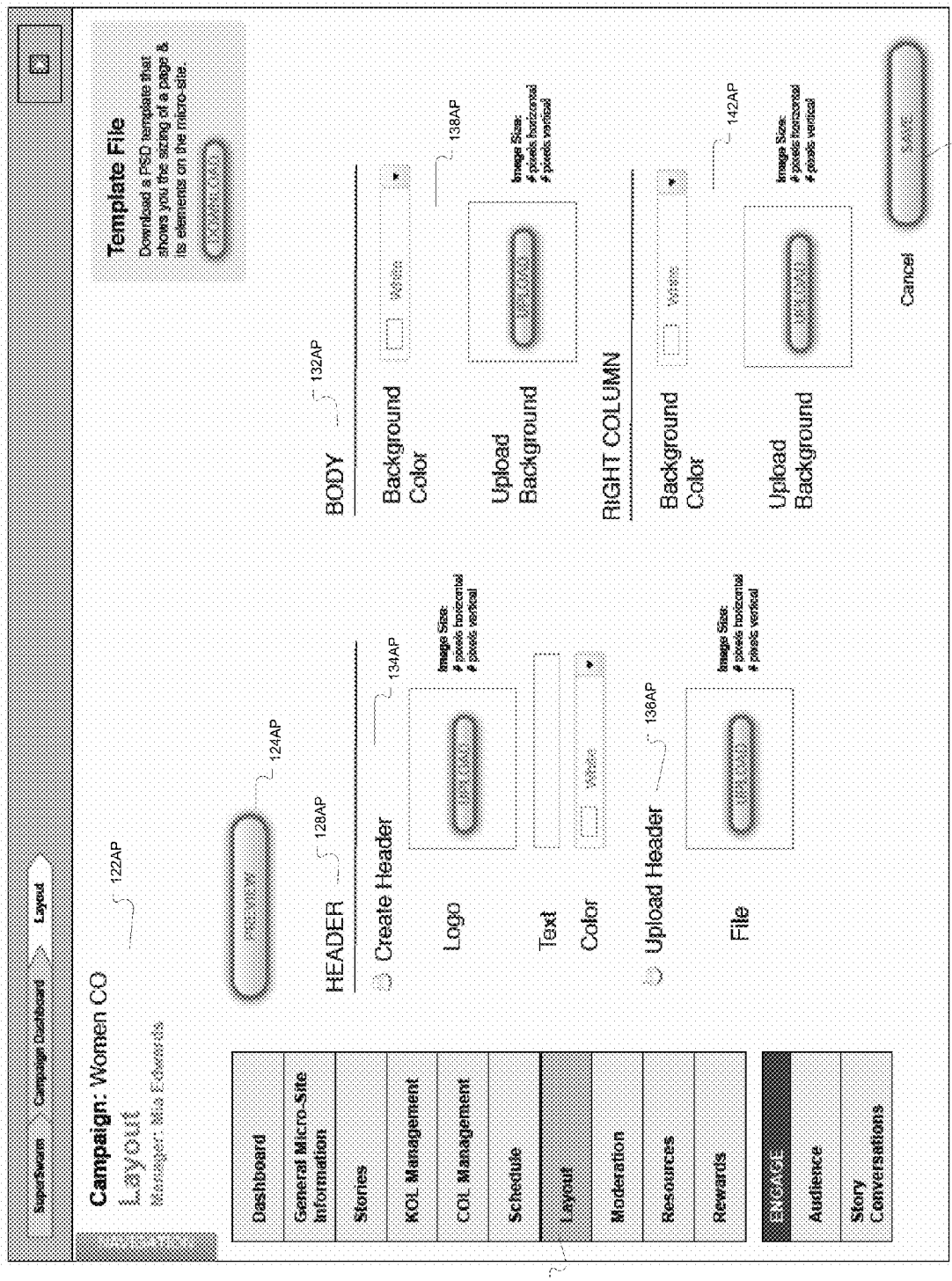
FIG. 35J illustrates a SLA subset general micro-site campaign display for configuring a micro-site engagement campaign general layout according to various embodiments.

FIG. 35J illustrates a SLA subset general micro-site campaign display 120AP for configuring a micro-site engagement campaign general layout options according to various embodiments. A SLAE system 50 may generate the display 120AP when the button or link 144AC (FIG. 35B) or 126AP is selected. As shown in FIG. 35J a user 61 may select various micro-site campaign 122AP display attributes including the site 122AP header 128AP, body 132AP, and right column 142AP in an embodiment. The header options 128AP may include the ability to upload a logo image file, specify text, color and upload a complete header image file 136AP. The site 122AP body options 132AP may include selecting one or more background colors and uploading a background image file. The site 122Ap right column options 142AP may include selecting one or more background colors and uploading a background image file. A user 61 may be able to preview the layout by selecting the button or link 124AP and save the selected layout options by selecting the button or link 144AP.

Figure 35K:
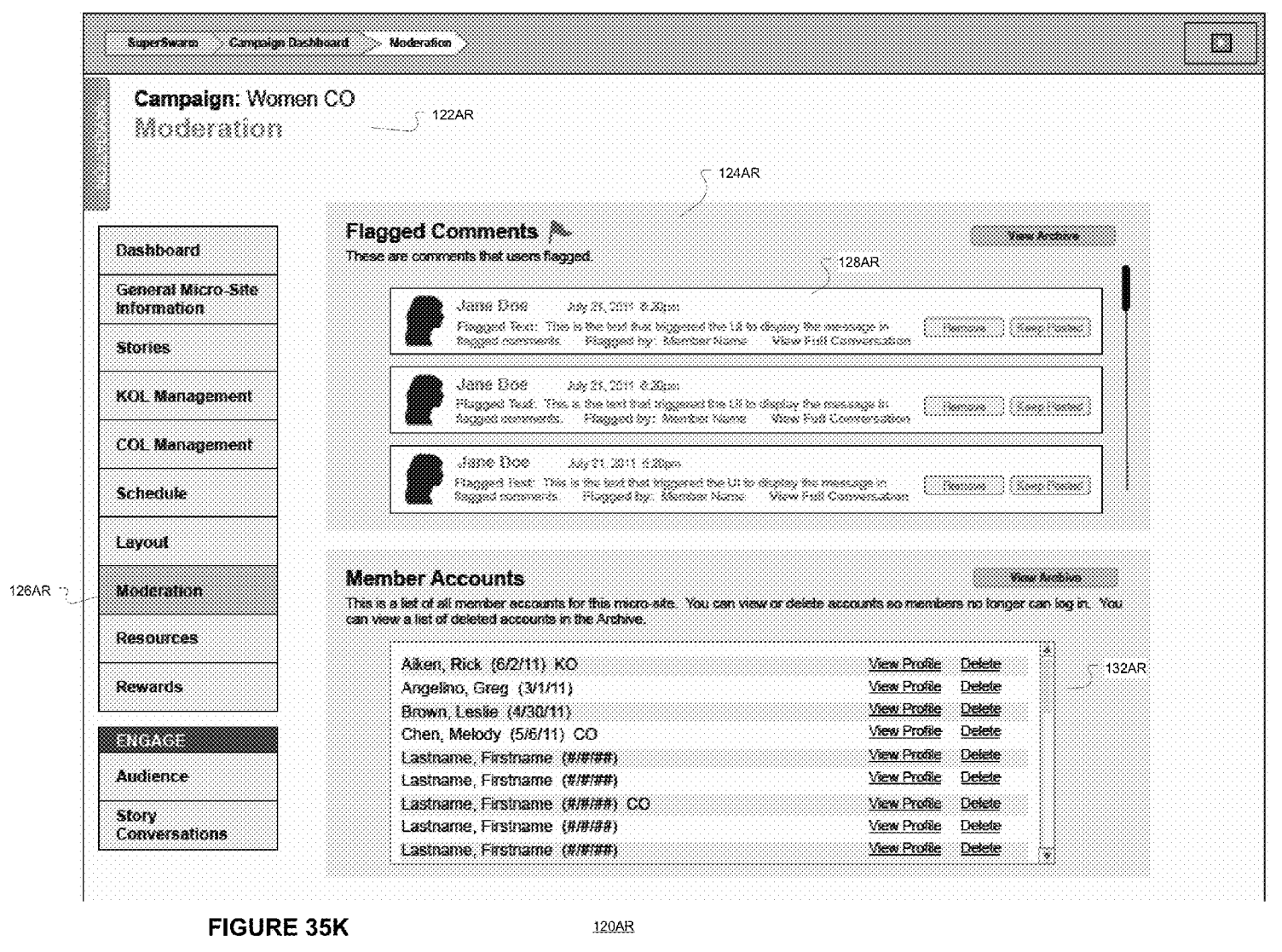

FIG. 35K illustrates a SLA subset general micro-site campaign display 120AR for moderating posts 124AR and users 132AR on a micro-site engagement campaign 122AR according to various embodiments. A SLAE system 50 may generate the display 120AR when the button or link 146AC (FIG. 35B) or 126AR is selected. As shown in FIG. 35K, the display 120AR includes a comments panel 124AR and a member, user, or participant accounts panel 132AR. In an embodiment micro-site campaign members may be able to flag comments (to stories). The comments shown in panel 124AR may include member flagged comments. In an embodiment the SLAE system 50 may automatically flag comments or posts based on their sentiment and language where the system 50 may employ language processing including natural language processing to determine content intent in a post or comment.

A user 61 may review the flagged posts or comments via panel 124AR and remove or keep posts or comments 128AR. A user 61 via the member account panel 132AR may be able to view member account profiles and delete accounts. The member listing may indicate the member type (KOL, COL) and may further provide an indication of how many of their posts or comments were deleted by moderation (panel 124AR) to detect problematic members.

Figure 35L:
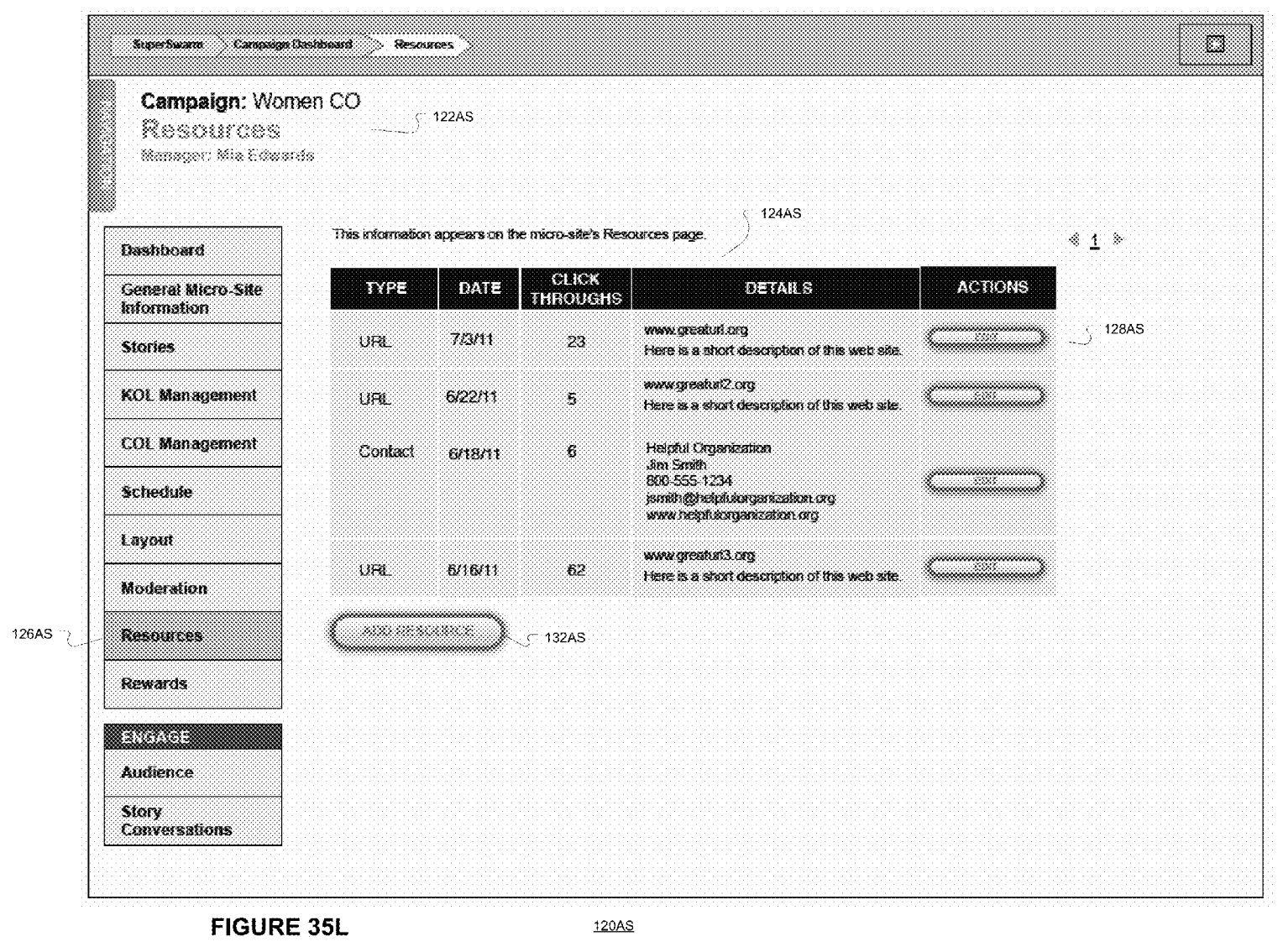

FIG. 35L illustrates a SLA subset general micro-site campaign display 120AS for editing and adding resources 124AS on a micro-site engagement campaign 122AS according to various embodiments. A SLAE system 50 may generate the display 120AS when the button or link 148AC (FIG. 35B) or 126AS is selected. As shown in FIG. 35L, the display 120AR includes an active resources (or external links in an embodiment) control panel 124AS. The resource control panel 124AS may include the resource type, date created, number of lifetime selections (click throughs), list of the link and description under details, and action button or link. A user via the edit button or link 128AS may be able to modify or delete a resource in an embodiment. An application user 61 may also be able to add a new resource via the add resource button or link 132AS.

Figure 35M:
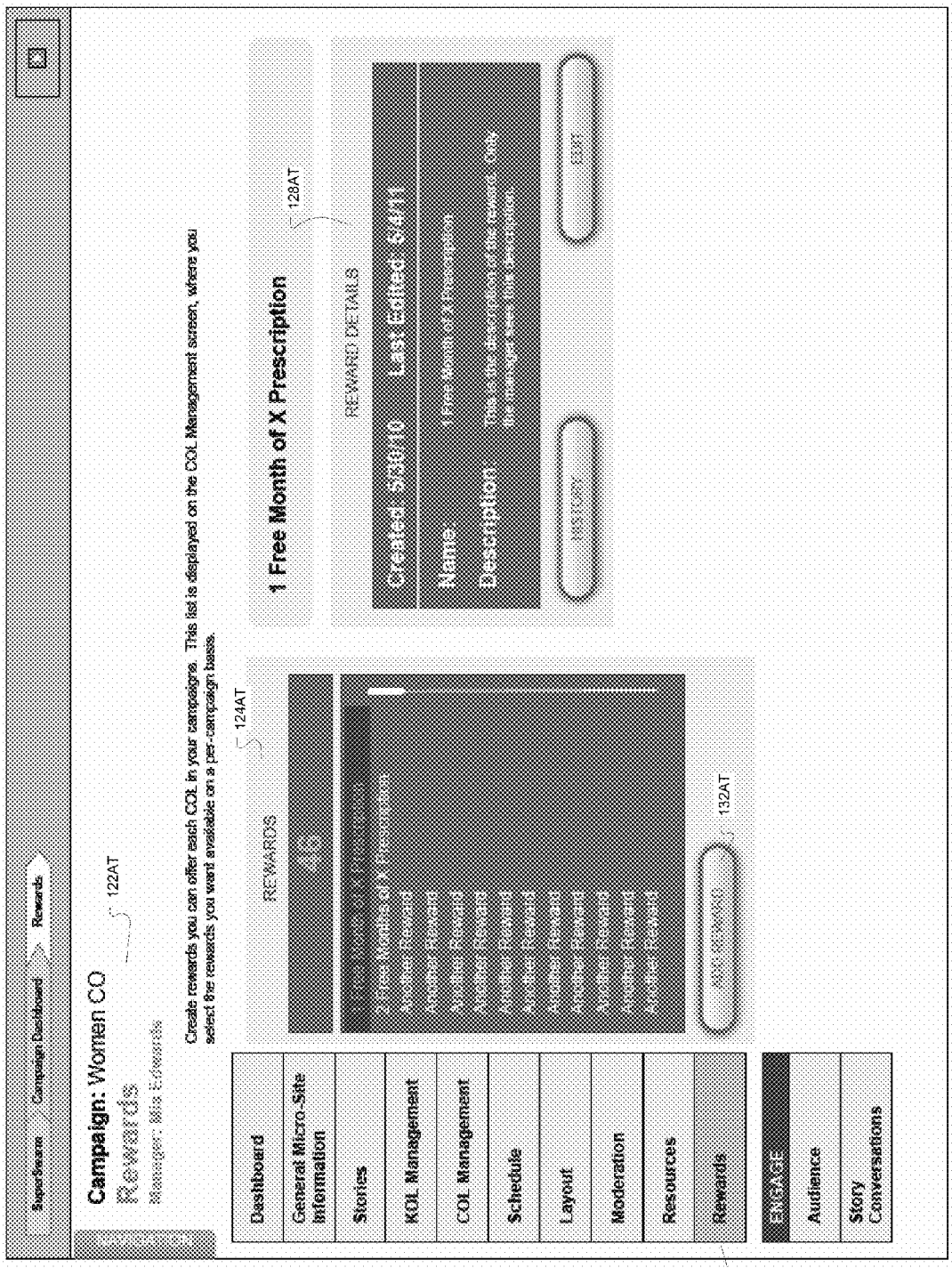
FIG. 35M illustrates a SLA subset general micro-site campaign display for viewing, editing, and adding rewards on a micro-site engagement campaign according to various embodiments.

FIG. 35M illustrates a SLA subset general micro-site campaign display 120AT for viewing, editing, and adding rewards 124AT on a micro-site engagement campaign 122AT according to various embodiments. A SLAE system 50 may generate the display 120AT when the button or link 152AC (FIG. 35B) or 126AT is selected. As shown in FIG. 35L, the display 120AT may include an active rewards list panel 124AT and reward details panel 128AT. An application user 61 via SLAE system 50 rewards list panel 124T may be able to select an active reward to review its details (via rewards detail panel or window 128AT) and add a new reward by selecting add reward button or link 132AT. The rewards details panel 128AT may indicate the reward creation and last edit dates, name, and a description of the reward. The details panel 128AT may also enable a user 61 to view a rewards history (via button or link) and edit a reward (via button or link). A reward may be limited to particular micro-site campaign 122AT member types (KOL, COL), assigned to members by a user, and earned by members based on selected criteria or requirements. A member reward 124AT may include a coupon for goods or services and monetary renumeration in an embodiment.

Figure 35N:
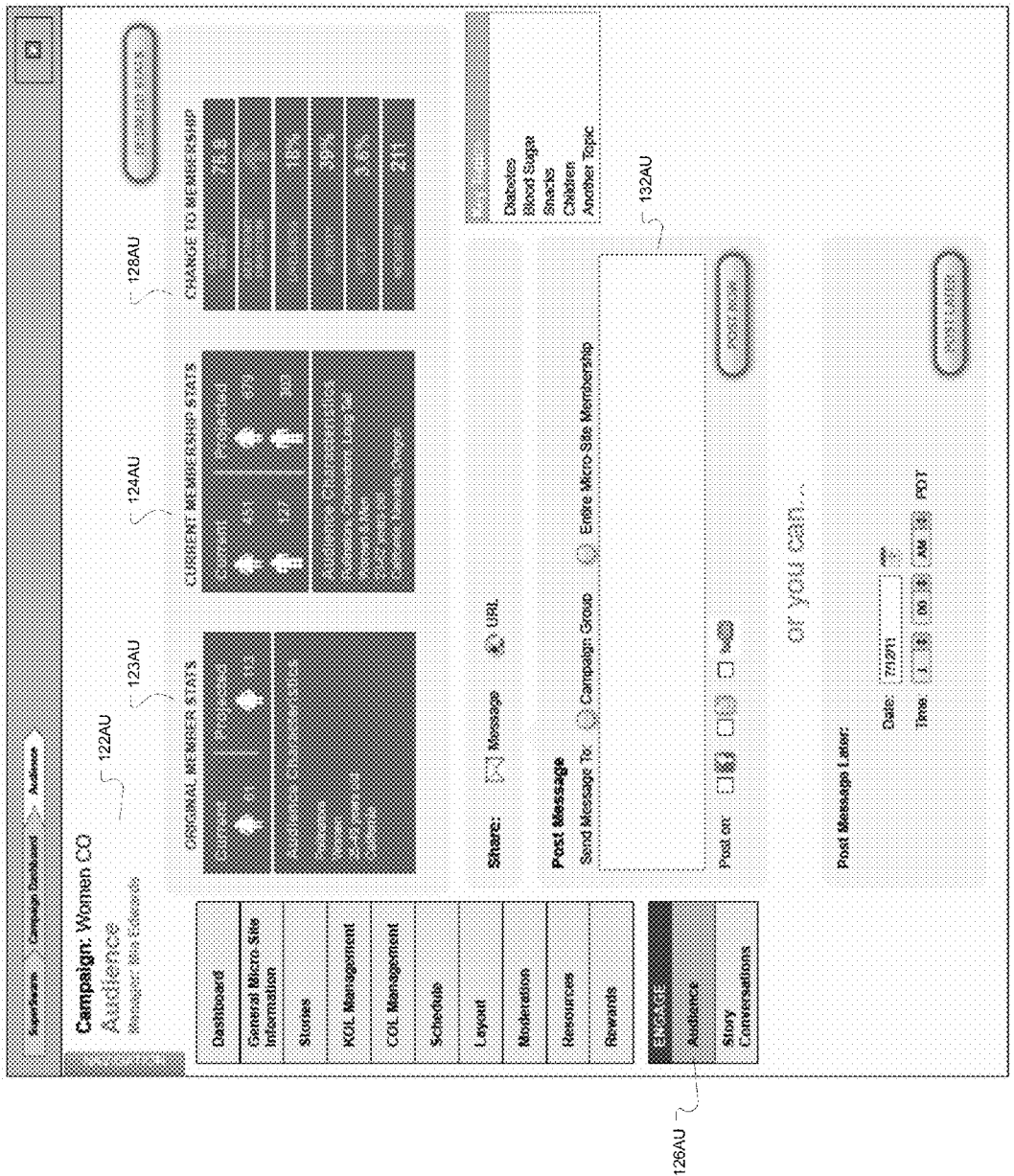
FIG. 35N illustrates a SLA subset general micro-site campaign display for monitoring site participants or projected audience and engaging participants on a micro-site engagement campaign according to various embodiments.

FIG. 35N illustrates a SLA subset general micro-site campaign display 120AU for monitoring and communicating with members, participants, or audience of a micro-site engagement campaign 122AU according to various embodiments. A SLAE system 50 may generate the display 120AU when the button or link 154AC (FIG. 35B) or 126AU is selected. As shown in FIG. 35L, the display 120AT may include an original member statistics panel 123AU, a current member statistics panel 124AU, change in member panel 128AU, and post to members panel 132AU. The original member statistics panel 123AU may indicate the number of initial members by gender of a micro-site campaign 122AU for a predetermined time interval (such as the first month of the campaign 122AU in an embodiment). The panel 123AU may also indicate a projected number of members by gender within a predetermined additional time interval and various audience characteristics including member type based on activity (pollinators, connectors, and tail), gender, age, and geographical location.

The current member statistics panel 124AU may indicate the number of current members by gender of a micro-site campaign 122AU. The panel 124AU may also indicate a projected number of members by gender within a predetermined additional time interval and various audience characteristics including member type based on activity (pollinators, connectors, and tail), gender, age, and geographical location. The change to membership panel 128U may provide additional statistical information based on changes in member during a predetermined time interval. The additional statistics or information may include a combined index, sentiment direction, liveliness, activity, uplift, difference in member count. Liveliness may be related to the number of postings or views relative to the total number of members, activity may be the overall activity not scaled by member base, and uplift may be related to the change in sentiment overall during the predetermined time interval.

The display 120AU of FIG. 35N may include a posting panel 132AU. An application user 61 via the SLAE system 50 may post a message or URL to the entire campaign group or all micro-site members (including other campaigns). The post may be limited to one or more SMP. In an embodiment the SLAE system 50 may send a message or post to a member via the SMP that the member more frequently employs to post or view messages or posts on the micro-sites 122AU. The SLAE system 50 may send the message simultaneously to all selected members via multiple SMP immediately or at a later user specified time (post later button or link selected in post panel 132AU).

Figure 35O:
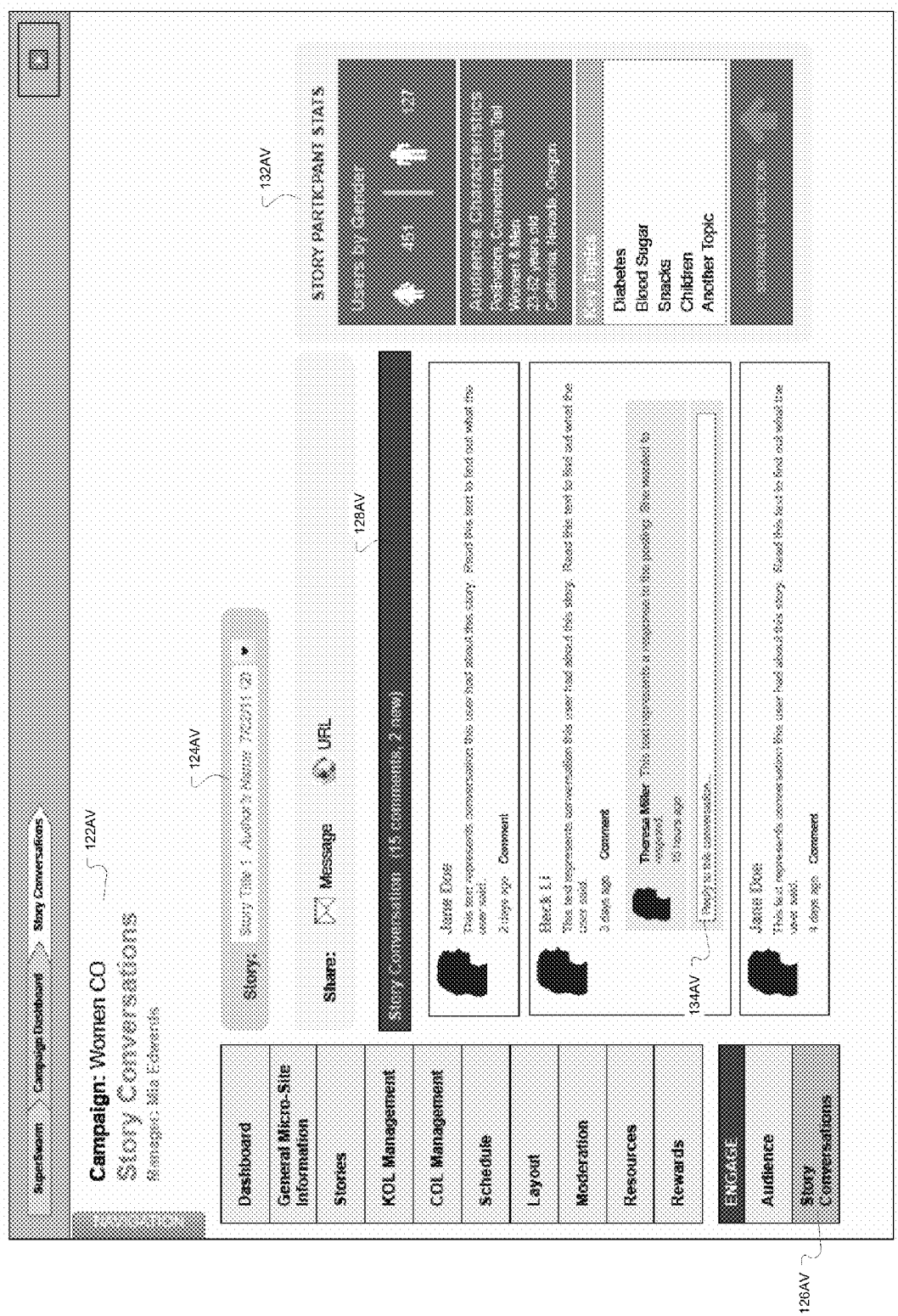
FIG. 35O illustrates a SLA subset general micro-site campaign display for viewing and responding to posts related to stories on a micro-site engagement campaign according to various embodiments.

FIG. 35O illustrates a SLA subset general micro-site campaign display 120AV for viewing and responding to posts or comments related to stories on a micro-site engagement campaign 122AV according to various embodiments. A SLAE system 50 may generate the display 120AV when the button or link 156AC (FIG. 35B) or 126AV is selected. As shown in FIG. 35L, the display 120AV may include a select story window 124AV, story posts or comments details panel 128AV, and story participants or audience statistics panel. The story selection panel 124AV may provide a pull list of stories, the list including the story title, author, and creation date. The story comments or posts panel 128AV may provide a list of posts or comments for the selected story. Each comment or post may indicate the poster name or avatar and time of post. A user 61 may select a posting to be able to enter a response to the post 134AV in an embodiment.

The story participants panel 132AU may indicate the number of participants (posters) by gender and various audience characteristics including member type based on activity (pollinators, connectors, and tail), gender, age, and geographical location. The story participants statistics panel 132AV may also include a key topics list based on the posts in response to the story and a sentiment indication for the story response posts.

FIG. 36 illustrates a SLA micro-site campaign dashboard display 120AD for viewing SLA subset micro-site campaign statistics according to various embodiments. The SLAE system 50 may generate display 120AD of FIG. 36 when an application user 61 selects the dashboard button or link 126AC of display 120AC of FIG. 35B. As shown in FIG. 36 the display 120AD may include a SLA subset statistics panel 122AD and a campaign statistics panel 124AD. The statistics panels 122AD, 124AD may include a combined index, sentiment direction, liveliness percentage 126AD, activity percentage, member count, percentage of each gender, uplift percentage, graph of post activity over time, creation date, and detailed statistics button or link. As noted, liveliness may be related to the number of postings or views relative to the total number of members, activity may be the overall activity not scaled by member base, and uplift may be related to the change in sentiment overall during the predetermined time interval. The campaign statistics window may show the statistics for a SLA subset engagement campaign. The display 120AD SLA subset statistics panel 122AD and the campaign statistics panel 124AD may enable a user to determine the effectiveness of their campaign versus the current SM data comprising the SLA subset.

FIG. 37 illustrates a SLA set and subset campaign dashboard display 120AE for viewing existing campaigns for SLA sets and subsets and sentiment and intent status according to various embodiments. The SLAE system 50 may generate display 120AE of FIG. 37 when an application user 61 selects the campaign dashboard button or link 148J of display 120J of FIG. 15. As shown in FIG. 37 the display 120AE may include a campaign selection filter panel 124AE and active campaign list 125AE. The campaign list 125AE may include the campaign name 126AE, type (icon representing conversation or micro-site) 128AE, Subset or theme search or key terms 132AE, the SLA set name or search or key terms 134AE, the campaign manager 136AE, the sentiment (average) 138AE, the posting intent (average) 142AE, other statistics 144AE, an action button or link 146AE.

In an embodiment a postings intent 144AE may reflect the poster's intent including to expand the posting activity by providing a link to the post or forward the message to other participant. The intent indicator may be an up arrow when the average post intent is to share or grow the campaign, a dash when the average post is neutral, and a down arrow when the average post is limiting growth of the campaign in an embodiment. In an embodiment intent may be related to the member or posters content where the content may be analyzed to determine whether the post intends to motivate another member or recipient to perform an action including selecting an embedded link, respond to the post, or merely read more about the related subject of the post. In an embodiment the SLAE system 50 may employ natural language processing and other text processing to determine the intent of content in one or more posts or comments. The statistics 144AE may include an uplift percentage, number of times posts have been shared (count), and number of users or participants associated with the campaign. When an application user 61 selects a go to button or link 146AE, one or more options including detailed statistics display 148AE and engage display 152AE may be presented and selectable by the user 61.

Figure 38:
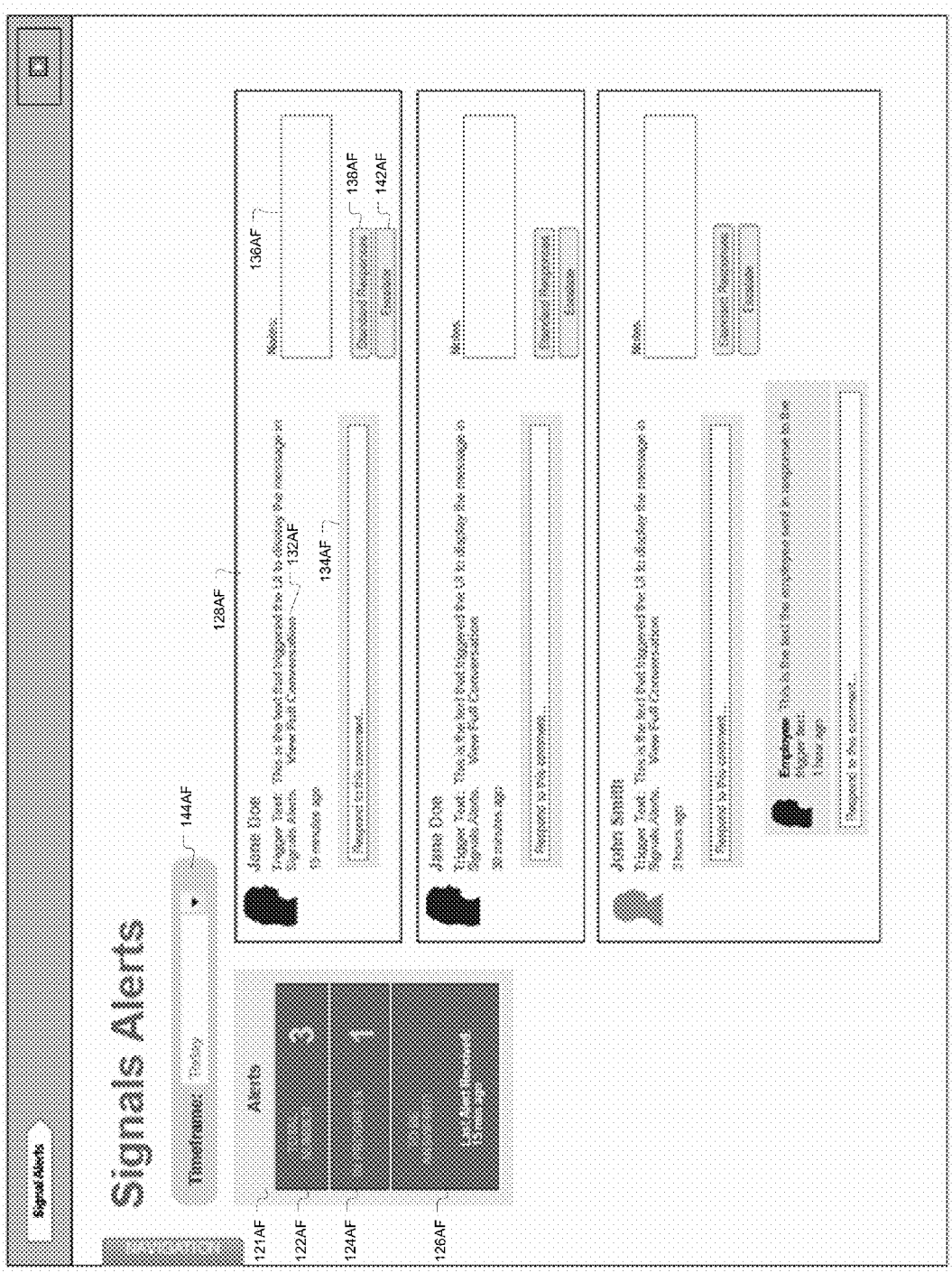
FIG. 38 illustrates a campaign signal alert display for reviewing and responding to posts to a SLA micro-site according to various embodiments.

FIG. 38 illustrates a campaign signal alert display 120AF for reviewing and responding to posts to a SLA micro-site according to various embodiments. The signal alerts may be generated by other campaign audience members including where a member flags a post for content. The SLAE system 50 may generate display 120AF of FIG. 38 when an application user 61 selects the signal alerts button or link 125L of display 124L of FIG. 18A. As shown in FIG. 38 the display 120AF may include a timeframe window or selection 144AF, an alert data panel 121AF, and posts 128AF that may constitute the alert(s). An application user 61 may be able to select the time range associated with the alerts via a timeframe window 144AF. The display 120AF may also include an alert panel 121AF where the panel lists the total number of alerts 122AF for the selected time frame 144AF, alerts being processed (in progress) 124AF, and number of alerts requiring a response 126AF including a listing of when the last alert was received. An alert may be generated by the SLAE system 50 when a participant posts a response to an engage campaign conversation message or on a micro-site (campaign).

The signal alert display 120AF as shown in FIG. 38 may provide full or partial listings of the post(s) 132AF that generated the alert(s) in an alert post panel 128AF. An alert post panel may include a portion of the post 132AF, a respond to post window 134AF, a notes window 136AF, a standard responses button or link 138AF, an escalate button or link 142AF. When an application user 61 selects the standard responses button or link 138AF one or more standard responses (that may be created by the user 61 previously or other users) may be listed and populated into the response window 134AF when selected. When the escalate button 142AF is selected, the alert may be forwarded to other application users 61 including one or more campaign managers and the alert may be shown first in the alert list. An application user 61 may also be able to add personal notes in the notes window 136AF for future reference.

FIG. 39 illustrates a system account management display 120AG for managing SLAE system 50 application users 122AG according to various embodiments. The SLAE system 50 may generate display 120AG of FIG. 39 when an application user 61 selects the account management button or link 125L of display 124L of FIG. 18A. As shown in FIG. 39 the display 120AG may include a SLAE system 50 users window 122AG and details window 131AG. The users panel 122AG may list application users 124AG by name where the users 126AG may be selectable to view or modify user configuration/details. The users 122AG list may indicate each user 126AG type by an icon and also enable a user to be added via a add user button or link 128AG.

In an embodiment the user list 122AG may be limited as a function of the application user 61 requesting the account management display 120AG. In the user detail section 131AG a user's name 132AG, user type 136AG, date information 138AG, account type selection 142AG, and several settings 144AG, 146AG, 148AG may be shown and selectable. An application user 61 may be able to select the edit profile button or link 134AG to modify one or more user details including the user name. The date information 138AG may include the user creation date and last modification date. An application user 61 may be able to change a use type via pull down list 142AG where the user types may include basic, manager, and administrator. An application user 61 via display 120AG may also be able to change or reset a user's password via link or button 152AG.

Figure 41:
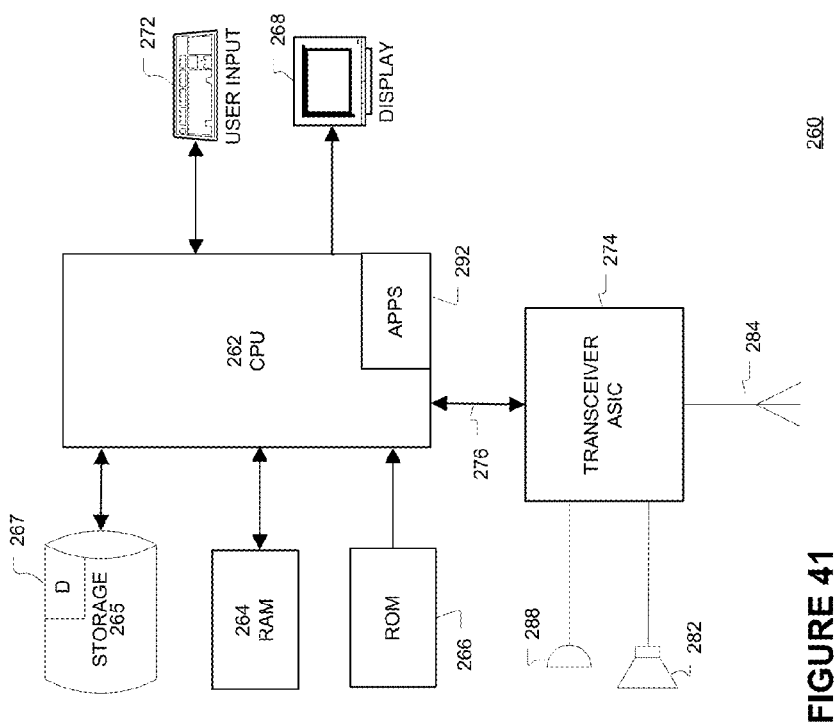
FIG. 41 is a block diagram of an article according to various embodiments.

A device 260 is shown in FIG. 41 that may be used in various embodiments as an application user system 60. The device 60 may include a central processing unit (CPU) 262, a random access memory (RAM) 264, a read only memory (ROM") 266, a display 268, a user input device 272, a transceiver application specific integrated circuit (ASIC) 274, a microphone 288, a speaker 282, a storage unit 265, and an antenna 284. The CPU 262 may include an application module 292 including a browser application module. The RAM 264 may store SLAE system 50 provided content including HTTP data.

In an embodiment the applications 292 may be a separate module. The application module 292 may process messages, displays, or pages from and generate messages, display, responses, or pages for the SLAE system 50 web-server 54. The storage 265 may store data provided by the SLAE system 50 web-server 54 in a database 267. The storage device 265 may comprise any convenient form of data storage and may be used to store temporary program information, queues, databases, and overhead information.

The ROM 266 may be coupled to the CPU 262 and may store the program instructions to be executed by the CPU 262, and the application module 292. The RAM 264 may be coupled to the CPU 262 and may store temporary program data, and overhead information. The user input device 272 may comprise an input device such as a keypad, touch screen, track ball or other similar input device that allows the user to navigate through menus, displays in order to operate the device 260. The display 268 may be an output device such as a CRT, LCD, touch screen, or other similar screen display that enables the user to read, view, or hear received messages, displays, or pages from the SLAE system 50 web-server 54.

A microphone 288 and a speaker 282 may be incorporated into the device 260. The microphone 288 and speaker 282 may also be separated from the device 260. Received data may be transmitted to the CPU 262 via a bus 276 where the data may include messages, displays, or pages received, messages, displays, or pages to be transmitted, or protocol information. The transceiver ASIC 274 may include an instruction set necessary to communicate messages, displays, or pages in architecture 10. The ASIC 274 may be coupled to the antenna 284 to communicate wireless messages, displays, or pages within the architecture 10. When a message is received by the transceiver ASIC 274, its corresponding data may be transferred to the CPU 262 via the bus 276. The data can include wireless protocol, overhead information, and pages and displays to be processed by the device 260 in accordance with the methods described herein.

Figure 42:
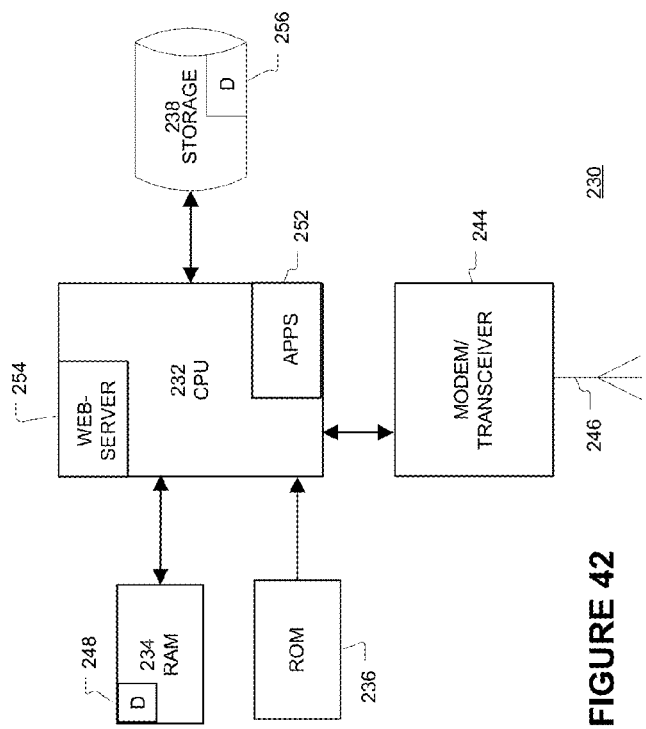
FIG. 42 is a block diagram of an article according to various embodiments.

FIG. 42 illustrates a block diagram of a device 230 that may be employed as a SLAE system 50 and SMP/database system 40A, 40B in various embodiments. The device 230 may include a CPU 232, a RAM 234, a ROM 236, a storage unit 238, a modem/transceiver 244, and an antenna 246. The CPU 232 may include a web-server 254 and application module 252. The RAM 234 may include a queue or database 248 where the database 248 may be used to SM set or subset information including conversations, streams, related data, statistics, and campaign data. The storage 238 may also include a queue or database 256 where the database 256 may be used to store may be used to store SM set or subset information including conversations, streams, related data, statistics, campaign data, and administrative information related to application users. In an embodiment the web-server 254 and the application module 252 may be separate elements. In an embodiment, the web-server 254 may generate content for web-pages or displays to be forwarded to an application user system 60.

The modem/transceiver 244 may couple, in a well-known manner, the device 230 to the network 16 to enable communication with a SMP/database system 40A, 40B, and an application user system 60. In an embodiment, the modem/transceiver 244 may be a wireless modem or other communication device that may enable communication with a SMP/database system 40A, 40B, and an application user system 60. The CPU 232 via the web-server 254 may direct communication between modem 244 and a SMP/database system 40A, 40B, and an application user system 60.

The ROM 236 may store program instructions to be executed by the CPU 232, web-server 254, or application module 252. The RAM 234 may be used to store temporary program information, queues, databases, and overhead information. The storage device 238 may comprise any convenient form of data storage and may be used to store temporary program information, queues, databases, and overhead information.

Any of the components previously described can be implemented in a number of ways, including embodiments in software. Any of the components previously described can be implemented in a number of ways, including embodiments in software. Thus, the CPU 232, web-server 254, application module 252, modem/transceiver 244, antenna 246, storage 238, RAM 234, ROM 236, database 248, database 256, CPU 262, application module 292, transceiver ASIC 274, antenna 284, microphone 288, speaker 282, ROM 266, RAM 264, database 267, user input 272, display 268, SLAE system 50, SMP/database system 40, application user system 60, data source adapter modules 70, 72A-D, data collections module 84, collections storage adapter module 82, service adapter modules 90, 92A, 92B, keyword analysis module 89, storage module 74, data analysis module 94, sub-analysis module 96, driver manager module 88, background job manager module 86, web server module 83, web application module 80, API module 82A, microsite campaign module 82B, administration panel module 82C, and data visualization module 82D may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments.

The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Ruby on Rails, Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A computer-implemented method of analyzing electronic social media content (SMC) to send focused communications to SMC posters, the electronic SMC comprised of posts from a plurality of SMC posters, the posters from a plurality of SMC providers, the posts consisting of electronic social interactions, comprising:

receiving a first keyword from a user desiring to communicate with SMC posters from a plurality of SMC providers;

searching and collecting electronic SMC comprised of posts from a plurality of SMC posters, the posters from a plurality of SMC providers based on the first keyword;

employing one of a real-time semantic analysis, heuristic analysis, and natural language processing on the first keyword to determine a second keyword;

searching and collecting different electronic SMC comprised of posts from a plurality of SMC posters, the posters from a plurality of SMC providers based on the second keyword;

developing a SMC set based on the collected electronic SMC, the collected different electronic SMC, the first keyword, and the second keyword, the SMC set comprised of posts from a plurality of SMC posters, the posters from a plurality of SMC providers;

analyzing the posts that comprise the SMC set to determine each SMC poster of the plurality of SMC posters and poster's SMC provider of the plurality of the SMC providers; and sending a message to each determined SMC poster via their determined SMC provider upon the user's request.

2. The computer-implemented method of claim 1, further comprising:

receiving a user request to send a message to each determined SMC poster;

formatting each message based on the determined SMC provider of each determined SMC poster; and sending each formatted message to each determined SMC poster via their determined SMC provider.

3. The computer-implemented method of claim 2, further comprising sending the formatted messages to each determined SMC poster via their determined SMC provider simultaneously.

4. The computer-implemented method of claim 2, further comprising:
analyzing the collected electronic SMC and the first keyword using one of a real-time semantic analysis, heuristic analysis, and natural language processing to determine the second keyword.

5. The computer-implemented method of claim 2, wherein each message includes a hyper-link to a user's created website.

6. The computer-implemented method of claim 2, further comprising searching and collecting different electronic SMC comprised of posts from a plurality of SMC posters, the posters from the plurality of SMC providers that includes a responses to a message sent upon the user's request.

7. The computer-implemented method of claim 6, further comprising analyzing the posts that comprise the different collected electronic SMC to determine each SMC poster of the plurality of SMC posters and content characteristics.

8. The computer-implemented method of claim 7, wherein determined content characteristics include one of content sentiment, geographical origin, determined SMC poster's age, and determined SMC poster's gender.

9. The computer-implemented method of claim 8, further comprising presenting the content, determined SMC poster, determined content characteristics, and statistical information related to the determined content characteristics to the user in a graphical format.

10. The computer-implemented method of claim 7, wherein the analysis of the posts that comprise the different collected electronic SMC includes using one of a real-time semantic analysis, heuristic analysis, and natural language processing.

11. A computer-implemented method of analyzing electronic social media content (SMC) to send focused communication to SMC posters, the electronic SMC comprised of posts from a plurality of SMC posters, the posters from a plurality of SMC providers, the posts consisting of electronic social interactions, comprising:
receiving a first keyword from a user desiring to communicate with SMC posters from a plurality of SMC providers;
searching and collecting electronic SMC comprised of posts from a plurality of SMC posters, the posters from a plurality of SMC providers based on the first keyword;
employing one of a real-time semantic analysis, heuristic analysis, and natural language processing on the first keyword to determine a second keyword;
searching and collecting different electronic SMC comprised of posts from a plurality of SMC posters, the posters from a plurality of SMC providers based on the second keyword;
developing a SMC set based on the collected electronic SMC, the collected different electronic SMC, the first keyword, and the second keyword, the SMC set comprised of posts from a plurality of SMC posters, the posters from a plurality of SMC providers;
analyzing the posts that comprise the SMC set to determine each SMC poster of the plurality of SMC posters and poster's SMC provider of the plurality of SMC providers;
creating and maintaining a website based on the collected electronic SMC and the collected different electronic SMC upon a user's request; and
sending a message including one of a hyper-link and reference to the created website to each determined SMC poster via their determined SMC provider upon a user's request.

12. The computer-implemented method of claim 11, further comprising:
receiving a user request to send a message to each determined SMC poster;
formatting each message based on the determined SMC provider of each determined SMC poster; and
sending each formatted message to each determined SMC poster via their determined SMC provider.

13. The computer-implemented method of claim 12, further comprising sending the formatted messages to each determined SMC poster via their determined SMC provider simultaneously.

14. The computer-implemented method of claim 12, further comprising:
analyzing the collected electronic SMC and the first keyword using one of a real-time semantic analysis, heuristic analysis, and natural language processing to determine the second keyword.

15. The computer-implemented method of claim 12, further comprising searching and collecting different electronic SMC comprised of posts from a plurality of SMC posters, the posters from the plurality of SMC providers that includes a response to a message sent upon the user's request.

16. A computer-implemented method of analyzing electronic social media content (SMC) to send focused communication to SMC posters, the electronic SMC comprised of posts from a plurality of SMC posters, the posters from a plurality of SMC providers, the posts consisting of electronic social interactions, comprising:
receiving a first keyword from a user desiring to communicate with SMC posters from a plurality of SMC providers;
directing a plurality of SMC providers to provide electronic SMC comprised of posts from a plurality of SMC posters, the posters from the plurality of SMC providers based on the first keyword;
employing one of a real-time semantic analysis, heuristic analysis, and natural language processing on the first keyword to determine a second keyword;
directing a plurality of SMC providers to provide different electronic SMC comprised of posts from a plurality of SMC posters, the posters from the plurality of SMC providers based on the second keyword;
developing a SMC set based on the provided electronic SMC, the provided different electronic SMC, the first keyword, and the second keyword, the SMC set comprised of posts from a plurality of SMC posters, the posters from a plurality of SMC providers;
analyzing the posts that comprise the SMC set to determine each SMC poster of the plurality of SMC posters and poster's SMC of the plurality of SMC providers; and
sending a message to each determined SMC poster via their determined SMC provider upon the user's request.

17. The computer-implemented method of claim 16, further comprising:
receiving a user request to send a message to each determined SMC poster;
formatting each message based on the determined SMC provider of each determined SMC poster; and
sending each formatted message to each determined SMC poster via their determined SMC provider.

18. The computer-implemented method of claim 17, further comprising sending the formatted messages to each determined SMC poster via their determined SMC provider simultaneously.

19. The computer-implemented method of claim 17, further comprising analyzing the provided electronic SMC and the provided different electronic SMC to determine each SMC poster and content characteristics.

20. The computer-implemented method of claim 16, further comprising:
   analyzing the provided electronic SMC and the first keyword using one of a real-time semantic analysis, heuristic analysis, and natural language processing to determine the second keyword.

* * * * *